(12) United States Patent
Iribe et al.

(10) Patent No.: US 7,072,740 B2
(45) Date of Patent: Jul. 4, 2006

(54) LEGGED MOBILE ROBOT

(75) Inventors: Masatsugu Iribe, Tokyo (JP); Jinichi Yamaguchi, 5-14-38, Tamadaira, Hino-shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 382 days.

(21) Appl. No.: 10/732,446

(22) Filed: Dec. 11, 2003

(65) Prior Publication Data

US 2004/0176875 A1    Sep. 9, 2004

(30) Foreign Application Priority Data

| Dec. 16, 2002 | (JP) | ............................ P2002-363236 |
| Feb. 18, 2003 | (JP) | ............................ P2003-039560 |
| Nov. 18, 2003 | (JP) | ............................ P2003-388082 |

(51) Int. Cl.
   *G06F 19/00*    (2006.01)

(52) U.S. Cl. ....................... 700/245; 700/247; 700/249; 700/250; 700/252; 700/253; 700/258; 700/260; 318/568.1; 318/568.11; 318/568.12; 318/568.16; 318/568.17; 318/568.22; 318/568.25; 901/1; 901/2; 901/9; 180/8.1; 180/8.6

(58) Field of Classification Search ................ 700/245, 700/247, 249, 250, 252, 253, 258, 260, 264; 901/1, 2, 9, 46; 180/8.1, 8.6; 318/568.1, 318/568.11, 568.12, 568.16, 568.17, 568.22, 318/568.25

See application file for complete search history.

(56) References Cited

U.S. PATENT DOCUMENTS

| 6,463,356 | B1 * | 10/2002 | Hattori et al. | ............... 700/245 |
| 6,567,724 | B1 * | 5/2003 | Yamamoto | ................... 700/261 |
| 6,711,469 | B1 * | 3/2004 | Sakamoto et al. | .......... 700/245 |
| 6,732,015 | B1 * | 5/2004 | Maeda | ........................ 700/245 |
| 6,832,131 | B1 * | 12/2004 | Hattori et al. | ............... 700/245 |
| 6,959,231 | B1 * | 10/2005 | Maeda | ........................ 700/245 |

OTHER PUBLICATIONS

Inaba et al., Two-armed bipedal robot that cna walk, roll over and stand up, 1995, IEE, p. 297-302.*

* cited by examiner

*Primary Examiner*—Thomas G. Black
*Assistant Examiner*—McDieunel Marc
(74) *Attorney, Agent, or Firm*—Oblon, Spivak, McClelland, Maier & Neustadt, P.C.

(57) ABSTRACT

In a mobile robot, the actuator characteristics are dynamically or statically controlled, during motions of an entire robot body in the course of falldown or descent, to realize stable highly efficient motions. In each stage of the falldown motions, the characteristics of each joint site taking part in controlling the stable area are set so that the low range gain is low, the quantity of phase lead is large and the viscous resistance of the motor is large, in such a manner that these joint sites may be positioned to high accuracy in a controller manner to increase orientation stability. This assures the positioning accuracy of the joints as main component for controlling the quantity $\Delta S/\Delta t$ as a reference in controlling the falldown motions of the robot body to increase the motion stability.

18 Claims, 60 Drawing Sheets

STIFF JOINT
CHARACTERISTICS
  SERVO CHARACTERISTICS
  (FIG.12)
  JOINT VISCOSITY
  (FIG.17A)

INTERMEDIATE JOINT
CHARACTERISTICS
  SERVO CHARACTERISTICS
  (FIG.13)
  JOINT VISCOSITY
  (FIG.17A)

SOFT JOINT
CHARACTERISTICS
  SERVO CHARACTERISTICS
  (FIG.13)
  JOINT VISCOSITY
  (FIG.17B)

| | | UPSTANDING POSTURE |
|---|---|---|
| | | LOWER LIMBS FORM A CLOSED LINK SYSTEM WITH FLOOR SURFACE |
| RIGHT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| NECK ROLL, PITCH AND YAW | | STIFF JOINT CHARACTERISTICS |
| OTHER JOINT SITES | | STIFF JOINT CHARACTERISTICS |

FIG.26

STIFF JOINT
CHARACTERISTICS
  SERVO CHARACTERISTICS
  (FIG.12)
  JOINT VISCOSITY
  (FIG.17A)

INTERMEDIATE JOINT
CHARACTERISTICS
  SERVO CHARACTERISTICS
  (FIG.13)
  JOINT VISCOSITY
  (FIG.17A)

SOFT JOINT
CHARACTERISTICS
  SERVO CHARACTERISTICS
  (FIG.13)
  JOINT VISCOSITY
  (FIG.17B)

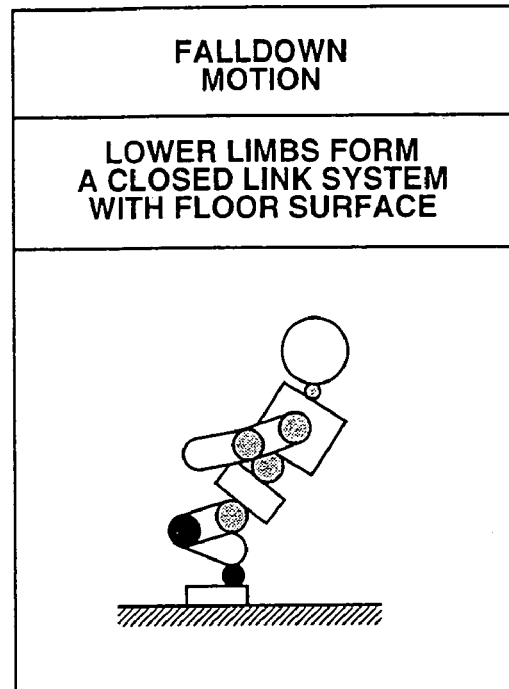

FALLDOWN MOTION

LOWER LIMBS FORM A CLOSED LINK SYSTEM WITH FLOOR SURFACE

| | | | |
|---|---|---|---|
| RIGHT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | SOFT JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| LEFT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | SOFT JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| NECK ROLL, PITCH AND YAW | | | STIFF JOINT CHARACTERISTICS |
| OTHER JOINT SITES | | | STIFF JOINT CHARACTERISTICS |

FIG.27

| | | | |
|---|---|---|---|
| STIFF JOINT CHARACTERISTICS<br>　SERVO CHARACTERISTICS (FIG.12)<br>　JOINT VISCOSITY (FIG.17A)<br><br>INTERMEDIATE JOINT CHARACTERISTICS<br>　SERVO CHARACTERISTICS (FIG.13)<br>　JOINT VISCOSITY (FIG.17A)<br><br>SOFT JOINT CHARACTERISTICS<br>　SERVO CHARACTERISTICS (FIG.13)<br>　JOINT VISCOSITY (FIG.17B) | | | FALLDOWN MOTION |
| | | | ROBOT BODY IN ITS ENTIRETY FORMS AN OPEN LINK SYSTEM |
| | | | 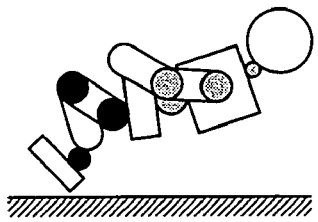 |
| RIGHT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| NECK ROLL, PITCH AND YAW | | | STIFF JOINT CHARACTERISTICS |
| OTHER JOINT SITES | | | STIFF JOINT CHARACTERISTICS |

FIG.28

| | | | |
|---|---|---|---|
| STIFF JOINT CHARACTERISTICS<br>  SERVO CHARACTERISTICS (FIG.12)<br>  JOINT VISCOSITY (FIG.17A)<br><br>INTERMEDIATE JOINT CHARACTERISTICS<br>  SERVO CHARACTERISTICS (FIG.13)<br>  JOINT VISCOSITY (FIG.17A)<br><br>SOFT JOINT CHARACTERISTICS<br>  SERVO CHARACTERISTICS (FIG.13)<br>  JOINT VISCOSITY (FIG.17B) | | | SHOCK ABSORPTION (INSTANT OF CONTACT)<br><br>ROBOT BODY IN ITS ENTIRETY FORMS A CLOSED LINK SYSTEM<br><br>*(illustration: INSTANT OF CONTACT)* |

| | | | |
|---|---|---|---|
| RIGHT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| NECK ROLL, PITCH AND YAW | | | STIFF JOINT CHARACTERISTICS |
| OTHER JOINT SITES | | | SOFT JOINT CHARACTERISTICS |

FIG.29

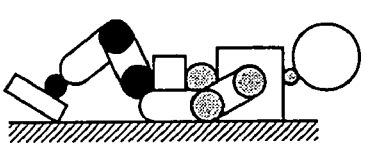

| | | | |
|---|---|---|---|
| STIFF JOINT CHARACTERISTICS<br>　SERVO CHARACTERISTICS (FIG.12)<br>　JOINT VISCOSITY (FIG.17A)<br><br>INTERMEDIATE JOINT CHARACTERISTICS<br>　SERVO CHARACTERISTICS (FIG.13)<br>　JOINT VISCOSITY (FIG.17A)<br><br>SOFT JOINT CHARACTERISTICS<br>　SERVO CHARACTERISTICS (FIG.13)<br>　JOINT VISCOSITY (FIG.17B) | | CONTACT OF ENTIRE ROBOT BODY | |
| | | ROBOT BODY IN ITS ENTIRETY FORMS A CLOSED LINK SYSTEM | |
| RIGHT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| NECK ROLL, PITCH AND YAW | | STIFF JOINT CHARACTERISTICS | |
| OTHER JOINT SITES | | STIFF JOINT CHARACTERISTICS | |

FIG.30

STIFF JOINT
CHARACTERISTICS
  SERVO CHARACTERISTICS
  (FIG.12)
  JOINT VISCOSITY
  (FIG.17A)

INTERMEDIATE JOINT
CHARACTERISTICS
  SERVO CHARACTERISTICS
  (FIG.13)
  JOINT VISCOSITY
  (FIG.17A)

SOFT JOINT
CHARACTERISTICS
  SERVO CHARACTERISTICS
  (FIG.13)
  JOINT VISCOSITY
  (FIG.17B)

| | | | |
|---|---|---|---|
| | | NORMAL ORIENTATION AFTER FALLDOWN | |
| | | LOWER LIMBS FORM A CLOSED LINK SYSTEM WITH FLOOR SURFACE | |
| | | 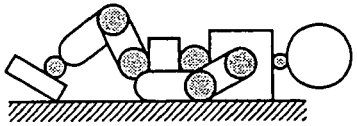 | |
| RIGHT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | INTERMEDIATE JOINT CHARACTERISTICS |
| | ANKLE PITCH | LEG IN FLIGHT | INTERMEDIATE JOINT CHARACTERISTICS |
| LEFT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | INTERMEDIATE JOINT CHARACTERISTICS |
| | ANKLE PITCH | LEG IN FLIGHT | INTERMEDIATE JOINT CHARACTERISTICS |
| NECK ROLL, PITCH AND YAW | | STIFF JOINT CHARACTERISTICS | |
| OTHER JOINT SITES | | STIFF JOINT CHARACTERISTICS | |

FIG.31

CASE IN WHICH THE LOWER LIMBS (BOTH LEGS) AND THE FLOOR SURFACE FORM A CLOSED LINK IN UPSTANDING POSTURE

CLOSED LINK BEING FORMED

CASE IN WHICH THE LOWER LIMBS (BOTH LEGS) AND THE FLOOR SURFACE FORM AN OPEN LINK IN UPSTANDING POSTURE

OPEN LINK BEING FORMED

| STIFF JOINT CHARACTERISTICS<br>  SERVO CHARACTERISTICS (FIG.12)<br>  JOINT VISCOSITY (FIG.17A)<br>INTERMEDIATE JOINT CHARACTERISTICS<br>  SERVO CHARACTERISTICS (FIG.13)<br>  JOINT VISCOSITY (FIG.17A)<br>SOFT JOINT CHARACTERISTICS<br>  SERVO CHARACTERISTICS (FIG.13)<br>  JOINT VISCOSITY (FIG.17B) | | UPSTANDING POSTURE |
|---|---|---|
| | | LOWER LIMBS FORM A CLOSED LINK SYSTEM WITH FLOOR SURFACE |
| | | |
| RIGHT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT ELBOW PITCH AND RIGHT ELBOW PITCH | | STIFF JOINT CHARACTERISTICS |
| NECK ROLL, PITCH AND YAW | | STIFF JOINT CHARACTERISTICS |
| OTHER JOINT SITES | | STIFF JOINT CHARACTERISTICS |

FIG.35

STIFF JOINT
CHARACTERISTICS
 SERVO CHARACTERISTICS
 (FIG.12)
 JOINT VISCOSITY
 (FIG.17A)

INTERMEDIATE JOINT
CHARACTERISTICS
 SERVO CHARACTERISTICS
 (FIG.13)
 JOINT VISCOSITY
 (FIG.17A)

SOFT JOINT
CHARACTERISTICS
 SERVO CHARACTERISTICS
 (FIG.13)
 JOINT VISCOSITY
 (FIG.17B)

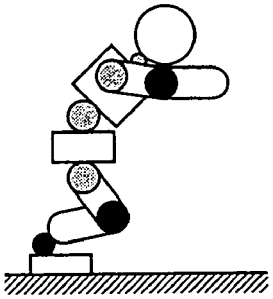

| | | | |
|---|---|---|---|
| RIGHT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | SOFT JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| LEFT | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | SOFT JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| LEFT ELBOW PITCH AND RIGHT ELBOW PITCH | | | SOFT JOINT CHARACTERISTICS |
| NECK ROLL, PITCH AND YAW | | | STIFF JOINT CHARACTERISTICS |
| OTHER JOINT SITES | | | INTERMEDIATE JOINT CHARACTERISTICS |

FIG.36

STIFF JOINT
CHARACTERISTICS
   SERVO CHARACTERISTICS
   (FIG.12)
   JOINT VISCOSITY
   (FIG.17A)

INTERMEDIATE JOINT
CHARACTERISTICS
   SERVO CHARACTERISTICS
   (FIG.13)
   JOINT VISCOSITY
   (FIG.17A)

SOFT JOINT
CHARACTERISTICS
   SERVO CHARACTERISTICS
   (FIG.13)
   JOINT VISCOSITY
   (FIG.17B)

| | | | |
|---|---|---|---|
| \multicolumn{2}{c}{} | \multicolumn{2}{c}{FALLDOWN MOTION} |
| \multicolumn{2}{c}{} | \multicolumn{2}{c}{ROBOT BODY IN ITS ENTIRETY FORMS AN OPEN LINK SYSTEM} |
| RIGHT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | THIGH ROLL | LEG IN FLIGHT | SOFT JOINT CHARACTERISTICS |
| | THIGH PITCH | LEG IN FLIGHT | SOFT JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| \multicolumn{2}{|l|}{LEFT ELBOW PITCH AND RIGHT ELBOW PITCH} | \multicolumn{2}{c}{SOFT JOINT CHARACTERISTICS} |
| \multicolumn{2}{|l|}{NECK ROLL, PITCH AND YAW} | \multicolumn{2}{c}{STIFF JOINT CHARACTERISTICS} |
| \multicolumn{2}{|l|}{OTHER JOINT SITES} | \multicolumn{2}{c}{INTERMEDIATE JOINT CHARACTERISTICS} |

FIG.37

STIFF JOINT CHARACTERISTICS
  SERVO CHARACTERISTICS (FIG.12)
  JOINT VISCOSITY (FIG.17A)

INTERMEDIATE JOINT CHARACTERISTICS
  SERVO CHARACTERISTICS (FIG.13)
  JOINT VISCOSITY (FIG.17A)

SOFT JOINT CHARACTERISTICS
  SERVO CHARACTERISTICS (FIG.13)
  JOINT VISCOSITY (FIG.17B)

| | | | NORMAL ORIENTATION AFTER FALLDOWN |
|---|---|---|---|
| | | | LOWER LIMBS FORM A CLOSED LINK SYSTEM WITH FLOOR SURFACE |
| RIGHT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | INTERMEDIATE JOINT CHARACTERISTICS |
| | ANKLE PITCH | LEG IN FLIGHT | INTERMEDIATE JOINT CHARACTERISTICS |
| LEFT | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | INTERMEDIATE JOINT CHARACTERISTICS |
| | ANKLE PITCH | LEG IN FLIGHT | INTERMEDIATE JOINT CHARACTERISTICS |
| LEFT ELBOW PITCH AND RIGHT ELBOW PITCH | | | STIFF JOINT CHARACTERISTICS |
| NECK ROLL, PITCH AND YAW | | | STIFF JOINT CHARACTERISTICS |
| OTHER JOINT SITES | | | STIFF JOINT CHARACTERISTICS |

FIG.39

| | | | |
|---|---|---|---|
| STIFF JOINT CHARACTERISTICS<br>  SERVO CHARACTERISTICS (FIG.12)<br>  JOINT VISCOSITY (FIG.17A)<br>INTERMEDIATE JOINT CHARACTERISTICS<br>  SERVO CHARACTERISTICS (FIG.13)<br>  JOINT VISCOSITY (FIG.17A)<br>SOFT JOINT CHARACTERISTICS<br>  SERVO CHARACTERISTICS (FIG.13)<br>  JOINT VISCOSITY (FIG.17B) | | colspan="2" | LOWER LIMBS, WAIST AND BODY TRUNK UNIT FORM A CLOSED LINK SYSTEM WITH RESPECT TO THE FLOOR SURFACE 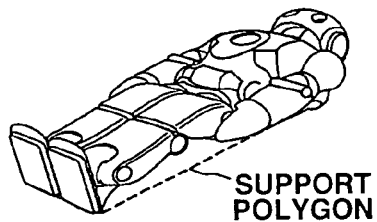 — SUPPORT POLYGON |
| RIGHT | SHOULDER PITCH | colspan="2" | STIFF JOINT CHARACTERISTICS |
| | SHOULDER ROLL | colspan="2" | STIFF JOINT CHARACTERISTICS |
| | ELBOW PITCH | colspan="2" | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | colspan="2" | STIFF JOINT CHARACTERISTICS |
| | SHOULDER ROLL | colspan="2" | STIFF JOINT CHARACTERISTICS |
| | ELBOW PITCH | colspan="2" | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| colspan="2" | OTHER JOINT SITES | colspan="2" | STIFF JOINT CHARACTERISTICS |

FIG.43

| | | | |
|---|---|---|---|
| STIFF JOINT CHARACTERISTICS<br>　SERVO CHARACTERISTICS (FIG.12)<br>　JOINT VISCOSITY (FIG.17A)<br>INTERMEDIATE JOINT CHARACTERISTICS<br>　SERVO CHARACTERISTICS (FIG.13)<br>　JOINT VISCOSITY (FIG.17A)<br>SOFT JOINT CHARACTERISTICS<br>　SERVO CHARACTERISTICS (FIG.13)<br>　JOINT VISCOSITY (FIG.17B) | | | |
| RIGHT | SHOULDER PITCH | STIFF JOINT CHARACTERISTICS | |
| | SHOULDER ROLL | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | STIFF JOINT CHARACTERISTICS | |
| | SHOULDER ROLL | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.44

STIFF JOINT
CHARACTERISTICS
   SERVO CHARACTERISTICS
   (FIG.12)
   JOINT VISCOSITY
   (FIG.17A)
INTERMEDIATE JOINT
CHARACTERISTICS
   SERVO CHARACTERISTICS
   (FIG.13)
   JOINT VISCOSITY
   (FIG.17A)
SOFT JOINT
CHARACTERISTICS
   SERVO CHARACTERISTICS
   (FIG.13)
   JOINT VISCOSITY
   (FIG.17B)

ARMS, BODY TRUNK UNIT, WAIST AND LOWER LIMB UNITS FORM A CLOSED LINK SYSTEM WITH RESPECT TO THE FLOOR SURFACE

SUPPORT POLYGON

| | | | |
|---|---|---|---|
| RIGHT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | | INTERMEDIATE JOINT CHARACTERISTICS |

FIG.46

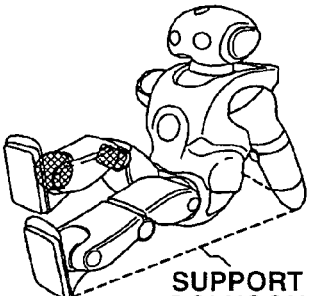

| | | | |
|---|---|---|---|
| STIFF JOINT CHARACTERISTICS<br>  SERVO CHARACTERISTICS (FIG.12)<br>  JOINT VISCOSITY (FIG.17A)<br>INTERMEDIATE JOINT CHARACTERISTICS<br>  SERVO CHARACTERISTICS (FIG.13)<br>  JOINT VISCOSITY (FIG.17A)<br>SOFT JOINT CHARACTERISTICS<br>  SERVO CHARACTERISTICS (FIG.13)<br>  JOINT VISCOSITY (FIG.17B) | colspan=3 | ARMS, BODY TRUNK UNIT, WAIST AND LEFT LOWER LIMB UNIT FORM A CLOSED LINK SYSTEM WITH RESPECT TO THE FLOOR SURFACE |

| | | | |
|---|---|---|---|
| RIGHT | SHOULDER PITCH | colspan=2 | INTERMEDIATE JOINT CHARACTERISTICS |
| | SHOULDER ROLL | colspan=2 | INTERMEDIATE JOINT CHARACTERISTICS |
| | ELBOW PITCH | colspan=2 | INTERMEDIATE JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | SHOULDER PITCH | colspan=2 | INTERMEDIATE JOINT CHARACTERISTICS |
| | SHOULDER ROLL | colspan=2 | INTERMEDIATE JOINT CHARACTERISTICS |
| | ELBOW PITCH | colspan=2 | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| colspan=2 | OTHER JOINT SITES | colspan=2 | INTERMEDIATE JOINT CHARACTERISTICS |

FIG.47

STIFF JOINT
CHARACTERISTICS
   SERVO CHARACTERISTICS
   (FIG.12)
   JOINT VISCOSITY
   (FIG.17A)
INTERMEDIATE JOINT
CHARACTERISTICS
   SERVO CHARACTERISTICS
   (FIG.13)
   JOINT VISCOSITY
   (FIG.17A)
SOFT JOINT
CHARACTERISTICS
   SERVO CHARACTERISTICS
   (FIG.13)
   JOINT VISCOSITY
   (FIG.17B)

ARMS, BODY TRUNK UNIT, WAIST AND RIGHT LOWER LIMB UNIT FORM A CLOSED LINK SYSTEM WITH RESPECT TO THE FLOOR SURFACE

SUPPORT POLYGON

| | | | |
|---|---|---|---|
| RIGHT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN FLIGHT | STIFF JOINT CHARACTERISTICS |
| | THIGH PITCH | LEG IN FLIGHT | STIFF JOINT CHARACTERISTICS |
| | KNEE PITCH | LEG IN FLIGHT | SOFT JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| OTHER JOINT SITES | | | INTERMEDIATE JOINT CHARACTERISTICS |

FIG.48

STIFF JOINT
CHARACTERISTICS
  SERVO CHARACTERISTICS
  (FIG.12)
  JOINT VISCOSITY
  (FIG.17A)
INTERMEDIATE JOINT
CHARACTERISTICS
  SERVO CHARACTERISTICS
  (FIG.13)
  JOINT VISCOSITY
  (FIG.17A)
SOFT JOINT
CHARACTERISTICS
  SERVO CHARACTERISTICS
  (FIG.13)
  JOINT VISCOSITY
  (FIG.17B)

ARMS, BODY TRUNK UNIT, WAIST AND LOWER LIMB UNITS FORM A CLOSED LINK SYSTEM WITH RESPECT TO THE FLOOR SURFACE

SUPPORT POLYGON

| | | | |
|---|---|---|---|
| RIGHT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | | INTERMEDIATE JOINT CHARACTERISTICS |

FIG.49

STIFF JOINT CHARACTERISTICS
   SERVO CHARACTERISTICS (FIG.12)
   JOINT VISCOSITY (FIG.17A)
INTERMEDIATE JOINT CHARACTERISTICS
   SERVO CHARACTERISTICS (FIG.13)
   JOINT VISCOSITY (FIG.17A)
SOFT JOINT CHARACTERISTICS
   SERVO CHARACTERISTICS (FIG.13)
   JOINT VISCOSITY (FIG.17B)

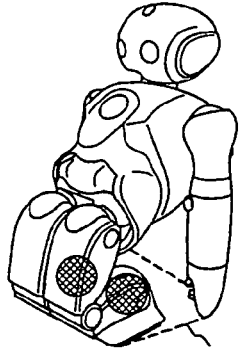

ARMS, BODY TRUNK UNIT, WAIST AND LOWER LIMB UNITS FORM A CLOSED LINK SYSTEM WITH RESPECT TO THE FLOOR SURFACE

SUPPORT POLYGON

| | | | |
|---|---|---|---|
| RIGHT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| LEFT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| | OTHER JOINT SITES | | STIFF JOINT CHARACTERISTICS |

FIG.50

| | | | |
|---|---|---|---|
| STIFF JOINT CHARACTERISTICS<br>  SERVO CHARACTERISTICS (FIG.12)<br>  JOINT VISCOSITY (FIG.17A)<br>INTERMEDIATE JOINT CHARACTERISTICS<br>  SERVO CHARACTERISTICS (FIG.13)<br>  JOINT VISCOSITY (FIG.17A)<br>SOFT JOINT CHARACTERISTICS<br>  SERVO CHARACTERISTICS (FIG.13)<br>  JOINT VISCOSITY (FIG.17B) | | 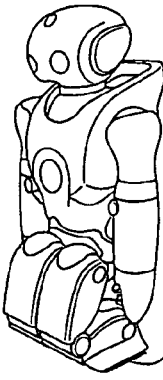WAIST AND LOWER LIMB UNITS FORM A CLOSED LINK SYSTEM WITH RESPECT TO THE FLOOR SURFACE<br><br>SUPPORT POLYGON | |
| RIGHT | SHOULDER PITCH | | STIFF JOINT CHARACTERISTICS |
| | SHOULDER ROLL | | STIFF JOINT CHARACTERISTICS |
| | ELBOW PITCH | | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | | STIFF JOINT CHARACTERISTICS |
| | SHOULDER ROLL | | STIFF JOINT CHARACTERISTICS |
| | ELBOW PITCH | | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | | STIFF JOINT CHARACTERISTICS |

FIG.51

STIFF JOINT
CHARACTERISTICS
   SERVO CHARACTERISTICS
   (FIG.12)
   JOINT VISCOSITY
   (FIG.17A)
INTERMEDIATE JOINT
CHARACTERISTICS
   SERVO CHARACTERISTICS
   (FIG.13)
   JOINT VISCOSITY
   (FIG.17A)
SOFT JOINT
CHARACTERISTICS
   SERVO CHARACTERISTICS
   (FIG.13)
   JOINT VISCOSITY
   (FIG.17B)

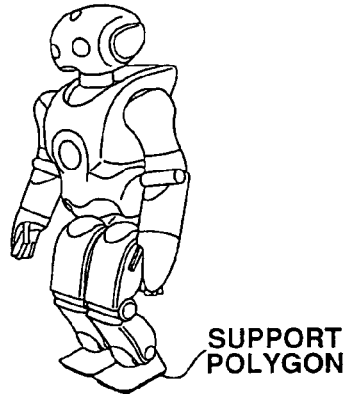

WAIST AND LOWER LIMB UNITS FORM A CLOSED LINK SYSTEM WITH RESPECT TO THE FLOOR SURFACE

SUPPORT POLYGON

| | | | |
|---|---|---|---|
| RIGHT | SHOULDER PITCH | STIFF JOINT CHARACTERISTICS | |
| | SHOULDER ROLL | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | STIFF JOINT CHARACTERISTICS | |
| | SHOULDER ROLL | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| OTHER JOINT SITES | | STIFF JOINT CHARACTERISTICS | |

FIG.52

STIFF JOINT
CHARACTERISTICS
  SERVO CHARACTERISTICS
  (FIG.12)
  JOINT VISCOSITY
  (FIG.17A)
INTERMEDIATE JOINT
CHARACTERISTICS
  SERVO CHARACTERISTICS
  (FIG.13)
  JOINT VISCOSITY
  (FIG.17A)
SOFT JOINT
CHARACTERISTICS
  SERVO CHARACTERISTICS
  (FIG.13)
  JOINT VISCOSITY
  (FIG.17B)

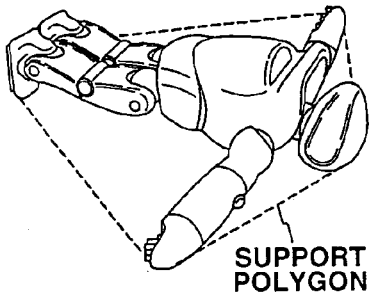

LOWER LIMB UNITS, WAIST AND BODY TRUNK UNIT FORM A CLOSED LINK SYSTEM WITH RESPECT TO THE FLOOR SURFACE

SUPPORT POLYGON

| | | | |
|---|---|---|---|
| RIGHT | SHOULDER PITCH | | STIFF JOINT CHARACTERISTICS |
| | SHOULDER ROLL | | STIFF JOINT CHARACTERISTICS |
| | ELBOW PITCH | | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | | STIFF JOINT CHARACTERISTICS |
| | SHOULDER ROLL | | STIFF JOINT CHARACTERISTICS |
| | ELBOW PITCH | | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| BODY TRUNK ROLL AND PITCH | | | STIFF JOINT CHARACTERISTICS |
| OTHER JOINT SITES | | | STIFF JOINT CHARACTERISTICS |

FIG.56

STIFF JOINT CHARACTERISTICS
   SERVO CHARACTERISTICS (FIG.12)
   JOINT VISCOSITY (FIG.17A)
INTERMEDIATE JOINT CHARACTERISTICS
   SERVO CHARACTERISTICS (FIG.13)
   JOINT VISCOSITY (FIG.17A)
SOFT JOINT CHARACTERISTICS
   SERVO CHARACTERISTICS (FIG.13)
   JOINT VISCOSITY (FIG.17B)

THIGH, WAIST, BODY TRUNK UNIT AND UPPER LIMBS FORM A CLOSED LINK SYSTEM WITH RESPECT TO THE FLOOR SURFACE

SUPPORT POLYGON

| | | | |
|---|---|---|---|
| RIGHT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| LEFT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN FLIGHT | INTERMEDIATE JOINT CHARACTERISTICS |
| | THIGH PITCH | LEG IN FLIGHT | INTERMEDIATE JOINT CHARACTERISTICS |
| | KNEE PITCH | LEG IN FLIGHT | INTERMEDIATE JOINT CHARACTERISTICS |
| | ANKLE ROLL | LEG IN FLIGHT | SOFT JOINT CHARACTERISTICS |
| | ANKLE PITCH | LEG IN FLIGHT | SOFT JOINT CHARACTERISTICS |
| BODY TRUNK ROLL AND PITCH | | | STIFF JOINT CHARACTERISTICS |
| OTHER JOINT SITES | | | STIFF JOINT CHARACTERISTICS |

FIG.57

STIFF JOINT CHARACTERISTICS
   SERVO CHARACTERISTICS (FIG.12)
   JOINT VISCOSITY (FIG.17A)
INTERMEDIATE JOINT CHARACTERISTICS
   SERVO CHARACTERISTICS (FIG.13)
   JOINT VISCOSITY (FIG.17A)
SOFT JOINT CHARACTERISTICS
   SERVO CHARACTERISTICS (FIG.13)
   JOINT VISCOSITY (FIG.17B)

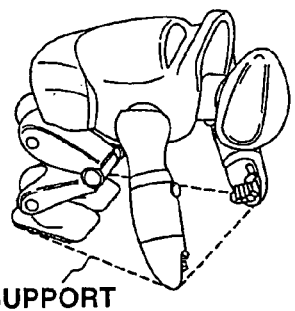

LOWER LIMBS, WAIST, BODY TRUNK UNIT AND UPPER LIMBS FORM A CLOSED LINK SYSTEM WITH RESPECT TO THE FLOOR SURFACE

SUPPORT POLYGON

| | | | |
|---|---|---|---|
| RIGHT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | | INTERMEDIATE JOINT CHARACTERISTICS |
| | SHOULDER ROLL | | INTERMEDIATE JOINT CHARACTERISTICS |
| | ELBOW PITCH | | INTERMEDIATE JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| BODY TRUNK ROLL AND PITCH | | | INTERMEDIATE JOINT CHARACTERISTICS |
| OTHER JOINT SITES | | | STIFF JOINT CHARACTERISTICS |

FIG.59

STIFF JOINT CHARACTERISTICS
  SERVO CHARACTERISTICS (FIG.12)
  JOINT VISCOSITY (FIG.17A)
INTERMEDIATE JOINT CHARACTERISTICS
  SERVO CHARACTERISTICS (FIG.13)
  JOINT VISCOSITY (FIG.17A)
SOFT JOINT CHARACTERISTICS
  SERVO CHARACTERISTICS (FIG.13)
  JOINT VISCOSITY (FIG.17B)

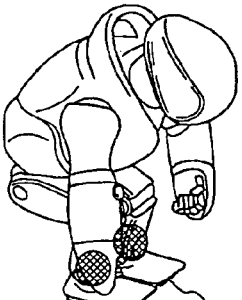

BOTH LOWER LIMBS FORM A CLOSED LINK SYSTEM WITH RESPECT TO THE FLOOR SURFACE

SUPPORT POLYGON

| | | | |
|---|---|---|---|
| RIGHT | SHOULDER PITCH | | STIFF JOINT CHARACTERISTICS |
| | SHOULDER ROLL | | STIFF JOINT CHARACTERISTICS |
| | ELBOW PITCH | | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| LEFT | SHOULDER PITCH | | STIFF JOINT CHARACTERISTICS |
| | SHOULDER ROLL | | STIFF JOINT CHARACTERISTICS |
| | ELBOW PITCH | | STIFF JOINT CHARACTERISTICS |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | SOFT JOINT CHARACTERISTICS |
| | ANKLE PITCH | LEG IN STANCE | SOFT JOINT CHARACTERISTICS |
| BODY TRUNK ROLL AND PITCH | | | STIFF JOINT CHARACTERISTICS |
| OTHER JOINT SITES | | | STIFF JOINT CHARACTERISTICS |

FIG.60

STIFF JOINT CHARACTERISTICS
   SERVO CHARACTERISTICS (FIG.12)
   JOINT VISCOSITY (FIG.17A)
INTERMEDIATE JOINT CHARACTERISTICS
   SERVO CHARACTERISTICS (FIG.13)
   JOINT VISCOSITY (FIG.17A)
SOFT JOINT CHARACTERISTICS
   SERVO CHARACTERISTICS (FIG.13)
   JOINT VISCOSITY (FIG.17B)

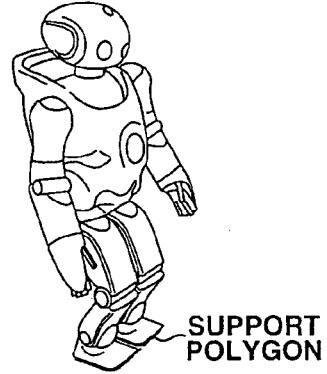

BOTH LOWER LIMBS FORM A CLOSED LINK SYSTEM WITH RESPECT TO THE FLOOR SURFACE

SUPPORT POLYGON

| | | | |
|---|---|---|---|
| RIGHT | SHOULDER PITCH | STIFF JOINT CHARACTERISTICS | |
| | SHOULDER ROLL | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| LEFT | SHOULDER PITCH | STIFF JOINT CHARACTERISTICS | |
| | SHOULDER ROLL | STIFF JOINT CHARACTERISTICS | |
| | ELBOW PITCH | STIFF JOINT CHARACTERISTICS | |
| | THIGH ROLL | LEG IN STANCE | INTERMEDIATE JOINT CHARACTERISTICS |
| | THIGH PITCH | LEG IN STANCE | INTERMEDIATE JOINT CHARACTERISTICS |
| | KNEE PITCH | LEG IN STANCE | INTERMEDIATE JOINT CHARACTERISTICS |
| | ANKLE ROLL | LEG IN STANCE | INTERMEDIATE JOINT CHARACTERISTICS |
| | ANKLE PITCH | LEG IN STANCE | INTERMEDIATE JOINT CHARACTERISTICS |
| BODY TRUNK ROLL AND PITCH | | STIFF JOINT CHARACTERISTICS | |
| OTHER JOINT SITES | | STIFF JOINT CHARACTERISTICS | |

FIG.61

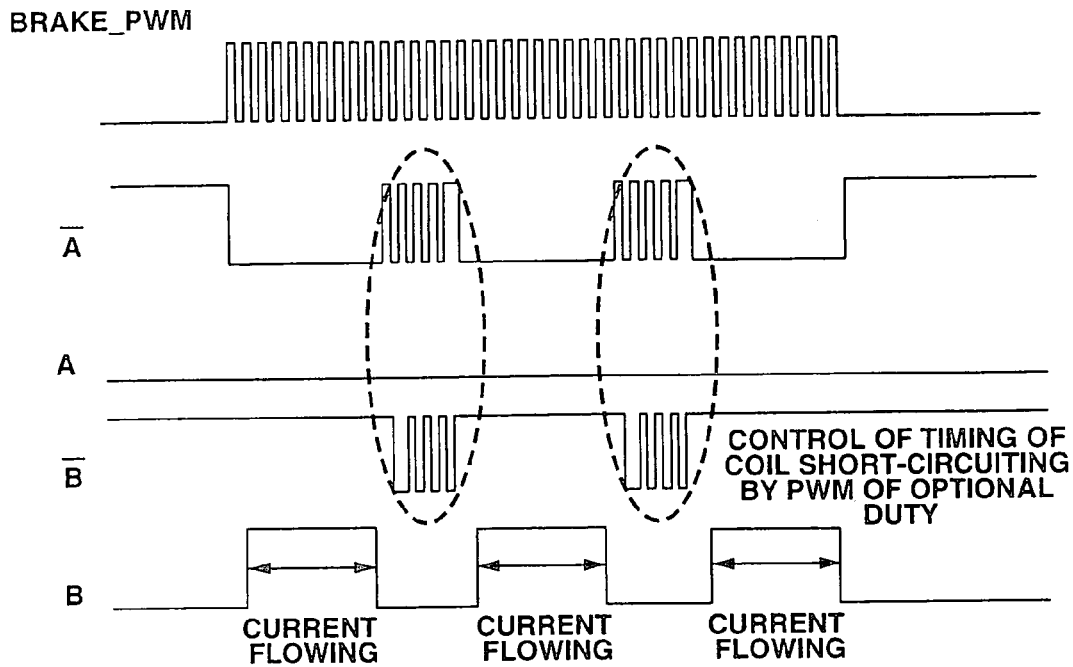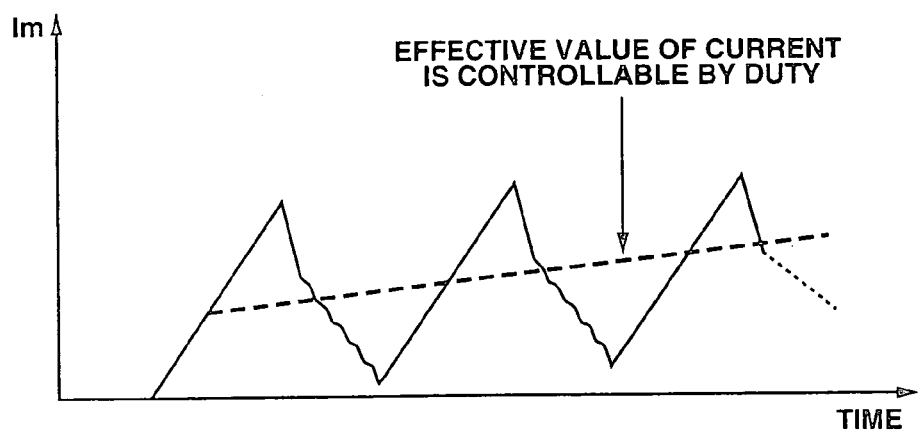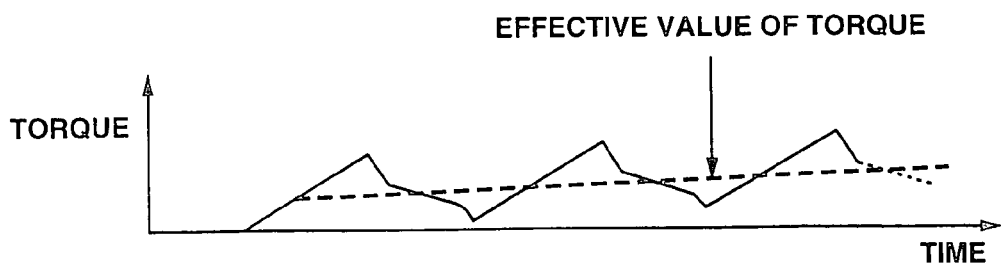
FIG. 62

LEGGED MOBILE ROBOT

BACKGROUND OF THE INVEVTION

Field of the Invention

This invention relates to a mechanical apparatus of a multi-axial driving system, such as a robot, universal assembling equipment, robot handling equipment and the like multi-axial controlling apparatus. More particularly, this invention relates to a robot the respective joint sites of which are made up by servo controllers of actuators forming a position controlling system composed of elements for serial compensation proportional gain and phase compensation.

Still more particularly, this invention relates to a legged mobile robot, walking on two legs, and having axial links controlled by high gain PD control and, in particular, to a legged mobile robot in which stable highly efficient operations may be achieved by dynamically or statically controlling the characteristics of the controllers for the actuators and the actuators themselves during the motions of the entire robot body in the course of falldown and descent.

Still more particularly, this invention relates to a legged mobile robot in which stable highly efficient operations may be achieved by dynamically or statically controlling the characteristics of the controllers for the actuators and the actuators themselves in executing various motions of the robot body, to say nothing of the motion of rising up from the supine or prostrate position.

This application claims priority of the Japanese Patent Application No. 2002-363236 filed on Dec. 16, 2002, the Japanese Patent Application No. 2003-039560 filed on Feb. 18, 2003 and the Japanese Patent Application No. 2003-388082 filed on Nov. 18, 2003, the entireties of which are incorporated by reference herein.

A mechanical apparatus for performing motions simulating the motion of the human being, using electrical or magnetic operations, is termed a "robot". The etymology of the term robot is said to be "ROBOTA" (slave machine) of the Slavonic language. The robots started to be used extensively in this nation towards the end of the sixties. Most of the robots used were industrial robots, such as manipulators or transporting robots, aimed at automating or performing unmanned operations in plants A standstill type robot, installed and used at a fixed place, such as armed robot, is in operation only in a stationary or local working space, such as for assembling or sorting of component parts. On the other hand, the mobile robot is not limited as to a working space and is movable on a preset or undefined path in an unrestricted fashion to perform operations to take the place of human operators or to render variegated services to take the place of the human beings, dogs or other living creatures. The legged mobile robots, while being unstable and difficult to control as to its orientation or walking, as compared to crawler or tired robots, are superior in going up and down a ladder or a staircase, in riding over obstacles or walking or running flexibly on leveled or unleveled terrain.

In recent years, researches and developments in the legged mobile robots, including pet type robots, simulating the bodily mechanism or motions of animals, such as quadruples, e.g. dogs or cats, or so-called humanoid robots, simulating the bodily mechanism or motions of animals walking on two feet, such as human beings, are progressing, and expectations may be made of practical use of these types of robots.

There have so far been proposed a large number of techniques pertaining to the orientation control or stable walking concerning the robot of the type performing legged motions by walking on two legs. The stable 'walking' herein may be defined as 'motion on legs without falldown'. The robot walking on two legs are higher in the position of the center of gravity and less stable in walking than the robot walking on four legs. For this reason, the problem of orientation stabilization is particularly crucial in the case of the robot walking on two legs.

Stable orientation control of the robot is crucial in avoiding the robot's falldown. The reason is that the falldown means interruption of the operations being executed by the robot and considerable time and labor are needed until the robot rises up from the falldown state to re-start its operations, and that fatal damages may be done to the robot body and to a counterpart side object to which the falling down robot collides at the time of falldown.

During walking, the gravitational force and the inertial force as well as the moment thereof act from the walking system to the floor surface, under the force of gravity and the acceleration produced at the time of the walking motion. The "d'Alembert's principle" states that the gravitational force and the inertial force operating from a walking system to a floor surface are counterbalanced by the force of reaction from the floor surface to the walking system and the moment thereof. As a conclusion of the mechanical deduction, there exists a point for which the pitch axis moment and the roll axis moment become zero, that is, a zero moment point (ZMP), in an inner side of a supporting polygon defined by the floor contact points of the foot soles and the floor surface (see for example the non-patent publication 1). Many of the prior-art proposals pertaining to stable orientation control or prevention of falldown during walking of the robot use this ZMP as a reference in verifying the walking stability. Since the use of the ZMP as the reference in verifying the stability means handling not the force but the trajectory as a target in motion control, technical feasibility is higher. With the generation of a walking pattern on two legs, based on the ZMP standard, such merits may be derived that the foot sole contact point can be pre-set and that the kinematic constraint may more readily be taken into consideration depending on the state of the floor surface.

The control of the orientation stability of the robot, employing the ZMP as a standard for verifying the stability, basically resides in searching a zero moment point in the inside of the support polygon defined by the foot sole contact point and the floor surface (see for example the Patent Publications 1 to 5).

Of course, there may be occasions where, despite the best efforts in performing orientation stabilizing control to prevent the robot body falldown, the orientation stability of the robot is lost due to defect in the control, or unforeseen extraneous factors, such as collision against an unexpected object, protrusions or recesses of the floor surface or an obstacle, such that the robot body cannot be sustained by the moving legs, thus causing the falldown.

In case there is an impending risk of falldown of the legged mobile robot, it is possible to perform control to lower the center of gravity position of the robot to minimize the damage inflicted to the robot from the floor surface or a colliding object at the time of falldown and to the counterpart object. However, there lack up to now the discussions as to how the robot body in its entirety, including not only the leg units but also the trunk unit and the arm units, is to be operated in concert in order to suppress the damage to the minimum.

In the case of the legged mobile robot, walking upright, the reference orientation or posture is the upstanding posture on two legs, when the robot body motions, such as walking, are taken into account. For example, the most stable state, that is a point with the minimum instability, among plural upstanding postures, may be set as the basic upstanding posture.

However, for maintaining the basic upstanding posture, in stability, a driving power is needed for executing stable orientation control or generating the torque for joint axis motors for leg units by control command. That is, since the upstanding posture is not stable under power non-supplying state, it is thought to be desirable for the robot to start the rise-up motion from the physically most stable state, such as prostrate or supine posture. There arises a problem that the robot has to rise up autonomously when the power supply for the robot is turned on in the lying-down posture of the robot. It would be tiring if an operator has to extend his/her hand to lift the robot body to cause the robot to stand up.

On the other hand, the 'falldown' is unavoidable if the robot has to move in the living environment of the human being where there may be variable obstacles or there may occur unforeseeable events. In such case, it would again be tiring if an operator lends his/her hand to lift the robot body to cause the robot to stand up.

Meanwhile, a mechanical apparatus of a multi-axis driving system in general includes a large number of degrees of joint freedom, and the joint motions are realized by actuator motors. In this case, the rotational positions and the quantities of rotation of the respective motors are taken out and servo control is performed to reproduce a desired operational pattern and to exercise orientation control. From the perspective of the theory of kinematic control, it is customary that the respective axial links be controlled under the high gain PD control and that these axial links be in operation under preset characteristics.

However, as may be seen from the results of researches into motions of the human being, it is crucial for realizing stable highly efficient motions to locally increase/decrease the force and to increase/decrease the compliance of the respective joint sites (mechanical passiveness).

If the motions of the respective joint axes are comprehended as those of the position control system, it is desirable to exercise control to reduce the control offset. If conversely the motions of the respective joint axes are comprehended as a mechanical model, it is advisable to lower the gain or increase/decrease the frequency range being phase-compensated, in consideration of the action the potential energy or of the kinetic energy.

However, if such control is to be implemented on the robot body, such a function is necessary in which the characteristics of the actuators themselves and those of the controllers for the actuators are controlled dynamically and statically.

For example, there has been made a proposal in connection with a walking control apparatus for a legged mobile robot capable of walking on a known or unknown walking floor surface in stability. That is, if, in a legged mobile robot of a structure similar to the human body, walking on two legs, and having arms in an upper body portion, the frictional force is lowered on the walking floor surface, such that stability is lowered, the upper body portion may be actuated to assure or recover the stability (see for example the Patent Publication 7). However, this may be realized by controlling the feedforward gain, while no reference is made to the viscosity of the joint or to the frequency response and, additionally, there lacks the concept of the presence or absence of compliance.

[Patent Publication 1]
Japanese Laying-open Publication H5-305579

[Patent Publication 2]
Japanese Laying-open Publication H5-305581

[Patent Publication 3]
Japanese Laying-open Publication H5-305583

[Patent Publication 4]
Japanese Laying-open Publication H5-305585

[Patent Publication 5]
Japanese Laying-open Publication H5-305586

[Patent Publication 6]
Japanese Laying-open Publication H1-48170

[Patent Publication 7]
Japanese Laying-open Publication H7-205069

[Non-Patent Publication 1]
Miomir Vukobratovic, "LEGGED LOCOMOTIVE ROBOTS" (Ichiro Kato et al. "Walking Robot and Artificial Legs" (NIKKAN KOGYO SHIMBUN SHA)

SUMMARY OF THE INVEVTION

It is an object of the present invention to provide a legged mobile robot in which damages inflicted on a robot in the course of the falldown or descent may be limitlessly diminished by motion control of the entire robot body including not only the leg units but also the trunk and the arms.

It is another object of the present invention to provide a legged mobile robot in which characteristics of the actuators themselves and characteristics of the controllers for the actuators are controlled dynamically or statically during the motions of the entire robot body in the course of the falldown and descent, thereby realizing stable and highly efficient motions.

It is a further object of the present invention to provide a legged mobile robot in which characteristics of the actuators themselves and characteristics of the controllers for the actuators are controlled dynamically or statically during execution of various motions, including, first of all, the rise-up motion from the supine or prostrate posture, thereby realizing stable and highly efficient motions.

In one aspect, the present invention provides a legged articulated mobile robot including:

a plurality of movable parts which are connected to the robot;

a plurality of joints which connect the movable parts respectively;

a plurality of mobile legs having a plurality of joints;

controlling means for controlling characteristics of an actuator driving each joint, the controlling means controlling, in combination, the gain and the phase compensation of a servo controller of the actuator driving each joint and the viscous resistance of an actuator motor; and falldown motion controlling means for controlling the motion of a body of the robot while the robot falls down;

the controlling means for controlling the actuator characteristics switching, in each stage of the falldown motions, the actuator for driving each joint between first actuator characteristics in which the low range gain is of a large value, the quantity of phase lead is small and the viscous resistance of the joint is large and second actuator characteristics in which the low range gain is of a small value, the quantity of phase lead is large and the viscous resistance of the joint is of a small value.

According to the present invention, the proportional gain and the phase compensation elements in the servo controller of the actuator forming the respective sites of the legged mobile robot are adjusted, thereby optionally setting the viscosity resistance of the motor and changing robustness against disturbances, such as oscillations.

According to the present invention, the coil is intermittently switched, during the time of non-current-conduction to the coil of the actuator motor, between the short-circuited state and the open-circuited state, to adjust the viscous resistance of the motor to change the robustness against oscillatory disturbances.

Moreover, by combining the gain/phase compensation control in the servo controllers of these actuators and the control of the viscosity control of the actuator motors, it is possible to realize the frequency response of the actuators where the positioning accuracy is crucial or the frequency response of the actuators where the fast response characteristics and the compliance are crucial.

By setting the actuator characteristics to 'a large value of the low-range gain', 'a small value of the phase lead quantity in a high frequency range' and to 'a large value of the viscous resistance of the joint', it becomes possible for the means for controlling the actuator characteristics to perform high accuracy positioning control to increase the orientation stability. Thus, in each stage of the falldown motions, it is sufficient to set the characteristics of the actuators driving the respective joints, where priority is attached to the positioning accuracy, to the first actuator characteristics in which the low range gain is large, the quantity of the phase lead is small and the viscous resistance of the joint is large.

Moreover, by setting the actuator characteristics to 'a low value of the low-range gain', 'a large value of the phase lead quantity in a high frequency range' and to 'a small value of the viscous resistance of the joint', it is possible to impart mechanical passiveness and fast response characteristics, so that it is possible to perform follow-up control for the high range as the shock on the instant of contact is buffered. Thus, in each stage of the falldown motions, it is sufficient to set the characteristics of the actuators driving the respective joints, where priority is attached to the mechanical passiveness and fast response characteristics, to the second actuator characteristics in which the low range gain is small, the quantity of the phase lead is large and the viscous resistance of the joint is small.

The robot body of the legged mobile robot is a multi-link structure comprised of an interconnection of plural joint axes having substantially parallel plural degrees of joint freedom along the lengthwise direction. In the course of the falldown motion, the link state provided by the contact site of the multi-link structure is switched several times between the open link state and the closed link state. In each stage of the switching of the link states, the preferential characteristics for the actuators for driving the respective joints are switched between the positioning accuracy, mechanical passiveness and the fast response characteristics. Thus, it is sufficient to switch between the first and second actuator characteristics correspondingly.

It is noted that, during the operations on legs in the upstanding posture, the legged mobile robot detects the external force applied to the robot body by a floor reaction force sensor or a floor acceleration sensor mounted to the foot soles, or by an acceleration sensor mounted to the waist of the body trunk. Based on the external force, thus detected, an ZMP equilibrium equation is set, and the ZMP trajectory is scheduled at all times so that the ZMP corresponding to the counterbalanced position of the moments applied to the robot body is on or within the inner area of a support polygon formed by the foot sole contact points and the floor surface, in such a manner as to achieve stable posture control of the robot body.

However, there are occasions wherein the moment error on the ZMP equilibrium equation cannot be canceled due to the excessive external force applied to the robot body or to the non-optimum floor surface state, such that it is difficult or impossible to arrange the ZMP in the support polygon based on the ZMP trajectory schedule. In such case, the legged mobile robot of the present embodiment refrains from stable orientation control of the robot body to execute preset falldown motion, in such a manner as to suppress the damage to the robot body on the occasion of the descent to the floor surface to a minimum.

On falldown, the contact site is searched for searching changes per time $\Delta t$ of an area S of a support polygon formed by contact points of the robot body and the floor surface, and a target contact point on which the site selected by the target contact point setting means is to be placed is set, so that the variation $\Delta S/\Delta t$ per time $\Delta t$ of the area S of a support polygon formed by a contact point of the robot body and the floor surface may be minimized. The selected site is placed on the so set target contact point. With the selected site thus placed in position, the size of the newly formed support polygon is increased further.

Until the time the potential energy of the robot body is smallest, and the falldown motion comes to a close, the site corresponding to the smallest value of $\Delta S/\Delta t$ is searched. The motion of placing the site on the target contact point corresponding to the minimum value of $\Delta S/\Delta t$ and the motion of enlarging the size of the newly formed support polygon are carried out repeatedly.

By observing the guideline of minimizing the variation $\Delta S/\Delta t$ per time $\Delta t$ of the area S of the support polygon and maximizing the support polygon on descent onto the floor surface, it is possible to scatter the impact applied from the floor surface on descent to suppress the damage to the minimum.

The controlling means for controlling the actuator characteristics in each stage of the falldown motion sets the actuators for driving the respective joints, taking part in controlling the stable area, to first actuator characteristics in which the low range gain is large, the quantity of the phase lead is small and the viscous resistance of the joint is large, whereby these joint sites may be positioned to high accuracy in a controlled fashion to increase the posture stability. This assures the positioning accuracy of the joints as main component for controlling the quantity $\Delta S/\Delta t$ as a reference in controlling the falldown motions of the robot body to increase the motion stability.

The controlling means for controlling the actuator characteristics in each stage of the falldown motion switches the actuators for driving the respective joints, taking part in controlling the potential energy, from the first actuator characteristics in which the low range gain is large, the quantity of the phase lead is small and the viscous resistance of the joint is large, to second actuator characteristics, in which the low range gain is small, the quantity of the phase lead is large and the viscous resistance of the joint is small, thereby imparting mechanical passiveness (compliance) and fast response characteristics.

As a result, when the passive motion of exploiting the potential energy is performed by the leg, it becomes possible to effect follow-up control for the high frequency range as mechanical passiveness (compliance) is maintained.

Moreover, the characteristics of the actuators for driving the respective joints, taking part in driving the respective joints, taking part in buffering the impact on contact, to the second actuator characteristics in which the low range gain is small, the quantity of the phase lead is large and the viscous resistance of the joint is small, thereby imparting mechanical passiveness (compliance) and fast response characteristics.

As a result, the mechanical passiveness (compliance) is imparted at the instant of contact, whereby the entire robot becomes a soft system, and hence the impact applied to the entire robot body may be buffered.

In another aspect, the present invention provides a legged articulated mobile robot including:

a plurality of movable parts which are connected to the robot;
a plurality of joints which connect the movable parts respectively;
a plurality of mobile legs having a plurality of joints;
controlling means for controlling characteristics of an actuator driving each joint, the controlling means controlling, in combination, the gain and the phase compensation of a servo controller of the actuator driving each joint and the viscous resistance of an actuator motor; and
rise-up motion controlling means for controlling the rise-up motion of a body of the robot from a lying-down posture of the robot;
the controlling means for controlling the actuator characteristics switching, in each stage of the rise-up motions, the actuator for driving each joint between first actuator characteristics in which the low range gain is of a large value, the quantity of phase lead is small and the viscous resistance of the joint is large and second actuator characteristics in which the low range gain is of a small value, the quantity of phase lead is large and the viscous resistance of the joint is of a small value.

According to the present invention, the proportional gain and the phase compensation element are adjusted in the servo controller of the actuator forming the respective joint sites of the legged mobile robot, whereby it is possible to optionally set the positioning accuracy, mechanical passiveness (compliance) and the operating speed as required in relevant joint sites of the robot.

By intermittently switching the coil of the actuator motor between the short-circuited state and the open-circuited state, it is possible to adjust the viscous resistance of the motor to change the robustness against oscillatory disturbances.

Moreover, by combining the gain/phase compensation control in the servo controller of the actuator motor and the control of the viscous resistance of the actuator motor, it is possible to obtain the frequency response of the actuator that may be applied to the sites where positioning accuracy is crucial and the frequency response of the actuator that may be applied to the sites where fast response characteristics and the compliance are crucial.

The controlling means for controlling the actuator characteristics sets the actuator characteristics to 'a large value of the low-range gain', 'a small value of the phase lead quantity in a high frequency range' and to 'a large value of the viscous resistance of the joint', so that high precision positioning becomes possible to increase posture stability. Thus, in each stage of the rise-up motion of the robot body, the characteristics of the actuator driving the joints, where priority is attached to the positioning accuracy, to first actuator characteristics in which the low range gain is large, the quantity of the phase lead is small and the viscous resistance of the joint is large.

The controlling means for controlling the actuator characteristics sets the actuator characteristics to 'a small value of the low-range gain', 'a large value of the phase lead quantity in a high frequency range' and to 'a small value of the viscous resistance of the joint', so that mechanical passiveness and fast response characteristics may be achieved and hence the follow-up control for the high frequency range may be achieved as the shock on contact is buffered. Thus, in each stage of the rise-up motion of the robot body, the characteristics of the actuator driving the joints where the priority is placed on mechanical passiveness or fast response characteristics to second actuator characteristics in which the low range gain is small, the quantity of the phase lead is large and the viscous resistance of the joint is small, during the time until the links are placed on the floor to form a narrower contact polygon.

The robot body of the legged mobile robot is formed by a multi-link structure comprised of an interconnection of substantially parallel plural degrees of joint freedom along the lengthwise direction. In the course of the rise-up motion, the link state defined by the contact sites of this multi-link structure and the floor surface are switched several times between the open-link state and the closed link state. In each stage of the switching of the link states, the preferential characteristics of the actuators driving the respective joints are switched between the positioning accuracy, mechanical passiveness and the fast response characteristics. Thus, it is sufficient to switch between the first and second actuator characteristics accordingly.

The link structure is comprised of at least the shoulder joint pitch axis, body trunk pitch axis, hip joint pitch axis and the knee pitch axis, interconnected along the height of the robot body. Of course, the robot body of the legged mobile robot may be provided with other joint pitch axes. In addition, the respective joint sites may be provided with the degrees of freedom about the roll and yaw axes in addition to the pitch axis.

The rise-up motion control means includes means for searching, in a lying-down state in which two or more contact links, including a center-of-gravity link, operating as the center of gravity of the robot body, contact the floor, the narrowest contact polygon, as a support polygon, formed by the smallest number of the links among the contact polygons formed by the contact links, means for causing a contact link(s) other than the searched support polygon to clear the floor, means for bending two or more continuing floor-clearing links, and for causing the ends of the links to be placed on the floor to form a narrower contact polygon, and means for causing one or more preset number of links to clear the floor from one end of the link structure responsive to the support polygon becoming sufficiently narrow to set the robot body upright. The polygons formed by plural ends of the robot body contacting the floor surface are termed contact polygons. The contact polygon where there is the ZMP is termed a support polygon. The ZMP stable area is an area within which the robot posture, for example, may be controlled in stability within the support polygon.

In the basic lying-down posture, such as the supine or prostrate posture, of the legged mobile robot, all of the links interconnecting the joint pitch axes, body trunk pitch axis, hip joint pitch axis and the knee pitch axis, are contacting the floor. In the basic upstanding posture or the walking posture, all of the links interconnecting the joint pitch axis, body trunk pitch axis, hip joint pitch axis and the knee pitch axis clear the floor and are aligned substantially in the perpendicular direction.

In rise-up for transferring from the lying-down posture to the upstanding posture, a higher torque output is required of the relevant joint actuators than in case of keeping up the usual upstanding posture or performing walking motions. Thus, the rise-up motion can be achieved with a lesser driving torque by carrying out the rise-up motion by exploiting the posture which minimizes the ZMP support polygon.

In the lying-down posture in which almost all of the links contact the floor, the narrowest contact polygon, as a support polygon, is searched from among the plural contact polygons formed by the contact links. It is then checked whether or not the ZMP is schedulable when at least two links are caused to clear the floor. For example, the link interconnecting the body trunk pitch axis and the hip joint pitch axis is kept in the contact state, as a center-of-gravity link, and a narrower support polygon is searched. It is then tried to cause the two or more consecutive links from one side including the shoulder joint pitch axis to clear the floor.

Then, from the one end of the contact polygon, two or more consecutive links are caused to clear the floor, except the contact link serving as the support polygon. From the one end, one or more floor clear links are bent and the ends of the links are caused to contact the floor to form a narrower contact polygon. For example, two or more links from the one end of the link structure, including the shoulder joint, are caused to clear the floor as links not taking part in the support polygon. As two or more links, including the shoulder joint, clear the floor, the links are bent at the shoulder joint pitch axis, so that the hand ends as the link ends are caused to contact the floor. The hand ends are caused to approach to the body trunk pitch axis, as the center-of-gravity position of the robot body, to form a contact polygon narrower than that in the original lying-down posture.

In this contact polygon, the narrowest support polygon is searched. At least two links are caused to clear the floor, from the opposite end, to check whether or not the ZMP is schedulable. It is now attempted to cause two or more links, which are consecutive from the opposite end, to clear the floor. It is then checked whether or not the ZMP is schedulable. For example, it is attempted to cause two or more links, consecutive from the opposite end, including the knee joint pitch axis, to clear the floor, as the center-of-gravity link, interconnecting the body trunk pitch axis and the hip joint pitch axis, is kept in the contact state.

Then, from the other end of the contact polygon, two or more consecutive links are caused to clear the floor, except the contact links serving as the support polygon. From the one end, one or more floor clear links are bent and the ends of the links are caused to contact the floor to form a narrower contact polygon. For example, two or more links, including the shoulder joint, are caused to clear the floor as links not taking part in the support polygon. As two or more links, including the knee joint, clear the floor, the links are bent at the shoulder joint pitch axis, so that the hand ends as the link ends are caused to contact the floor. The hand ends are caused to approach to the body trunk pitch axis, as the center-of-gravity position of the robot body, to form a contact polygon narrower than that in the original lying-down posture.

It is then checked whether or not the support polygon is sufficiently narrow, depending on whether or not the center-of-gravity link is able to clear the floor, as the ends of both links of the contact polygon contact the floor. For example, it is checked whether or not the support polygon is sufficiently narrow, depending on whether or not the center-of-gravity link interconnecting the body trunk pitch axis and the hip joint pitch axis is able to clear the floor.

Responsive to the support polygon, formed by the contact sites, becoming sufficiently narrow, the center-ofravity link is caused to clear the floor as the both link ends of the support polygon contact the floor. As the ZMP is maintained in the support polygon, formed by the contact links of both link ends, the separation of the ends of the support polygon at both link ends is narrowed to move the ZMP to the opposite end of the link structure. As the hand ends and the foot soles as ends of both links of the contact polygon contact the floor, the center-of-gravity link interconnecting the body trunk pitch axis and the hip joint pitch axis is caused to clear the floor, and the separation between the hand ends and the foot soles is narrowed gradually, to cause the ZMP to be moved towards the foot soles.

Responsive to intrusion of the ZMP into the inside of the contact polygon formed solely by not larger than a second preset number of the contact links, from the opposite side of the link structure, a number of links not less than a first preset number of links are caused to clear the floor, from the one end of the link structure, as the ZMP is held within the contact polygon. The contact links are then extended in the lengthwise direction to complete the rise-up operation. For example, responsive to intrusion of the ZMP into the inside of the contact polygon formed by the foot soles, a number of links from the shoulder pitch axis to the knee pitch axis are caused to clear the floor, as the ZMP is held within the contact polygon. The contact links are then extended in the lengthwise direction to complete the rise-up operation.

In each stage of the rise-up motions of the robot body, the means for controlling the actuator characteristics may set the characteristics of the actuators, driving the joints of the contact link taking part in searching the narrowest support polygon, to the first actuator characteristics in which the low frequency range gain is large, the quantity of the phase lead is small and the viscous resistance of the joint is large.

By setting the large low frequency range gain, the small quantity of the phase lead and the large viscous resistance of the joint, high precision positioning is possible, thus assuring the precision of the size of the support polygon.

The means for controlling the actuator characteristics may set the characteristics of the actuators, driving the respective joints of the floor clear links, not taking part in the support polygon, from the second actuator characteristics in which the low range gain is small, the quantity of the phase lead is large and the viscous resistance of the joint is small, during the time until contact to form a narrower contact polygon, to the first actuator characteristics in which the low range gain is large, the quantity of the phase lead is small and the viscous resistance of the joint is large, after contact.

By imparting the mechanical passiveness (compliance) and fast response characteristics to the relevant joint sites, the motions of the arms and the legs or the contact motions become smoother, while the energy consumption may be diminished, in the course of the motions for sequentially forming a narrower contact polygon for rise-up.

The means for controlling the actuator characteristics may also be responsive to the support polygon becoming sufficiently narrow to set the actuators driving the joints taking part in the motions of setting the robot body upright to the first actuator characteristics in which the low range gain is large, the quantity of the phase lead is small and the viscous resistance of the joint is large.

By setting the actuators of the relevant joint sites so that the low range gain is of a large value, the quantity of the phase lead is small and the viscous resistance of the joint is of a large value, high precision positioning becomes possible, such that stable orientation control on reversion to the upstanding posture may be achieved.

According to the present invention, there may be provided a legged mobile robot in which the damage inflicted to the robot in the course of falldown or descent may be limitlessly reduced by motion control of the entire robot body including not only the leg units but also the body trunk unit and the arm units.

According to the present invention, there may be provided a legged mobile robot in which, during the motions of the entire robot body in the course of falldown or descent, characteristics of the actuators themselves and the characteristics of the controllers for the actuators may be dynamically or statically controlled to realize stable highly efficient motions.

According to the present invention, there may be provided a legged mobile robot in which the robot may be erected autonomously from the lying-down posture, such as the supine or prostrate posture, to restore the upstanding position.

According to the present invention, there may also be provided a legged mobile robot in which the characteristics of the actuators themselves and the characteristics of the controllers for the actuators may be dynamically or statically controlled during execution of various motions including, of course, the rise-up motion from the supine or prostrate posture, thereby realizing stable highly efficient motions.

Other objects, advantages and features of the present invention will become more apparent from the following description of the preferred embodiments of the invention and the drawings.

BRIEF DESCRIPTION OF THE DRAWINGS

FIGS. 26 to 31 show the process of an actual robot body falling down from an upstanding posture to a supine posture.

FIGS. 35 to 39 show the process of the actual robot body falling down from the upstanding posture to the prostrate posture.

FIGS. 43 to 52 show the process of the actual robot body rising up from the supine posture.

FIGS. 54 to 61 shows the process of the actual robot apparatus rising up from the prostrate posture.

FIG. 62 shows output characteristics of transistor control signals of the auxiliary circuit supplied with BRAKE_PWM control signals, having a predetermined duty ratio, along with coil current waveform characteristics and torque output characteristics.

DESCRIPTION OF THE PREFERRED EMBODIMENTS

Figure 1:
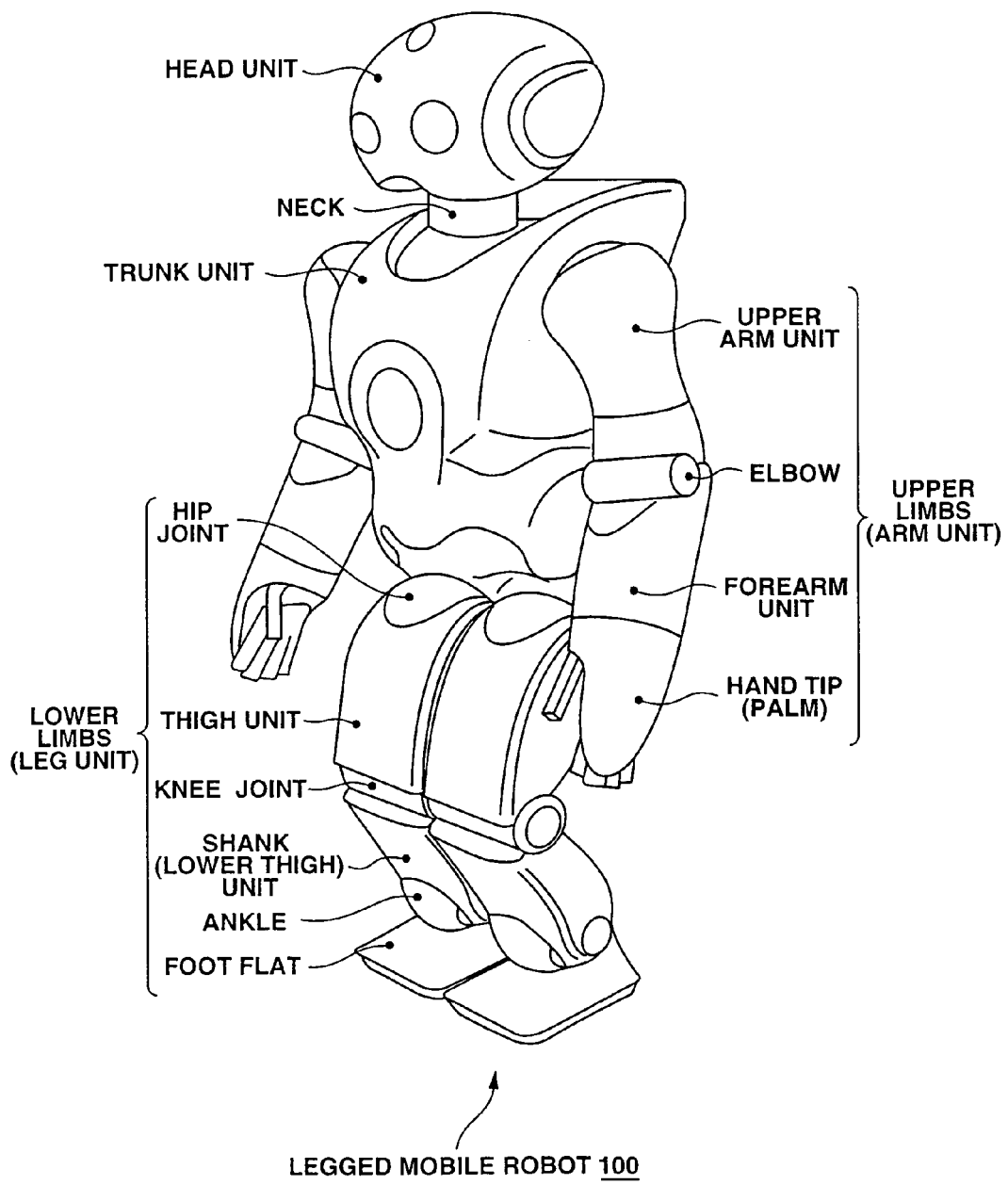
FIG. 1 shows a legged mobile robot, embodying the present invention, in the erected state, as the robot is viewed from the front side.

Referring to the drawings, certain preferred embodiments of the present invention will be explained in detail.

A. Mechanical Structure of Legged Mobile Robot

Figure 2:
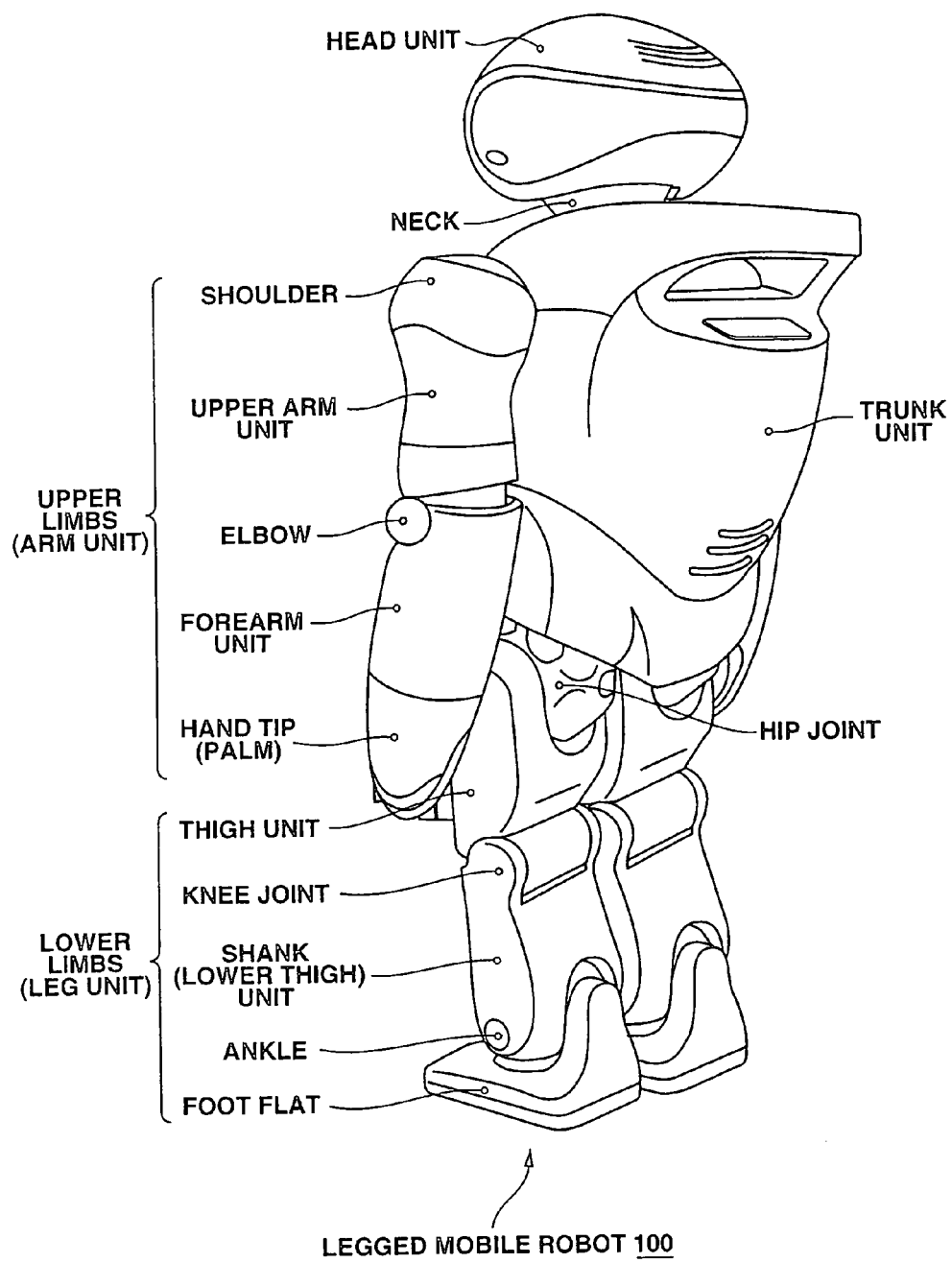
FIG. 2 shows the legged mobile robot, embodying the present invention, in the erected state, as the robot is viewed from the back side.

FIGS. 1 and 2 show the erected state of a "humanoid" robot, according to the present invention, as the robot is viewed from the front side and from the back side, respectively. As shown, the legged mobile robot is composed of a body trunk unit, a head unit, left and right upper limbs and left and right lower limbs, responsible for performing the legged motion, and has the motions comprehensively controlled by a controller enclosed e.g. in the body trunk unit, although such controller is not shown.

Each of the left and right lower limbs is made up by a thigh unit, a knee joint, a shank unit, an ankle unit and a foot flat, and is connected to approximately the lowermost end of the body trunk unit by the hip joint. Each of the left and right upper limbs is made up by an upper arm unit, an elbow joint and a forearm unit, and is connected to upper left and right side edges of the body trunk unit by the shoulder joint. The head unit is connected by the neck joint to approximately the uppermost mid point of the body trunk unit.

The controller is a casing carrying a driving controller for respective joint actuators making up the legged mobile robot, a control unit (main control unit) for processing external inputs from respective sensors, as later explained, and a power supply circuit or the other peripheral devices. The controller may also include a communication interface or a communication device for remote control. It is noted that the driving controller herein means a controller for controlling the actuator servo gain or viscosity in addition to controlling the angular positions or angular accelerations of the joint angles.

The legged mobile robot, constructed as described above, is able to walk on both feet by concerted motion control for the whole body by a controller. Such walking on both feet may be achieved in general by repetition of a walking period divided into the following operating time intervals:

(1) the time interval when the robot is supported on the left foot, with the right foot being in a flight state;
(2) the time interval when the robot is supported on the both feet, with the right foot contacting the floor;
(3) the time interval when the robot is supported on the right foot, with the left foot being in a flight state; and
(4) the time interval when the robot is supported on the both feet, with the left foot then contacting the floor.

The walking control in the legged mobile robot is realized by scheduling a target trajectory for the lower limbs at the outset and by correcting the scheduled trajectory during the aforementioned respective operating time intervals. That is, during the time interval when the robot is supported on the both legs, the correction of the trajectory for the lower limbs is halted to correct the height of the waist part to a predetermined value with use of a total correction quantity for the scheduled trajectory. On the other hand, during the time interval when the robot is supported on the sole foot, a correction trajectory is generated for restoring the position relationships of the ankle unit of the leg being corrected and the waist part to the scheduled trajectory.

During walking, the gravitational force and the inertial force as well as the moment thereof act from the walking system to the floor surface, under the force of gravity and the acceleration produced at the time of the walking motion. The "d'Alembert's principle" states that the gravitational force and the inertial force operating from a walking system to a floor surface are counterbalanced by the force of reaction from the floor surface to the walking system and the moment thereof. As a conclusion of the mechanical deduction, there exists a point for which the pitch axis moment and the roll axis moment become zero, that is, a zero moment point (ZMP), in an inner side of a supporting triangle defined by the floor contact points of the foot soles and the floor surface.

Figure 3:
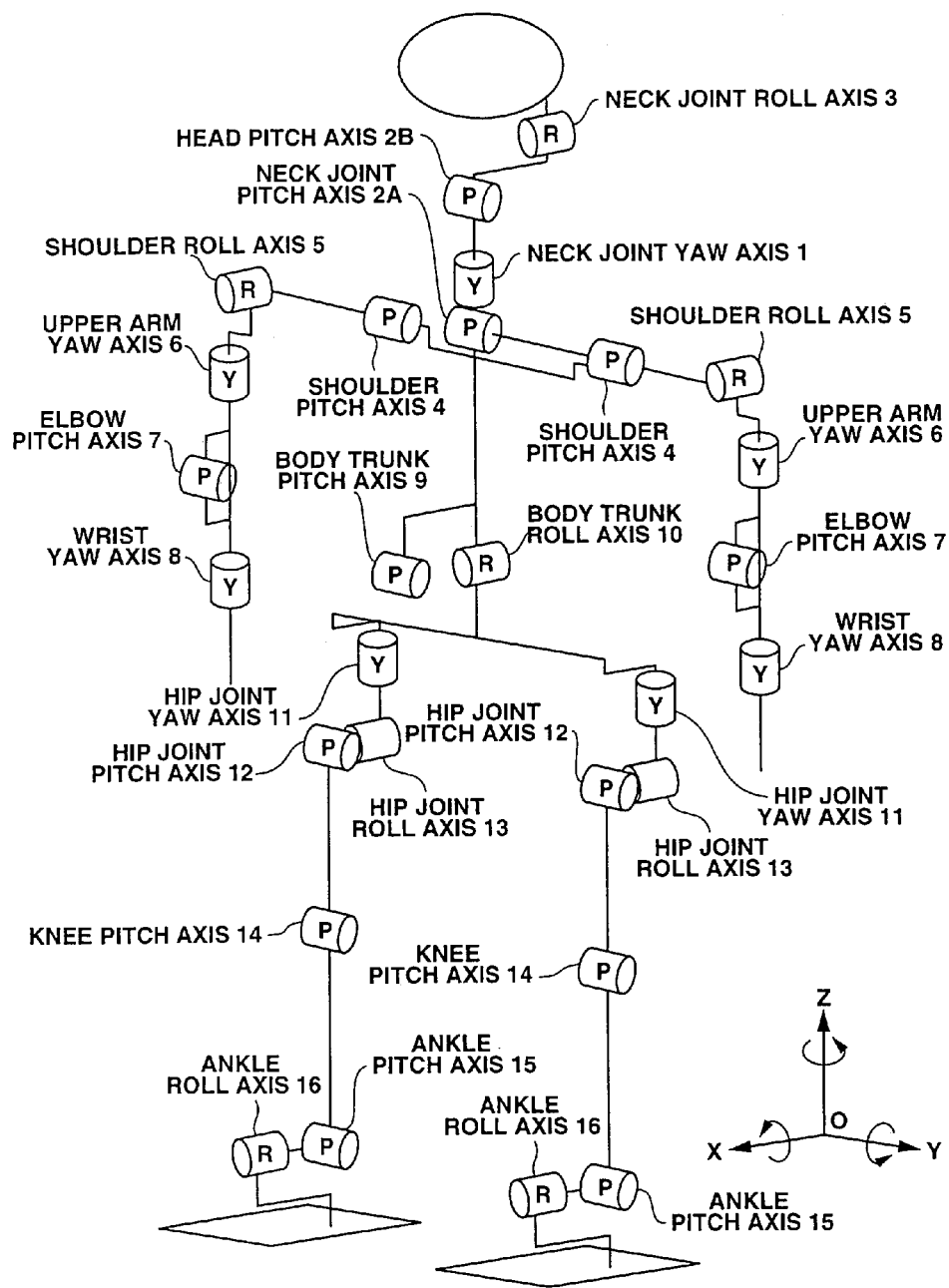
FIG. 3 schematically shows the degree of freedom structure provided to the legged mobile robot.

FIG. 3 schematically shows an illustrative structure of the degrees of the joint freedom owned by this legged mobile robot. As shown in this figure, the legged mobile robot 100 is a structural unit including plural limbs, more specifically, a structural unit made up by upper limbs, inclusive of two arm units and a head unit, lower limbs, made up by two legs, responsible for motion operations, and a body trunk unit interconnecting the upper and lower limbs.

The neck joint, carrying the head unit, has four degrees of freedom, namely a neck joint yaw axis 1, first and second neck joint pitch axes 2A and 2B and a neck joint roll axis 3.

Each arm unit has, as sites degrees of freedom, a shoulder joint pitch axis 4 in a shoulder, a shoulder joint roll axis 5, an upper arm yaw axis 6, an elbow joint pitch axis 7, in an elbow, a wrist joint yaw axis 8, in a wrist, and a hand unit.

In actuality, the hand unit is a multi-joint multi-degree-of-freedom structure, including plural fingers.

The body trunk unit 2 has two degrees of freedom, namely a body trunk pitch axis 9 and a body trunk roll axis 10.

The respective legs, making up the lower limbs, are made up by a hip joint yaw axis 11, in a hip, a hip joint pitch axis 12, a hip joint roll axis 13, a knee joint pitch axis 14, in a knee, an ankle joint pitch axis 15 in an ankle, an ankle joint roll axis 16 in the ankle, and a foot unit.

The site in the vicinity of the waist part, corresponding to the pelvis, interconnecting the left and right hip joints, is termed a "basic body portion". The basic body portion has a large weight mass to act upon and consequently is a crucial control target point in controlling the orientation stability in the legged mobile robot.

B. Control System Configuration of the Legged Mobile Robot

Figure 4:
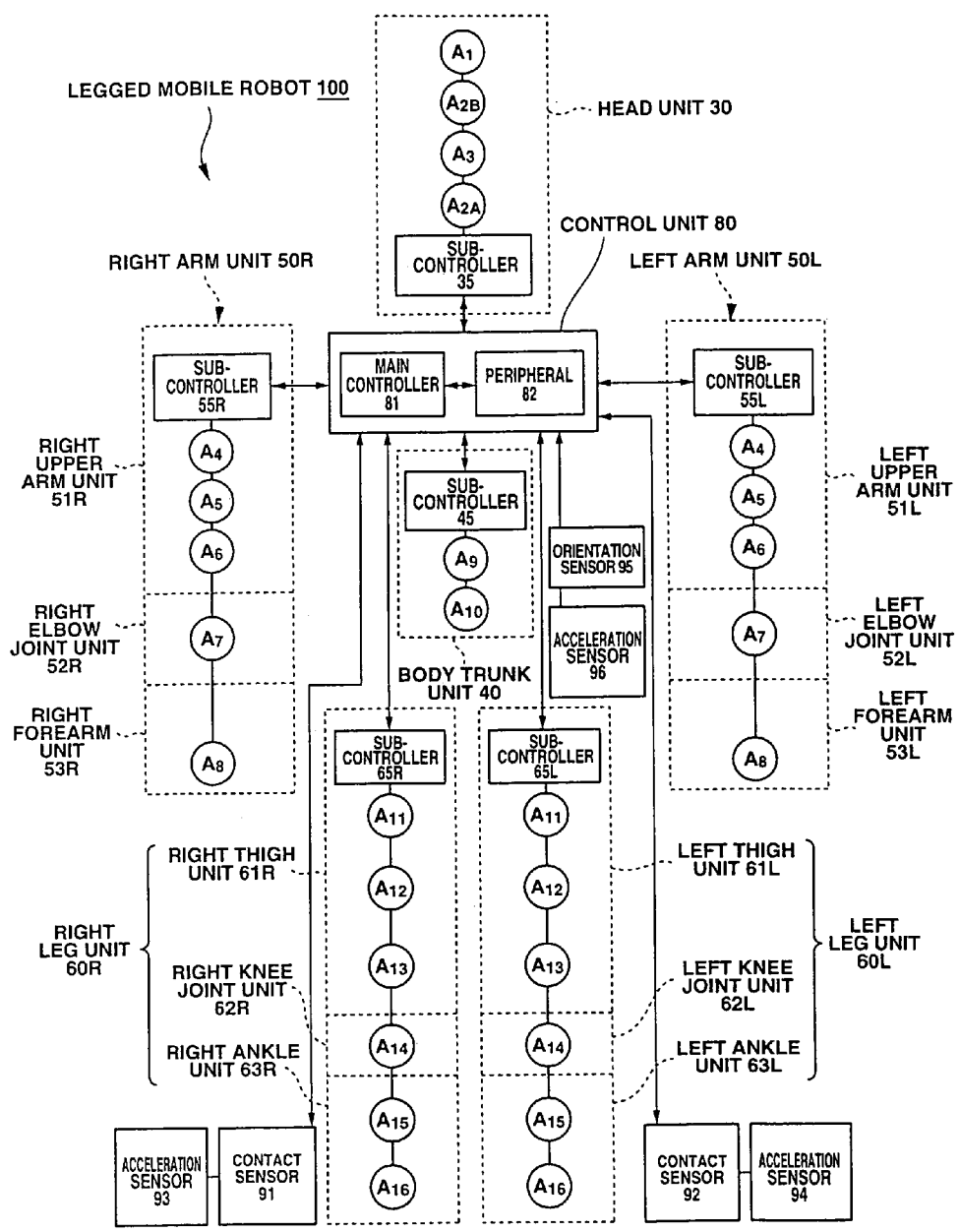
FIG. 4 schematically shows the control system configuration of the legged mobile robot 100.

FIG. 4 schematically shows a control system configuration of the legged mobile robot 100. As shown in this figure, the legged mobile robot 100 is made up by mechanical units 30, 40, 50R/L and 60R/L, representing the four limbs of the human being, and a control unit 80, performing adaptive control for realizing concerted motions among the respective mechanical units of the robot. It is noted that R and L denote suffices indicating right and left, respectively.

The overall motions of the legged mobile robot 100 are comprehensively controlled by the control unit 80. The control unit 80 is made up by a main controller 81, formed by main circuit components, not shown, such as a central processing unit (CPU) or a memory, and a peripheral circuit 82, including a power supply unit, not shown, and an interface, also not shown, for exchanging data or commands with the respective component elements of the robot 100.

In working out the present invention, there is no particular limitation to mounting sites for the control unit 80. Although the control unit is mounted in the body trunk unit 40, in the embodiment shown in FIG. 4, the control unit may also be mounted to the head unit 30. Or, the control unit 80 may be mounted outside the legged mobile robot 100 for wired or wireless communication with the body member of the legged mobile robot 100.

The degrees of freedom of the respective joints of the legged mobile robot 100, shown in FIG. 3, are implemented by relevant electrical motors or other types of the actuators. That is, the head unit 30 is provided with a neck joint yaw axis actuator $A_1$, first and second neck joint pitch axis actuators $A_{2A}$, $A_{2B}$ and a neck joint roll axis actuator $A_3$, representing the neck joint yaw axis 1, first and second neck joint pitch axes 2A, 2B and a neck joint roll axis 3, respectively.

The body trunk unit 40 is provided with a body trunk pitch axis actuator $A_9$ and a body trunk roll axis actuator $A_{10}$ representing a body trunk pitch axis and a body trunk roll axis, respectively.

The arm units 50R/L, subdivided into upper arm units 51R/L, elbow joint units 52R/L and forearm units 53R/L, are provided with shoulder joint pitch axis actuators $A_4$, shoulder joint roll axis actuators $A_5$, upper arm yaw axes actuators $A_6$, elbow joint pitch axes actuators $A_7$, and wrist joint yaw axis actuators $A_8$, representing the degrees of freedom of the shoulder joint pitch axis 4, shoulder joint roll axis 5, upper arm yaw axis 6, elbow joint pitch axes 7 and the wrist joint yaw axis 8, respectively.

The leg units 60R/L, subdivided into thigh units 61R/L, knee units 62R/L and shank units 63R/L, are provided with a hip joint yaw axis actuator $A_{11}$, a hip joint pitch axis actuator $A_{12}$, a hip joint roll axis actuator $A_{13}$, a knee joint pitch axis actuator $A_{14}$, an ankle joint pitch axis actuator $A_{15}$ and an ankle joint roll axis actuator $A_{16}$, representing the degrees of freedom of a hip joint yaw axis 11, a hip joint pitch axis 12, a hip joint roll axis 13, a knee joint pitch axis 14, an ankle joint pitch axis 15 and an ankle joint roll axis 16, respectively.

The actuators $A_1$, $A_2$, $A_3$, . . . , used for the respective joints, may preferably be each constructed by a small-sized AC servo actuator of the type in which the actuator is directly coupled by a gearing and including a servo control system arranged as a one-chip device and loaded in this form in the motor unit. This sort of the AC servo actuator is disclosed for example in the Japanese Laying-Open Patent Publication 2000-299970 (Japanese Patent Application H-11-33386) already assigned to the present Assignee.

For respective structural units, such as head unit 30, body trunk unit 40, leg unit 50 and leg unit 60, sub-controllers 35, 45, 55 and 65 are provided for driving controlling the respective actuators.

Within the body trunk unit 40 of the robot body, there are provided an acceleration sensor 95 and an orientation sensor 96. The acceleration sensor 95 is arranged in each of the X-axis, Y-axis and Z-axis directions. By providing the acceleration sensor 95 to the waist part of the robot body, it is possible to set the waist part, having a large weight mass to act on, that is a basic body portion, as a control target point, in order to directly measure the orientation or acceleration on the site, so as to perform orientation stabilizing control on the basis of the ZMP.

The respective legs 60R, 60L are provided with floor contact check sensors 91, 92 and acceleration sensors 93, 94, respectively. The floor contact check sensors 91, 92 are formed by mounting a pressure sensor on each foot sole, such that, by the presence or absence of the force of reaction from the floor, it can be detected whether or not the foot sole has contacted the floor. The acceleration sensors 93, 94 are mounted at least in the directions along the X and Y axes, respectively. By mounting the acceleration sensors 93, 94 at the left and right feet, the ZMP equation can be directly set at the feet closest to the ZMP position.

If the acceleration sensor is provided only at the waist part having a large weight mass to act on, the waist part, that is, the basic body portion, becomes a direct control target point. The state of the feet then needs to be relatively determined on the basis of the results of calculations of this control target point, such that the following conditions between the foot parts and the floor surface:

(1) that the floor surface is not moved under any load or torque applied; and
(2) that the frictional coefficient against translational motion on the floor surface is sufficiently large such that slip is not likely to be produced, need to be satisfied as a premise.

Conversely, with the present embodiment, a reaction force sensor system, such as a floor reaction force sensor, for directly measuring the ZMP and the force, a local coordinate used for control and an acceleration sensor for directly measuring the coordinate, are arranged in the foot unit, which is the site of contact with the floor surface. As a consequence, the ZMP equilibrium equation can be directly set at the foot unit closest to the ZMP position, and hence more strict stable orientation control, independent of the aforementioned premises, may be achieved at a higher speed. The result is that stable walking (motions) of the robot body may be assured even on a gravel or on a thick carpet, where the floor surface tends to be moved under application of a force or torque, or on a tile of a residence where the frictional coefficient of translational motion cannot be sufficiently procured such that slip is likely to be produced.

The main controller 80 is able to respond to the outputs of the sensors 91 to 96 so as to dynamically correct the control target. More specifically, each of the sub-controllers 35, 45, 55 and 65 can be adaptively controlled to realize a general body motion in which the upper limbs, body trunk unit and the lower limbs of the legged mobile robot 100 are actuated in concert.

For achieving the general body motions of the robot body of the robot 100, the motion of the foot units, ZMP trajectory, motion of the body trunk unit, motion of the upper limbs and the height of the waist part, are set, and a command for instructing the motions conforming to the setting contents is transmitted to each of the sub-controllers 35, 45, 55 and 65. These sub-controllers 35, 45, . . . construe the commands received from the main controller 81 to output a driving control signal to each of the actuator $A_1, A_2, A_3, \ldots$. It should be noted that ZMP is the point on the floor surface where the moment due to the force of reaction from the floor during the walking becomes zero, and that the "ZMP trajectory" herein means a trajectory along which the ZMP moves during the walking period of the robot 100.

C. Control of Actuator Characteristics

C-1. Operating Speed and Mechanical Passiveness of Actuator

The robot body of the legged mobile robot 100 may be grasped as a structure in which plural joint axes having substantially parallel degrees of the joint freedom are interconnected along the lengthwise direction. During the legged motions, such as walking, falldown, or the stand-up motion from the falldown posture, the linking state which the floor-contact site of the multi-link structure makes with the floor surface is changed over several times from the open-link state to the closed-link state and vice versa.

In the specification of the Japanese Patent Application 2001-233691, already transferred to the present Assignee, there is disclosed a legged mobile robot which performs high-speed switching operations from the open-link state to the closed-link state and vice versa against the external field and a subject of action. Specifically, in a robot having limbs constituted by one or more rotational joints, each of which may be provided with two or more degrees of freedom, each leg of the robot is provided with a minimum number of degrees of passive freedom, such as backlash of a speed reducing unit, necessary for removing dynamic closure errors. Moreover, the range of possible motions of each leg is supervised appropriately. Even in case the actuator driving the joints is not provided with means for acquiring the torque information, the high-speed switching operation from the open-link state to the closed-link state and vice versa may be realized in stability. This high-speed switching operations from the open-link state to the closed-link state and vice versa is realized in a robot walking on two legs by mounting a geared motor on a site with a small backlash in the vicinity of the reference coordinate for the waist part and by mounting a geared motor with a large backlash on a site close to the hand or foot tip to achieve optimum characteristics, thereby optimizing the robot design.

As a second method for optimizing the robot against switching of the link state during the operating period, the open loop gain of a position servo compensator in each joint axis actuator is optionally adjusted to control the amount of offset of position errors. That is, in case the quantity of the backlash is uniform, the servo offset due to a large or small value of the servo gain, presumed to correspond to the quantity of the backlash, is controlled to achieve the degree of passive freedom for removing the dynamic closure error.

In the present embodiment, the latter method for optimizing the robot is further expanded such that not only the proportional gain of a servo controller but also the phase compensation element is adjusted on each site of the joint.

Figure 5:
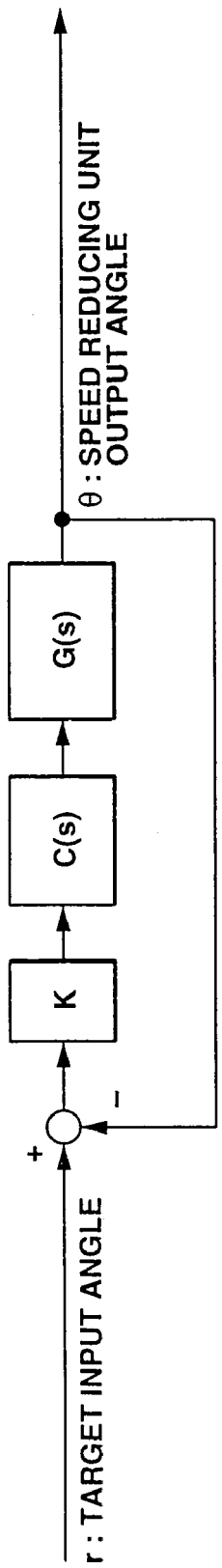
FIG. 5 shows the configuration of a servo controller of an actuator.
Figure 6:
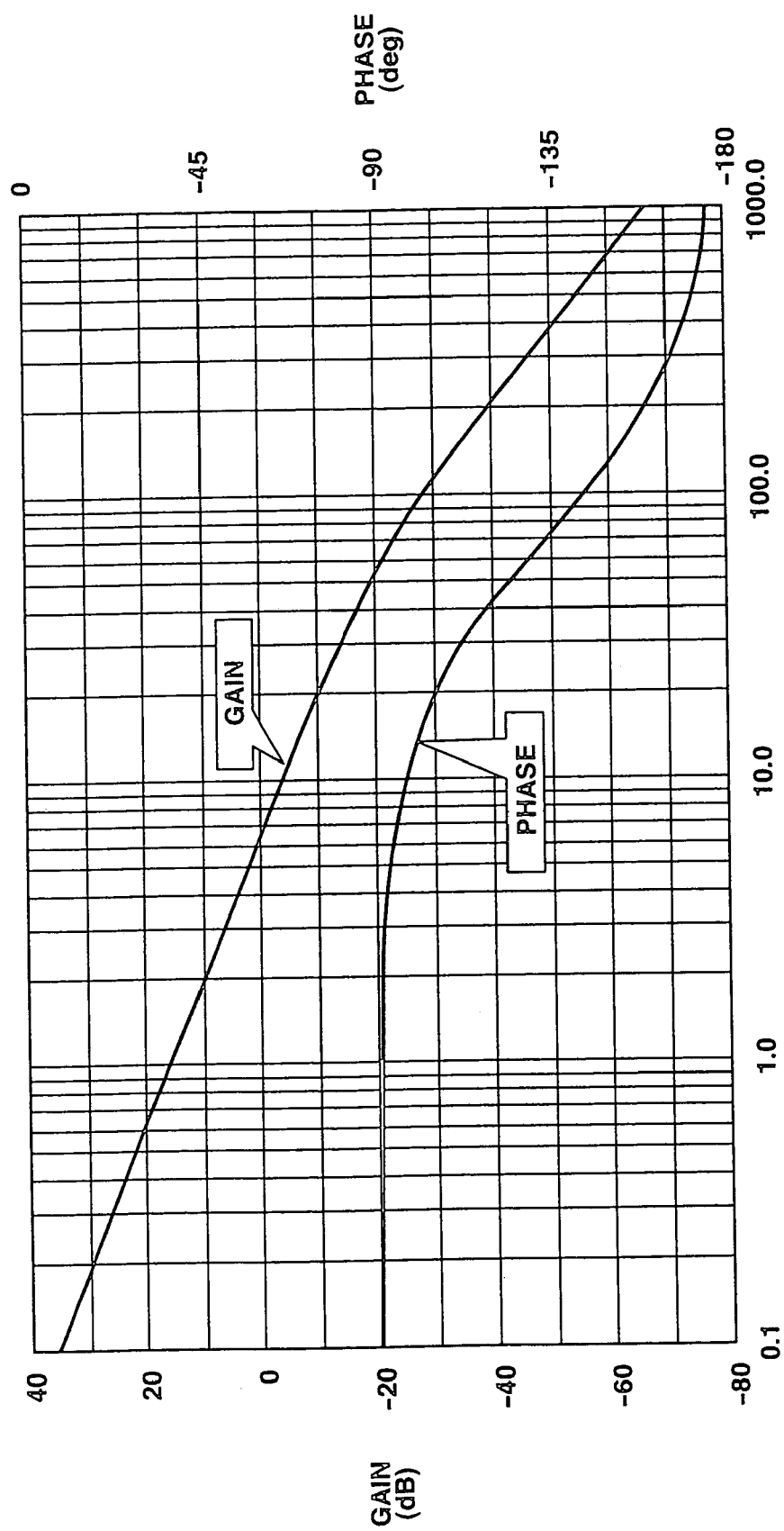
FIG. 6 shows the frequency response of the gain and the phase of a transfer function representing model of a motor and a speed reducing unit shown in FIG. 5.

FIG. 5 shows the structure of the servo controller of an actuator. As shown in this figure, the servo controller has two control elements, namely a proportional gain K of serial compensation and a phase compensation element C(s), such that not only the proportional gain but also the phase compensation element is adjusted on each joint site. FIG. 6 shows the frequency response of the gain and the phase of a model, expressed by a transfer function, as to a motor and a speed reducing unit shown in FIG. 5.

The phase compensation element is expressed by the following equation (1), $$C(s) = \frac{\sum_{i=0}^{m} b_i \cdot s^i}{\sum_{i=0}^{n} a_i \cdot s^i} \quad (1)$$

where n and m are optional natural numbers, $a_i$ and $b_i$ are optional real numbers, which are equivalent to the feedback gain in case these numbers express status variables, and s is a Laplace operator.

The model G(s) of the motor and the speed reducing unit, expressed as a transfer function, may be expressed by the following equation (2), $$G(s) = \frac{K}{Js^2 + Ds} \quad (2)$$

where K is a motor gain, J is an inertial moment of a motor and D is a viscous resistance coefficient of the motor.

First, an in the stance in which, in a servo controller, shown in FIG. 5, a band of phase compensation type control is optionally selected as a designing example of the phase compensation type control, is explained with reference to FIG. 7. It is noted that the quantity of phase compensation is constant and the frequency range is selected to an optional value. In this figure, (1) C(s)-1: The gain amplification of approximately +5.6 dB and a phase lead of approximately +18 degrees are afforded in a band of 1.0 to 100 Hz;

(2) C(s)-2: The gain amplification of approximately +5.6 dB and a phase lead of approximately +18 degrees are afforded in a band of 0.1 to 10 Hz; and (3) C(s)-3: The gain amplification of approximately +5.6 dB and a phase lead of approximately +18 degrees are afforded in a band of 10 to 1 kHz.

Thus, by optional selecting the frequency range for applying phase compensation, the frequency response of the actuator may be set arbitrarily, and hence the frequency response of the joint axes of the robot, constituted by such actuator, may be dynamically adjusted in dependence upon the orientation or the operational aspects of the robot body.

Figure 7:
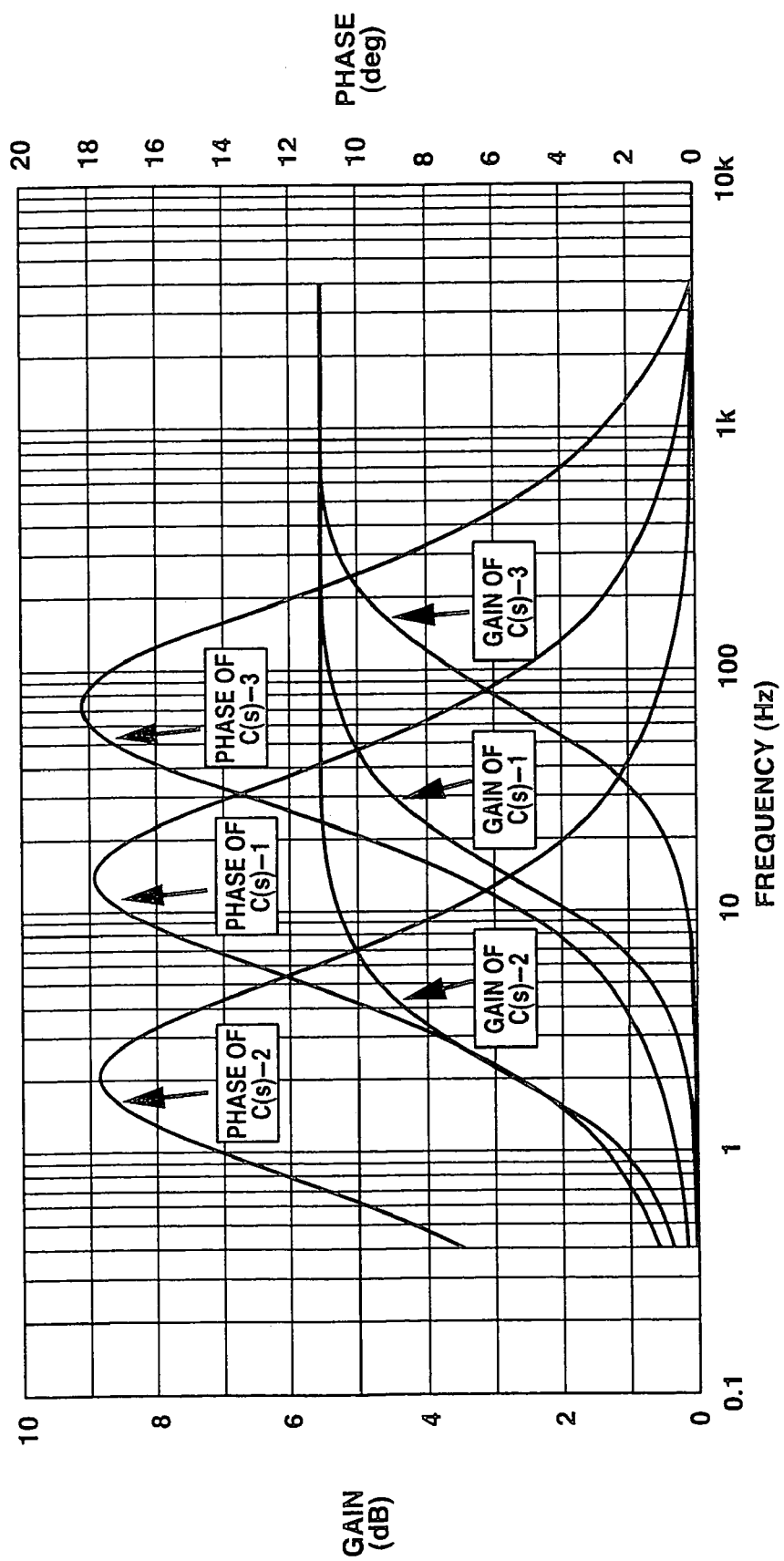
FIG. 7 illustrates an example of optionally selecting a phase compensation band as a designing example of the phase compensation control in the servo controller shown in FIG. 5.

Meanwhile, although an example of phase lead compensation is shown in the example shown in FIG. 7, any optional phase lag may be set in an optional frequency range in the case of phase lag compensation.

Figure 8:
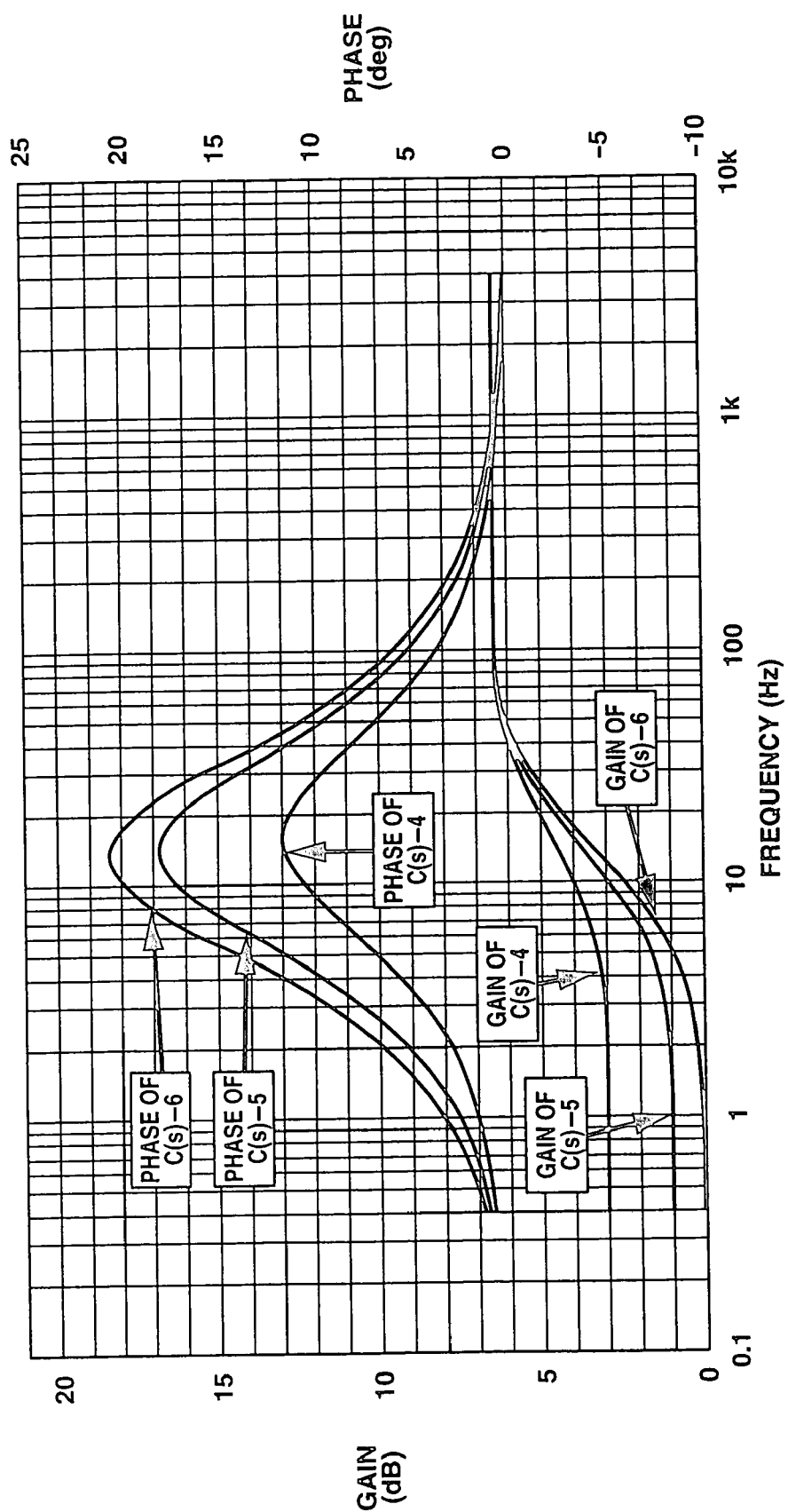
FIG. 8 illustrates an example of optionally selecting the quantity of phase compensation as a designing example of the phase compensation control in the servo controller shown in FIG. 5.

Referring to FIG. 8, an in the case of optionally selecting the quantity of phase compensation (that is, optionally selecting the quantity of phase compensation for a constant frequency range) to be applied in the servo controller shown in FIG. 5, as a designing example of the phase compensation type control, is explained. In FIG. 8, (4) C(s)-4: The gain amplification of approximately +3.5 dB and a phase lead of approximately +12 degrees are afforded in a band of 0.4 to 70 Hz;

(5) C(s)-5: The gain amplification of approximately +5.6 dB and a phase lead of approximately +18 degrees are afforded in a band of 2.0 to 70 Hz; and (6) C(s)-6: The gain amplification of approximately +6.5 dB and a phase lead of approximately +21 degrees are afforded in a band of 1.0 to 70 Hz.

Thus, the frequency response of the actuator can be optionally set by optionally selecting the quantity of phase compensation. Consequently, with the joint axes of a robot, made up by these actuators, the frequency response can be adjusted dynamically responsive to the orientation or the operational aspects of the robot body.

Although the embodiment shown in FIG. 8 is concerned with the in the case of phase lead compensation, it is similarly possible, in the case of the phase delay compensation, to set any optional quantity of phase lag for any optional frequency range.

Figure 9:
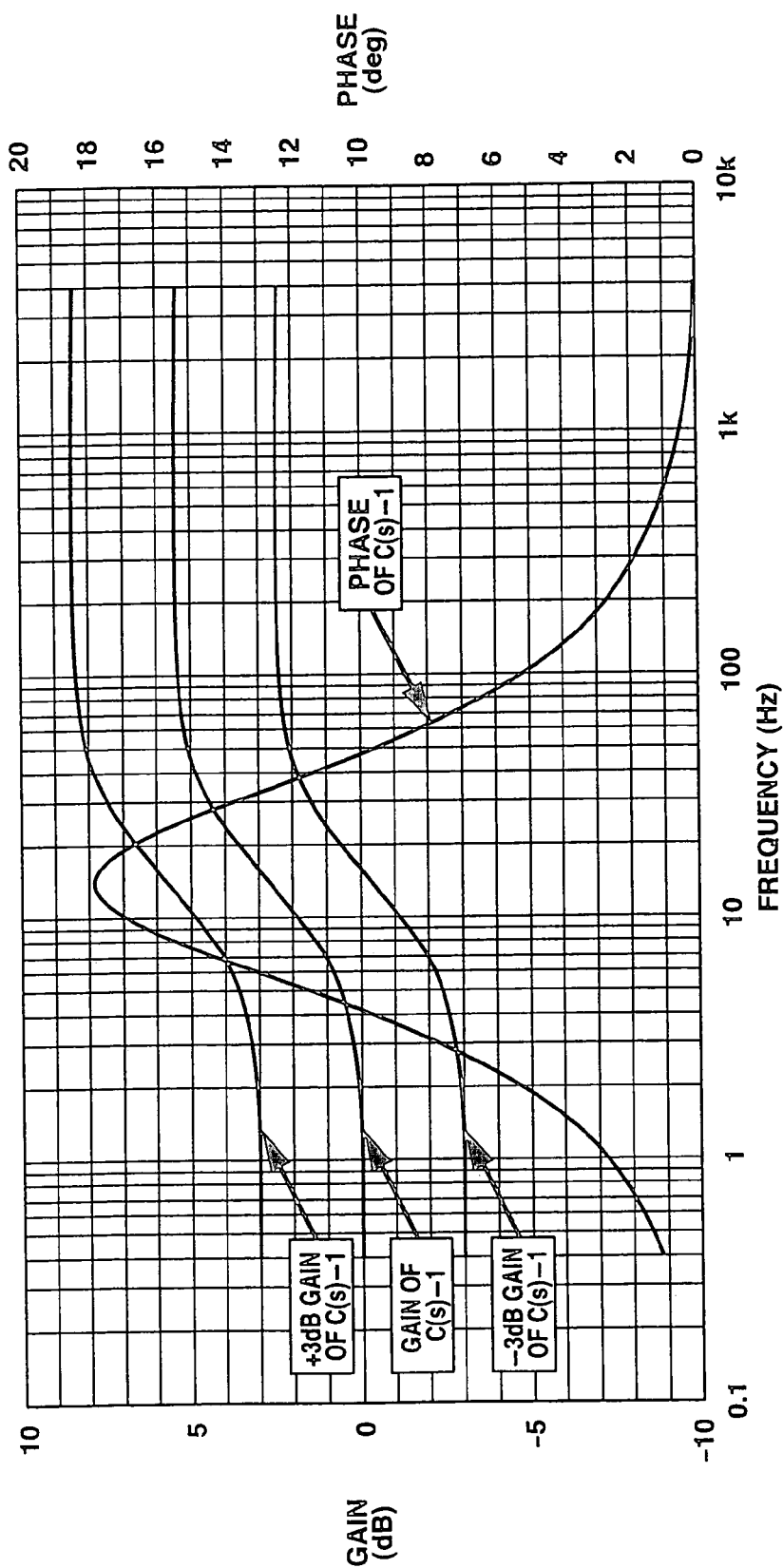
FIG. 9 illustrates a designing example of a controller for changing the magnitude of the serial compensation gain K in the servo controller shown in FIG. 5.

Referring to FIG. 9, a designing example of a controller for changing the magnitude of the serial compensation gain, indicated by K, in a servo controller shown in FIG. 5, is explained. FIG. 5 is equivalent to FIG. 9 except changing K by±3 dB. As shown, the magnitude of the serial compensation gain can also be set optionally.

When desired to apply the contents, shown in FIGS. 7 to 9, to the actuators for driving the joint axes of the robot, a communication protocol for dynamically or statically changing the parameters making up this type of the controller is mounted, whereby various characteristics may be imparted to the respective joint axes of the robot.

The characteristics of the actuators, in case of mounting the servo controller for the actuator, having these characteristics, are now explained.

Figure 10:
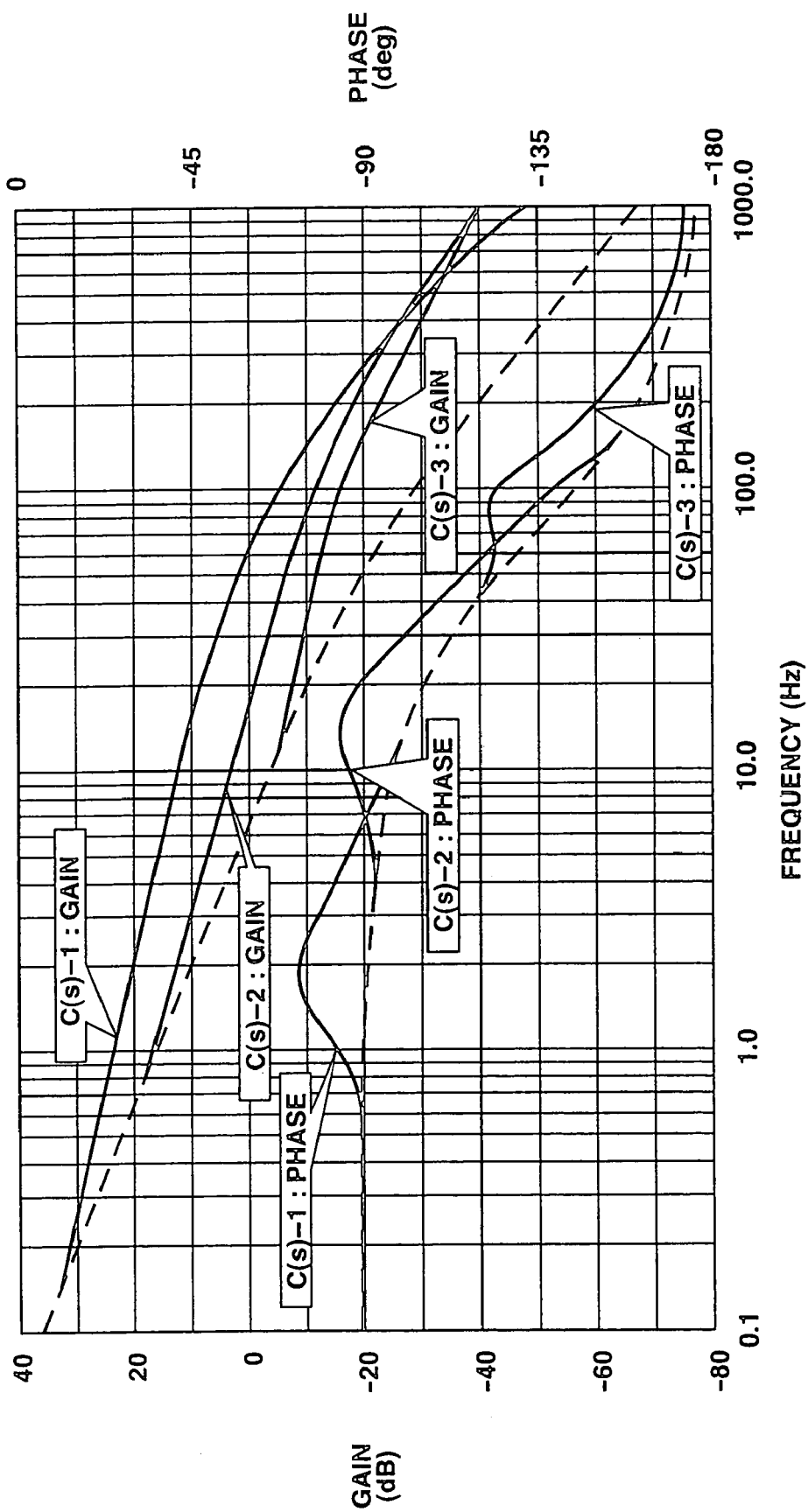
FIG. 10 is a graph showing closed loop characteristics when the servo controller of the actuator is mounted such that the frequency range is optionally selected, with the quantity of phase compensation being constant, as shown in FIG. 7.

FIG. 10 shows open loop characteristics when the servo controller for the actuator is mounted in such a manner that the frequency band may be optionally selected for a constant quantity of phase compensation, as shown in FIG. 7.

(1) C(s)-1: The gain amplification of approximately +5.6 dB and a phase lead of approximately +18 degrees are afforded in a band of 1.0 to 100 Hz. This increases the gain on the whole, thus improving positioning accuracy and follow-up characteristics. However, the energy loss may be produced. On the other hand, an increasing load tends to give rise to instabilities.

(2) C(s)-2: The gain amplification of approximately +5.6 dB and a phase lead of approximately +18 degrees are afforded in a band of 0.1 to 10 Hz. In this case, characteristics intermediate between C(s)-1 and C(s)-2 are obtained.

(3) C(s)-3: The gain amplification of approximately +5.6 dB and a phase lead of approximately +18 degrees are afforded in a band of 10 to 1 kHz. Since the phase lead compensation is made only in the high frequency range, the efficacy is not optimum during slow robot motions. However, certain efficacy may be noted in which robot motions, such as running, jumping or dancing.

Thus, by optionally selecting the frequency band for phase compensation, the frequency response of the actuators may be optionally set, and hence the frequency response for the joint axes of the robot, made up by these actuators, may be dynamically adjusted in dependence on the orientation or on operational aspects of the robot body.

Figure 11:
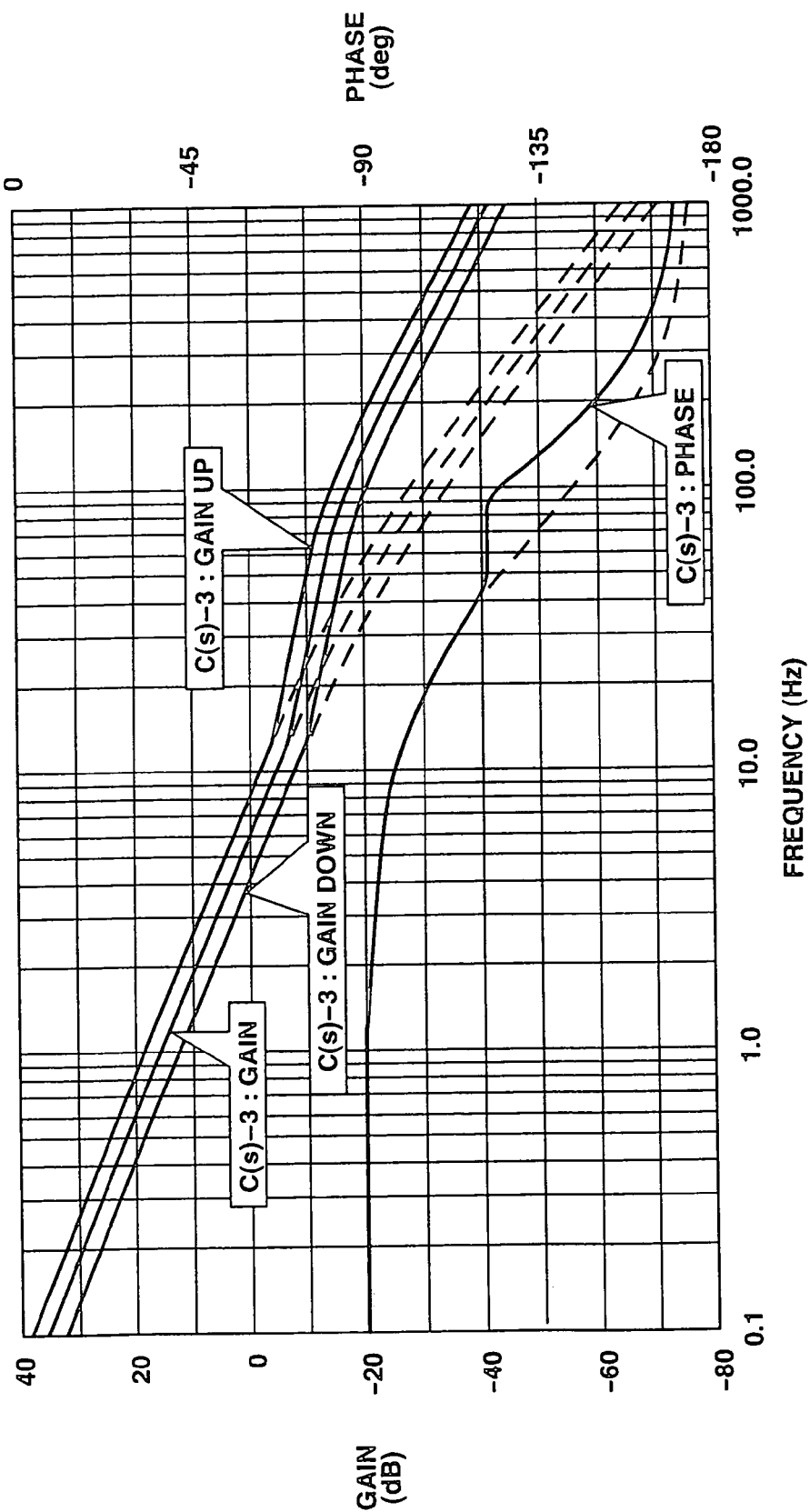
FIG. 11 is a graph showing the state in which control of the serial compensation gain has further been introduced in the example C(s)-3 in which, in FIG. 10, phase lead compensation is applied only in the high frequency range.

FIG. 11 show a case where serial compensation control gain is further applied in the example C(s)-3 where phase lead compensation is applied only to a high frequency range in FIG. 10. In the present case, the gain is increased or decreased for the same gain, in the same way as in the example shown in FIG. 5.

In the example, shown in FIG. 10, the efficacy is not optimum for slow motions, in the example C(s)-3 of phase compensation. However, control offset may be reduced in the low frequency range, by increasing the gain in the low frequency range, as shown in FIG. 11. As a consequence, it becomes possible to respond to a command value with a small lag even during the slow motions.

Figure 12:
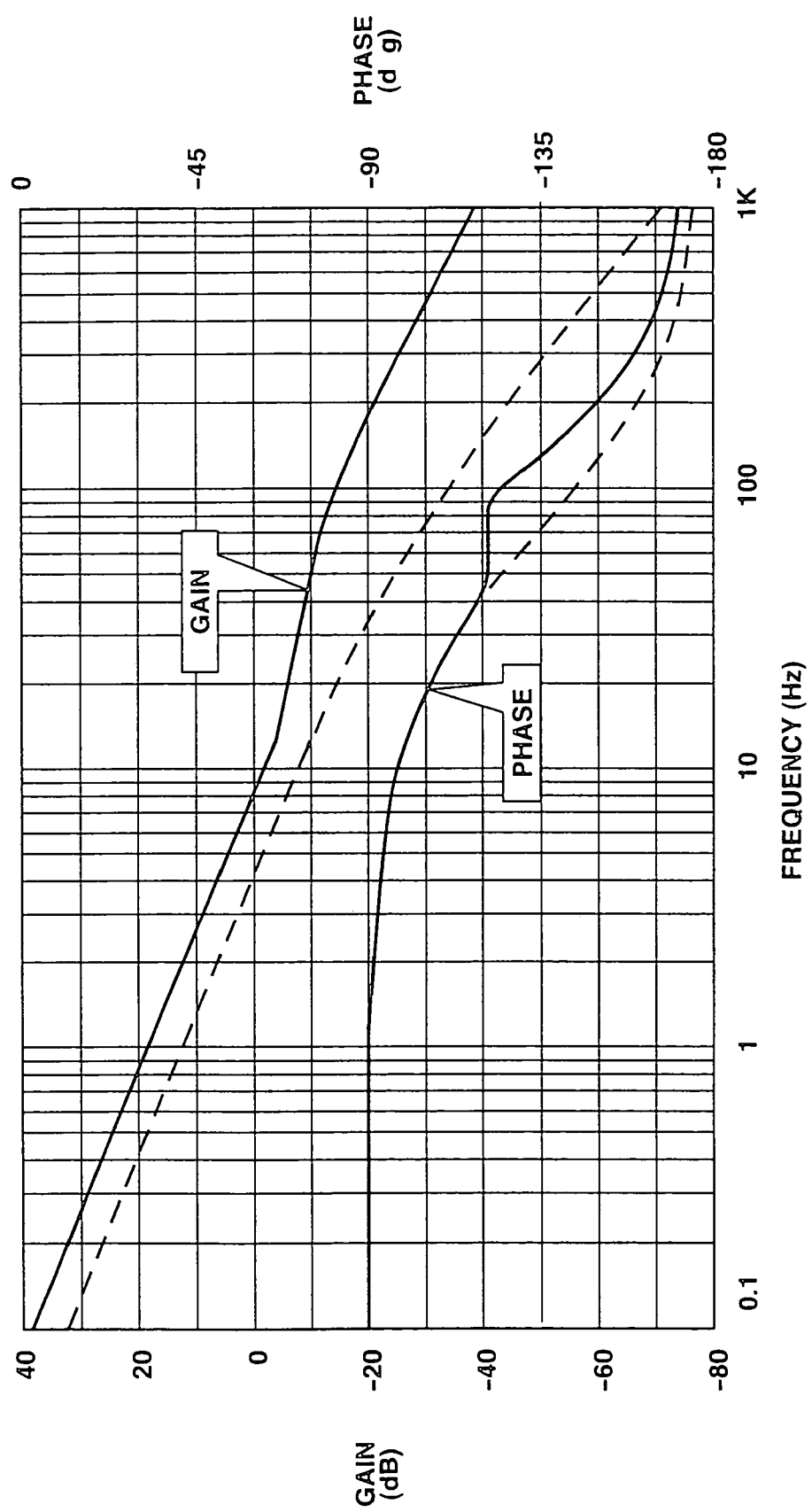
FIG. 12 is a graph showing a case in which closed loop characteristics of the position control system of the actuator are set such that the gain is high for the entire range and the quantity of phase lead is decreased for the high range.

In sum, by setting open-loop characteristics of a position control system of the actuator so that the overall gain is increased and so that the quantity of phase lead is decreased in a high frequency range, as shown in FIG. 12, it is possible to increase the stiffness in the site or joint in need of high position accuracy, such as support leg, to eliminate the compliance.

Figure 13:
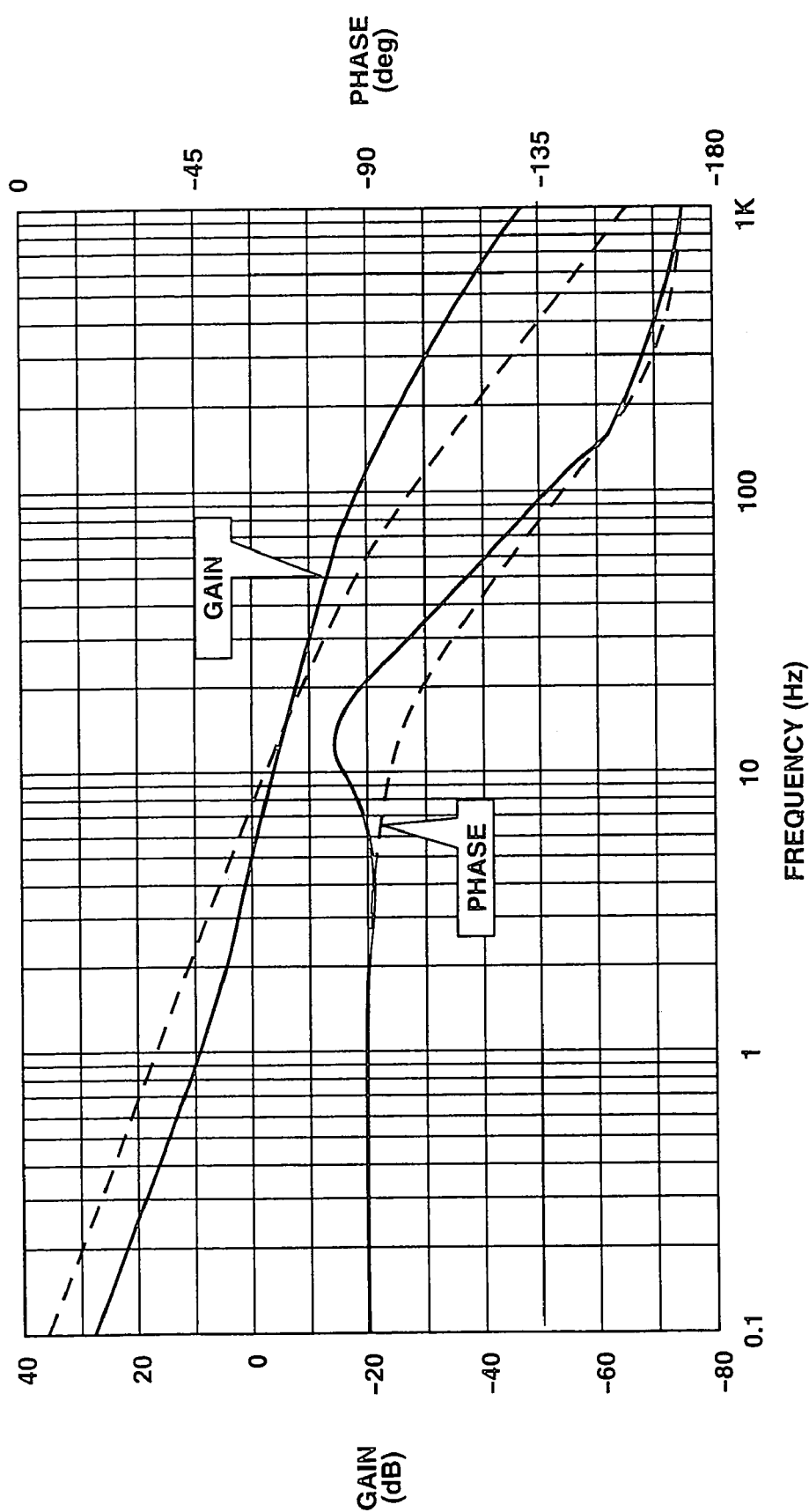
FIG. 13 is a graph showing a case in which closed loop characteristics of the position control loop of the actuator are set such that the gain is low for the low range and the quantity of phase lead is increased for the high range.

On the other hand, by setting open-loop characteristics of a position control system of the actuator so that the gain is decreased for the low frequency range and so that the quantity of phase lead is increased in a high frequency range, as shown in FIG. 13, it is possible to realize optimum characteristics for a joint site, such as a leg in the flight state, which is in need of constraint response, rather than position accuracy, or whenever a joint is in need of compliance.

The mechanism for adjusting not only the proportional gain of the servo controller in the actuator, but also the phase compensation element, in each of the respective joint sites, has so far been explained. Such mechanism renders it possible to increase or decrease the force for achieving stable highly efficient operations and to increase or decrease the compliance (mechanical passiveness) of the respective joint sites.

If the motions of the respective joint axes are comprehended as a position control system, for example, it is more advisable to exercise control to reduce the control offset, by employing a high gain high frequency band servo controller. However, if the motions of the respective joint axes are comprehended as a mechanical model, it is advisable to lower the gain or to increase or decrease the frequency band, as a subject of phase compensation, in consideration of the potential energy or the action of the kinetic energy.

C-2 Viscous Resistance of Actuator Motor

Such a system may be used in which, in addition to the operating speed or the mechanical passiveness of the actuator, the viscous resistance of the actuator is variably controlled, during the operation, as explained in C-1 above.

For example, in a motor of a type in which the current to a coil is controlled to produce a predetermined magnetic flux distribution to generate rotational torque, a switching circuit made up of a first set of transistor switches, each having a coil terminal connected to a power supply terminal, and a second set of transistor switches, each having a coil terminal grounded, is actuated under PMW command to control the coil current to generate a desired torque, a rotational position or a rotational speed.

It is noted that, at a timing of the open state during the time the motor coil is not supplied with current, the current, more precisely the electrical charges, supplied to the motor coil, is lost, thus producing torque loss. Moreover, the effect of torque fluctuations due to cogging tends to be apparent.

In such case, it is possible to prevent the current, more precisely the electrical charges, supplied to the motor coil, from being lost, by setting a shorted state in which the coil is not in the open state even during the time the motor coil is not supplied with current. At this time, back-electromotive force is generated in the motor coil due to the magnetic flux density from a permanent magnet. This back-electromotive force causes the force to act in the opposite direction to the direction of the motor rotation, thus producing the viscous resistance against rotation caused by an external force, to give rise to an effect comparable to braking. Such viscous resistance to the motor reduces torque losses to decrease the effect of torque variations otherwise caused by cogging.

On the other hand, if such shorted state of the coil is produced during the time the motor is not supplied with current, a sort of viscous resistance may be afforded to the motor, as described above. However, if such motor is used for a robot, there is raised a problem that compliance (mechanical passiveness) is lost due to the effect of braking caused by soil shorting.

By adjusting the proportions between the open state of the motor coil during the time the motor coil is not supplied with the current, and the shorted state of the coil, in dependence on desired mechanical characteristics, it is possible to resolve simultaneously the problem of torque loss and torque fluctuations, caused by loss of current, more precisely, the electrical charges, supplied to the motor coil, at a timing of the open circuiting of the motor coil, and by cogging, and the problem of elimination of compliance (mechanical passiveness) under the effect of braking caused in turn by coil shorting during the time the motor coil is not supplied with current.

It is noted that the proportions between the current-conducting state and the non-current-conducting state to the motor coil can be implemented by PWM control and that the proportions between time duration of the open-circuited state of the motor coil during the non-current-conducting state of the motor coil and that during the short-circuited state may similarly be implemented by PWM control.

Figure 14:
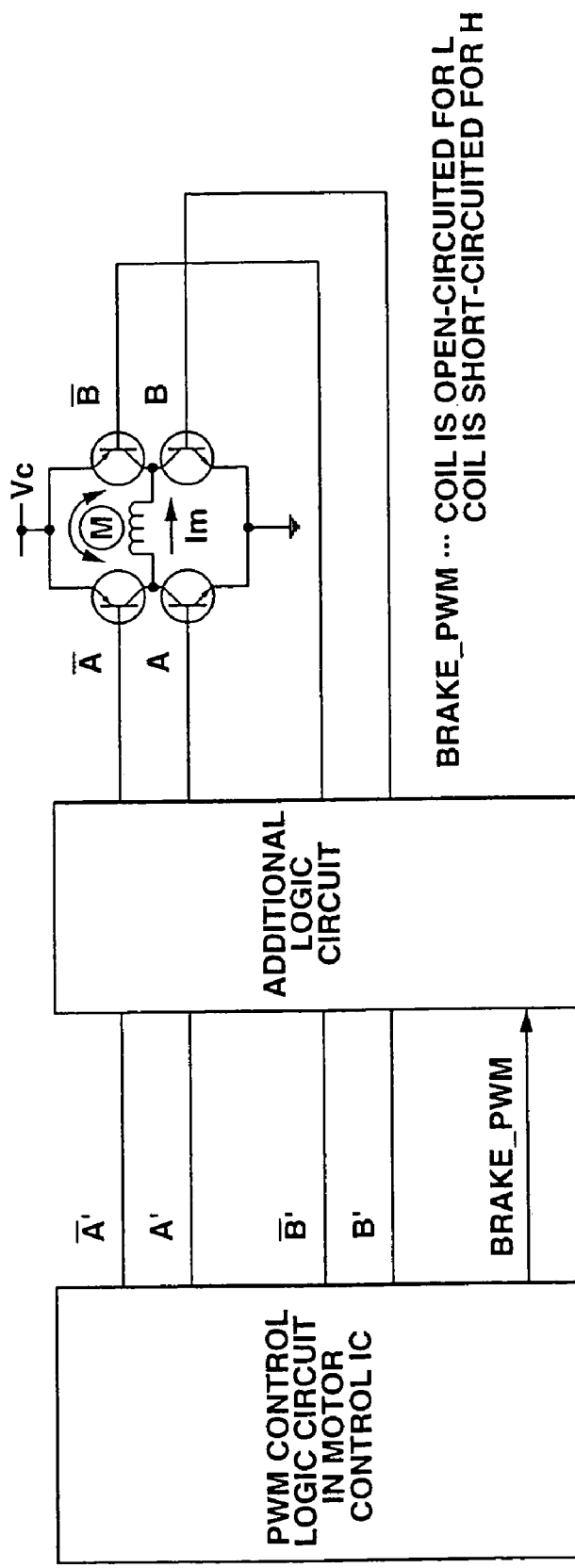
FIG. 14 shows an illustrative structure of an equivalent circuit of a current control circuit for supplying the coil current to a DC motor employing a coil current controlling mechanism.

FIG. 14 shows an illustrative structure of a current controlling circuit for supplying the coil current in a DC motor, implemented by employing a coil current controlling mechanism.

The current controlling circuit, shown in this figure, is of a full-bridge configuration, made up by a circuit composed of a forward connection of a pnp transistor A' and an npn transistor A and a circuit composed of a forward connection of a pnp transistor B' and an npn transistor B, with these two circuits being connected in parallel to each other across a power supply voltage Vcc and the ground GND, and by a single-phase stator coil connected across a junction point across the transistors A', A and a junction point across the transistors B', B.

By turning the transistors A', B on and turning the transistors A, B' off, the current Im flows through the motor coil in the direction of an arrow in the drawing. By turning the transistors A', B off, the motor coil is in the open-circuited state, with the flow of the current Im then ceasing. On the other hand, by turning the transistors A', B off and turning the transistors A, B' on, the motor coil is in a shorted (electrically shorted) state.

A PWM control logic circuit generates a command for supplying the current to the motor coil, based on a current axis current command (or a torque command) from a central controller, not shown, in order to perform switching control for the respective transistors, based on this current supply command, in accordance with the PWM system. That is, the current-conducting state in which the transistors A', B are turned on and the transistors A, B' are turned off, to cause the coil current Im to flow, and the non-current-conducting state, in which the transistors A', B are turned off to cause cessation of the current flow through the motor coil, are generated alternatively.

In the present embodiment, there is further provided an auxiliary logic circuit for changing over a control signal, controlling the on/off operation of the transistors A, A' and B, B', output from the PWM control logic circuit, in accordance with an auxiliary logic.

Figure 15:
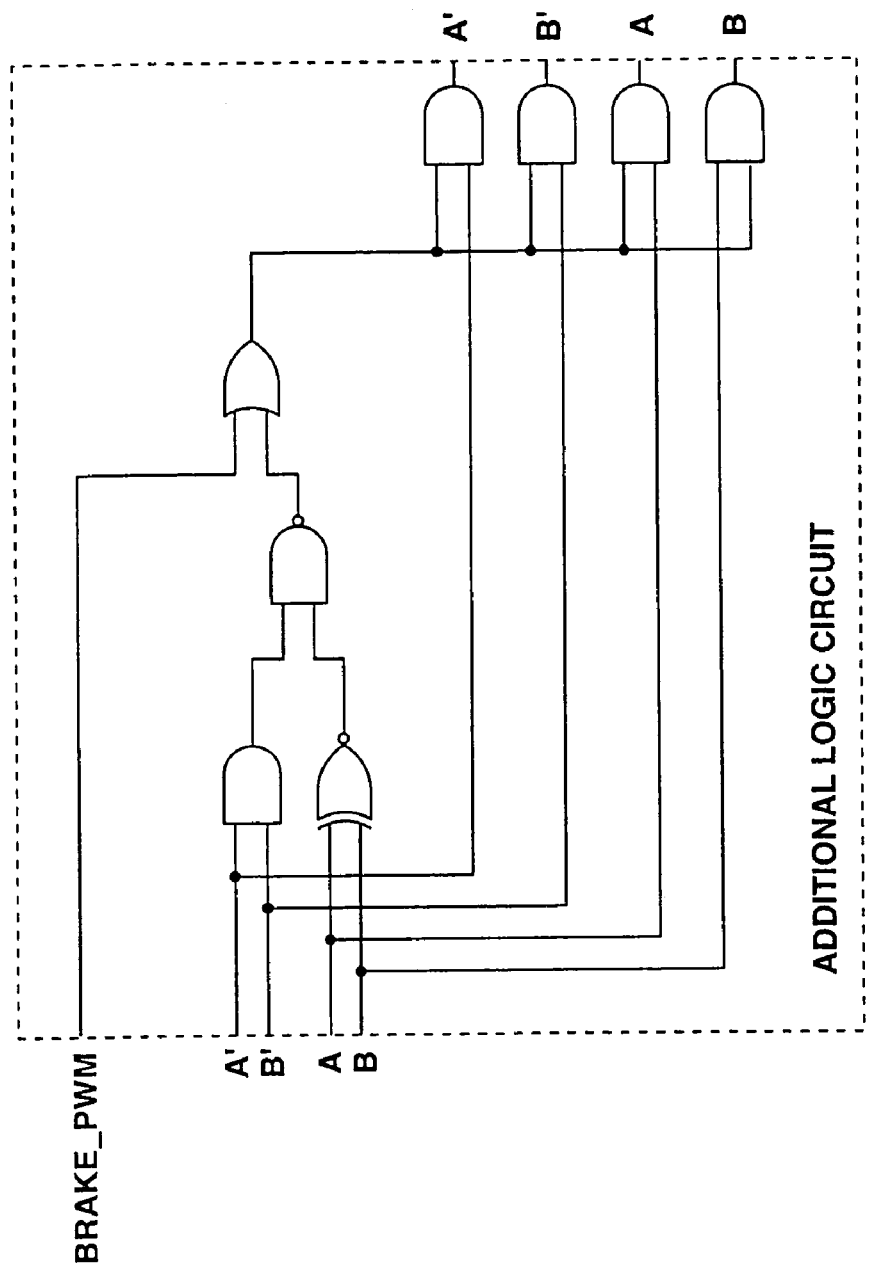
FIG. 15 shows a specified circuit structure of an additional logic circuit.

The auxiliary logic circuit changes over the control logic, controlling the on/off operations of signals $A_0$, $A_0'$ and $B_0$, $B_0'$, output from the PWM control logic circuit, based on a BRAKE_PWM control signal, output from the PWM control logic circuit, in accordance with the auxiliary logic. This switches the short-circuited state of the motor coil to the open-circuited state thereof and vice versa in the non-current-conducting state of the motor coil. FIG. 15 shows a specified circuit configuration of the auxiliary logic circuit.

The signal $A_0'$ for controlling the transistor A' is ANDed with the signal $B_0'$ for controlling the transistor B' from the PWM control logic circuit, while the signal $A_0$ for controlling the transistor A is Ex-ORed with the signal $B_0$ for controlling the transistor B. The resulting outputs are ANDed and then inverted and the resulting output is further ORed with an inverted signal of the BRAKE_PWM control signal. The resulting logical sum signal is ANDed with the original transistor control signals to give ultimate control signals for the respective transistors.

When supplied with the high level of the BRAKE_PWM control signal, the auxiliary logic circuit changes over the transistor control signals to short-circuit the motor coil during the non-current-conducting time. During the normal non-current-conducting time, the PWM control logic circuit outputs transistor controlling signals to cause the control signals $A_0'$, $A_0$ to go high and to cause the control signals $B_0'$, $B_0$ to go low. On the other hand, the auxiliary logic circuit when supplied with a high level of the BRAKE_PWM control signal causes the signals $A_1'$, $A_1$ to be changed from the high state to the low state to set the shorted state of the motor coil.

On the other hand, when the BRAKE_PWM control signal is low, the auxiliary logic circuit directly outputs the transistor control signals from the PWM control logic circuit, during the non-current-conducting time, so that the motor is in the open-circuited state during the non-current-conducting time.

Figure 16:
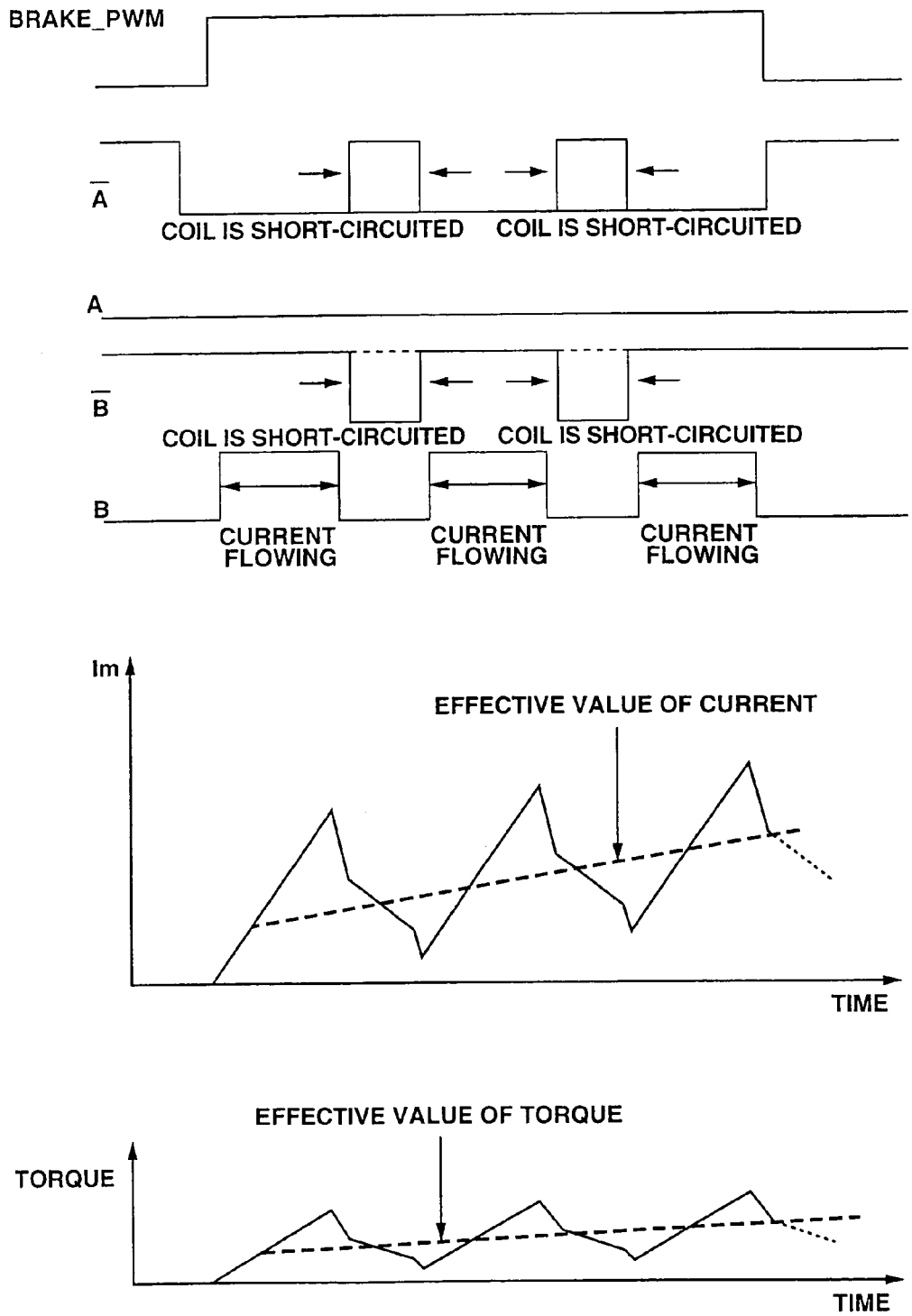
FIG. 16 shows output characteristics of each transistor controlling signal of the additional logic circuit, when a high-level BRAKE_PWM control signal has been supplied, along with coil current waveform characteristics and torque output characteristics.

FIG. 16 shows output characteristics for the respective transistor controlling signals by the auxiliary logic circuit, when the circuit is supplied with the BRAKE_PWM control signal having a predetermined duty ratio, under PWM control, along with coil current waveform characteristics and torque output characteristics.

If the motor coil is short-circuited during the non-current-conducting time, the time until zero-resetting of the coil current is prolonged, due to transient response. If the motor coil is open-circuited, the time becomes shorter. The transient response characteristics during the non-current-conducting time are a mixture of these characteristics, in accordance with the duty ratio of the BRAKE_PWM control signal.

Thus, if the switching operations of current conduction in the coil and the short-circuiting thereof are repeated, as shown in FIG. 16, the next current conduction commences before the coil current reverts to zero during the non-current-conducting time. Although the maximum current through the coil is increased progressively each time the current conduction in the coil and the short-circuiting thereof occur repeatedly alternately, the current rising tendency is approximately proportionate to the duty ratio, that is, the proportion of the BRAKE_PWM control signal going high. In similar manner, the effective value of the coil current rises progressively, as shown, with the rising tendency being approximately proportionate to the duty ratio, that is, the proportion of the BRAKE_PWM control signal going high.

On the other hand, the output torque T of the motor is the coil current multiplied with the torque constant $K_t$ of the motor ($T = K_t \cdot I$), so that, as may be seen from FIG. 16, when the current conduction in the coil and the short-circuiting thereof occur repeatedly alternately, the effective value of the motor torque is increased with the increase in the coil current. Thus, with the motor coil being short-circuited in the non-current-conducting state, there is no risk of the current, more precisely, the electrical charges, supplied to the motor coil, being lost, thus eliminating torque losses. Moreover, the effect of torque fluctuations due to cogging is not liable to be apparent.

The increasing tendency of the motor torque on repetition of the current conduction and non-current conduction through the coil is roughly proportionate to the duty ratio of the BRAKE_PWM control signal, that is, the proportion of the control signal going high. The motor torque output rising characteristics correspond to viscous coefficient of the motor.

When the aforementioned short-circuited state of the coil is produced during the non-current-conducting state of the motor, a sort of viscous resistance may be imparted to the motor, as discussed above. On the other hand, when such motor is used for a robot, there is raised a problem that, due to the braking, caused by coil short-circuiting, compliance (mechanical passiveness) of the robot is lost.

Thus, the PWM control logic circuit PWM-controls the BRAKE_PWM control signal, supplied to the auxiliary logic circuit, to control the proportion of the time duration of open-circuiting of the coil in the non-current-conducting state of the motor coil and that of the time duration of short-circuiting of the coil.

On PWM-controlling the time duration of open-circuiting of the coil in the non-current-conducting state of the motor coil and the time duration of short-circuiting of the coil, the characteristics of the coil current is a mixture, in accordance with the duty ratio, of the transient response characteristics of the coil current on open-circuiting the coil during the non-current-conducting time and the transient response characteristics of the coil current on short-circuiting the coil.

FIG. 62 shows output characteristics of the respective transistor control signals of the auxiliary logic circuit, supplied with the BRAKE_PWM control signal having a predetermined duty ratio under PWM control, along with coil current waveform characteristics and torque output characteristics.

If, during non-current-conducting time, the coil is short-circuited, the time until the coil current is reset to zero is prolonged, due to transient response. However, when the coil is open-circuited, the time becomes shorter. The transient response characteristics during the non-current-conducting time represent a mixture of these characteristics, in accordance with the duty ratio of the BRAKE_PWM control signal.

Thus, if the switching operations of current conduction in the coil and the short-circuiting thereof are repeated, as shown in FIG. 62, the next current conduction commences before the coil current reverts to zero during the non-current-conducting time. The maximum current through the coil is increased progressively each time the current conduction in the coil and the short-circuiting thereof occur repeatedly alternately, with the current rising tendency being approximately proportionate to the duty ratio, that is, the proportion of the BRAKE_PWM control signal going high. In similar manner, the effective value of the coil current rises progressively, as shown, with the rising tendency being approximately proportionate to the duty ratio, that is, the proportion of the BRAKE_PWM control signal going high.

On the other hand, the output torque T of the motor is the coil current multiplied with the torque constant $K_t$ of the motor ($T = K_t \cdot I$), so that, when the current conduction in the coil and the short-circuiting thereof occur repeatedly alternately, the effective value of the motor torque is increased with the increase in the coil current as may be seen from FIG. 62. The tendency of rise of the effective value of the motor torque is approximately proportionate to the duty ratio of the BRAKE_PWM control signal, that is, the proportion of the control signal going to a high level. The increasing tendency of the motor torque corresponds to the viscous coefficient of the motor. Stated differently, the viscous resistance of the motor may be dynamically controlled by the duty ratio of the BRAKE_PWM control signal.

Thus, by PWM-controlling the duty ratio of the BRAKE_PWM control signal, supplied by the PWM control logic circuit to the auxiliary logic circuit, the proportion of the time duration of the open-circuited state of the coil at the time of non-current-conduction in the motor coil and that of the short-circuited state thereof may be adjusted in accordance with desired mechanical characteristics.

As a consequence, it is possible to resolve simultaneously the problem of torque loss and torque fluctuations, caused by loss of current, more precisely, the electrical charges, supplied to the motor coil, at a timing of the open circuiting of the motor coil, and by cogging, respectively, and the problem of elimination of compliance (mechanical passiveness) under the effect of braking caused in turn by short-circuiting of the coil during the non-current-conducting time.

It is also possible to control dynamically the viscous resistance of the motor by the duty ratio of the BRAKE_PWM control signal. The control relationship is shown in FIG. 17, in which the viscous resistance is expressed by the product of the viscous resistance [mN–m·s/rad] and the rotational angular velocity at the time of the motion [rad/s].

Figure 17:
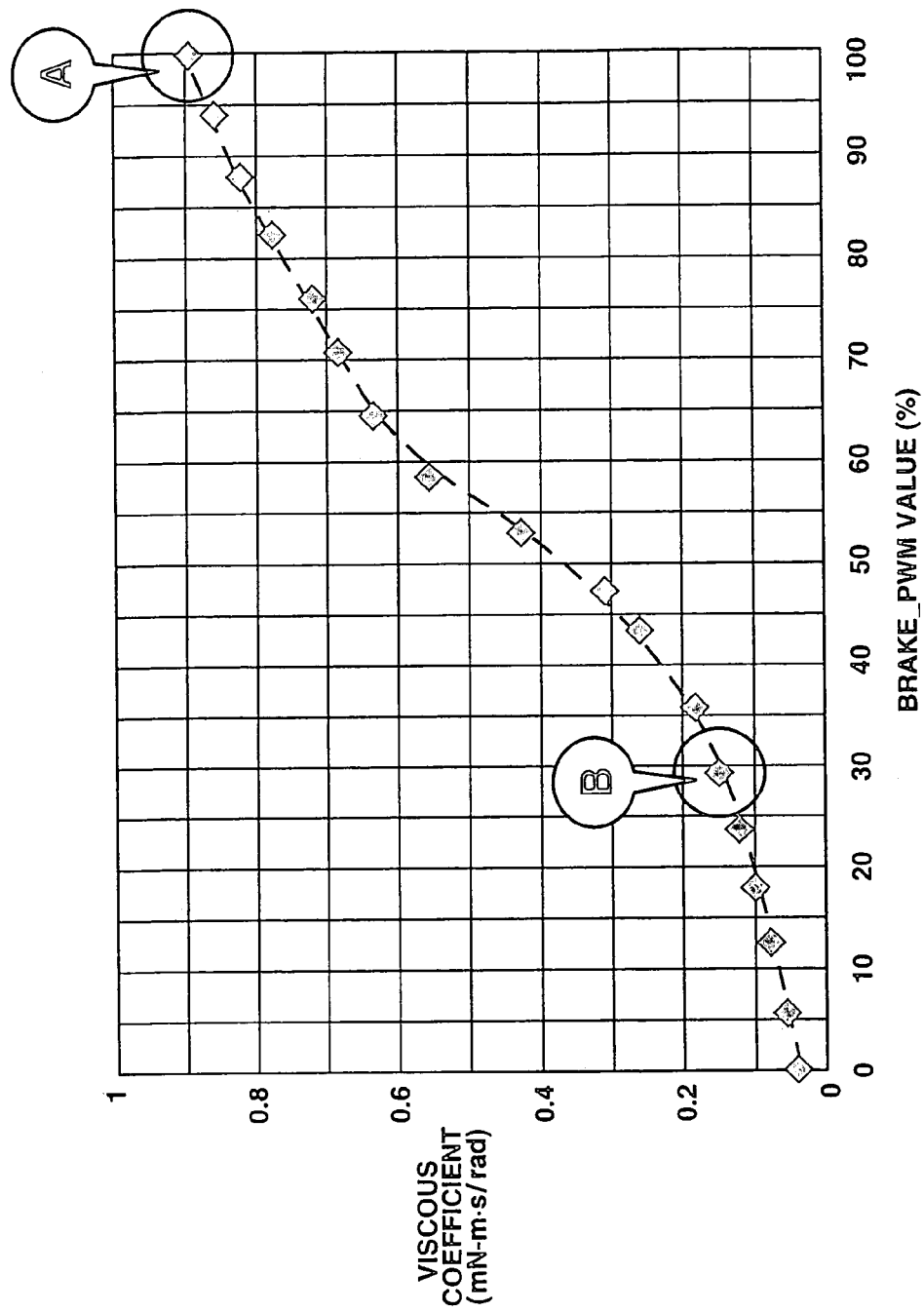
FIG. 17 shows relationships of control areas for dynamically controlling the viscous resistance of the motor by the duty ratio of the BRAKE-PWM control signal.

In FIG. 17, an area indicated by A represents the viscous coefficient which becomes maximum in terms of motor characteristics. In the illustrated example, this maximum viscous coefficient is 0.9 mN–m·s/rad. If the actuator characteristics are set in this area, the viscosity of the joint is increased and, as a result, compliance cannot be achieved. However, robust control characteristics may be achieved against disturbances, such as oscillations, exerted from outside.

In FIG. 17, an area indicated by B represents the viscous coefficient which is one-third or less of the maximum value in terms of motor characteristics. In the illustrated example, this viscous coefficient is 0.15 mN–m·s/rad. If the actuator characteristics are set in this area, the viscosity of the joint becomes small. As a result, mechanical passiveness (compliance) can be achieved, even though control characteristics become weaker against disturbances.

As for the area B for achieving the compliance, it is basically sufficient that the viscous coefficient is less than the maximum value in terms of motor characteristics. However, as shown, in an area with a steep gradient from 0.3 to 0.8 mN-m·s/rad, the viscous coefficient is susceptible to environmental changes, such as temperature changes, and hence is difficult to control. It is therefore felt that an area of the viscous coefficient which is less than one-third of the maximum value of the viscous coefficient in terms of motor characteristics, and which presents a moderate gradient, is desirable, as is also evidenced by experiments conducted by the present inventors.

In the foregoing explanation, a DC motor is taken as an example. This is merely illustrative and, in case of a motor of the type in which the rotational torque is generated by controlling the current supplied to a coil to produce a predetermined magnetic flux distribution to generate the rotational torque, such as a three-phase motor, it is similarly possible to produce a desired viscous coefficient of the motor by intermittently switching the state of the motor coil during the non-current-conducting time from the open-circuited state to the short-circuited state and vice versa.

C-3. Application to the Legged Mobile Robot

A legged mobile robot, walking on two legs, in which the control mechanism of characteristics of servo controllers of the actuators of the present embodiment and the control mechanism of the actuators themselves are applied to respective joint sites, is hereinafter explained.

As described in the foregoing, the positioning accuracy, mechanical passiveness (compliance) or the operating speed, as required in the respective joint sites of the robot, can be optionally set by adjusting the proportional gain and the phase compensation element in the servo controller of the actuator. Moreover, the viscous coefficient of the motor can be adjusted to change the robustness against disturbances, such as oscillations, by switching the motor coil intermittently from the open-circuited state to the short-circuited state and vice versa during the non-current-conducting time to the coil of the actuator motor.

Additionally, the frequency response of the actuator that can be applied to an area where the positioning accuracy is crucial, as well as the frequency response of the actuator that can be applied to an area where the high-speed response and compliance are crucial, may be obtained by combining the gain/phase compensation control in the actuator servo controller and the viscous resistance of the actuator motor.

The frequency response of the actuator, that can be applied to the area where the positioning accuracy is crucial, are as shown in FIG. 12. In this case, the proportional gain of the servo controller is selected to a larger value and the gain of the entire system is increased such as to achieve the gain up to the low frequency range. The frequency response is selected as shown in FIG. 12, that is, so that the quantity of phase lead is smaller in a high frequency range, such that contribution to the high speed response characteristics is not marked but stability is assured. Additionally, the viscous coefficient of the motor is to be increased to achieve robustness against disturbances, such as oscillations. In sum, the characteristics shown represent characteristics in which emphasis is placed on positioning accuracy and which are robust against disturbances.

The frequency response of the actuator, that can be applied to the area where the high-speed response and compliance are crucial, are as shown in FIG. 13. In this case, the proportional gain is selected to a smaller value and the gain of the low frequency range is decreased such that the mechanical passiveness (compliance) may readily be obtained. The frequency response is selected as shown in FIG. 13, that is, so that the quantity of phase lead is larger in a mid to high frequency range, such that high-speed response characteristics may be achieved. Moreover, the viscous resistance of the motor is to be reduced such that the mechanical passiveness (compliance) may readily be achieved. In sum, the characteristics shown attach priority to mechanical passiveness (compliance) and to high-speed response characteristics.

These degrees of freedom of the joints of the legged mobile robot, shown in FIGS. 1 to 3, may be implemented by the actuators each having the aforementioned servo controller. An example of basic control for controlling the gain and phase compensation characteristics of the actuator, used in the respective joint sites, is now explained in detail.

(1) Characteristics of an Actuator applied to a Neck Portion

In the neck portion, emphasis is placed on the positioning accuracy, so that the proportional gain is set to a high value. Moreover, the quantity of phase lead is set to a smaller value, so that, as the operating speed is kept, stability is not lost in an amount corresponding to the increased proportional gain. Additionally, the viscous resistance of the joint is set to a larger value in order to obtain robustness against oscillatory disturbances produced during motion of the robot body portion below the trunk unit.

(2) Characteristics of an Actuator applied to Shoulder and Elbow Portions

For carrying out continuous motions, such as walking or dancing, such characteristics are imparted to the actuator in which more emphasis is placed on the mechanical passiveness than on the positioning accuracy. The viscous resistance of the joints is decreased in order to impart passiveness to the motions. The proportional gain is set to a lower value in order to impart passiveness to the motions and in order to decrease energy consumption. The frequency range in which to effect phase lead compensation is set to a higher range, while the quantity of phase lead is set to a larger value, in order to increase the operating speed. There may be such a motion which is merely an oscillatory motion, as in a pendulum. In such case, the viscous resistance of the joints and the proportional gain are minimized to realize mechanical passiveness (compliance) so that the mechanical energy will be used more readily for carrying out the motions.

In carrying out the motions of employing the force for pushing or pulling an object, control is performed so that characteristics placing more emphasis on positioning accuracy and those placing more emphasis on mechanical passiveness will be dynamically interchanged depending on the load torque value. If desired to generate more force against load torque values, the positioning accuracy is set to a higher value, while the viscous resistance of the joint is increased. If desired to effect a profiling operation in order to provide a constant load against load torque values, the proportional gain is lowered depending on the load torque as detected by a torque sensor within the actuator, while the viscous resistance of the joints is lowered to develop mechanical passiveness, in addition to carrying out adjustments responsive to a position command value from an upper order system.

(3) Characteristics of an Actuator applied to a Trunk Portion

In order to develop robustness against oscillatory disturbances, caused by the robot's own motions, the viscous resistance of the joints is increased. Alternatively, the proportional gain is set to a higher value for placing emphasis on positioning accuracy. Still alternatively, the quantity of phase lead is set to a smaller value, in order not to detract from stability corresponding to the increase in the proportional gain, as the operational speed is maintained.

(4) Characteristics of an Actuator applied to a Hip Joint Portion

In order to develop robustness against oscillatory disturbances caused by the robot's own motions, the viscous resistance of the joints is increased. Alternatively, the proportional gain is set to a higher value for placing emphasis on positioning accuracy. Still alternatively, the quantity of phase lead is set to a smaller value, in order not to detract from stability corresponding to the increase in the proportional gain, as the operational speed is maintained.

(5) Characteristics of an Actuator applied to a Knee Portion

During the time the leg is in flight, and at an instant the foot unit contacts the floor, control is performed to such characteristics in which more emphasis is placed on mechanical passiveness than on positioning accuracy. In order to impart passiveness to the motions, the viscous resistance of the joints is decreased. In order to impart passiveness to the motions and in order to decrease the energy consumption, the proportional gain is set to a lower value. Moreover, in order to increase the operating speed, the frequency range, in which to effect phase lead compensation, is set to a higher value, while the quantity of phase lead is set to a larger value.

During the time the leg is in the stance, control is performed to such characteristics in which more emphasis is placed on positioning accuracy than on mechanical passiveness. In order to develop robustness against oscillatory disturbances caused by the robot's own motions, the viscous resistance of the joints is increased. Alternatively, the proportional gain is set to a higher value for placing emphasis on positioning accuracy. Still alternatively, the quantity of phase lead is set to a smaller value in order not to detract from stability corresponding to the increase in the proportional gain as the operational speed is maintained.

(6) Characteristics of an Actuator applied to an Ankle Portion

During the time the leg is in flight, and at an instant the foot unit contacts the floor, control is performed to obtain such characteristics in which more emphasis is placed on mechanical passiveness than on positioning accuracy. In order to buffer the impact caused by the ankle portion contacting the floor, the viscous resistance of the joints is set to a smaller value to develop mechanical passiveness (compliance). Additionally, in order to buffer the impact caused by the ankle portion contacting the floor, the proportional gain is set to a lower value, such as to develop mechanical passiveness (compliance). Moreover, in order to increase the operating speed, the frequency range, in which to effect phase compensation, is set to a higher value, while the quantity of phase lead is set to a larger value.

On the other hand, during the time the leg is in the stance state, the viscous resistance of the joint is set to a larger value, for increasing the torque generated in the ankle part and to develop robustness against oscillatory disturbances ascribable to the robot's own motions. Moreover, the proportional gain is set to a higher value for improving positioning accuracy of the ankle portion. In addition, the quantity of phase lead is set to a smaller value for not detracting from stability in an amount corresponding to the increase in the proportional gain as the operating speed is maintained.

The effect obtained by switching the characteristics of the joint actuators depending on the robot's operating stages is hereinafter explained taking the case of walking as an example.

Figure 18:
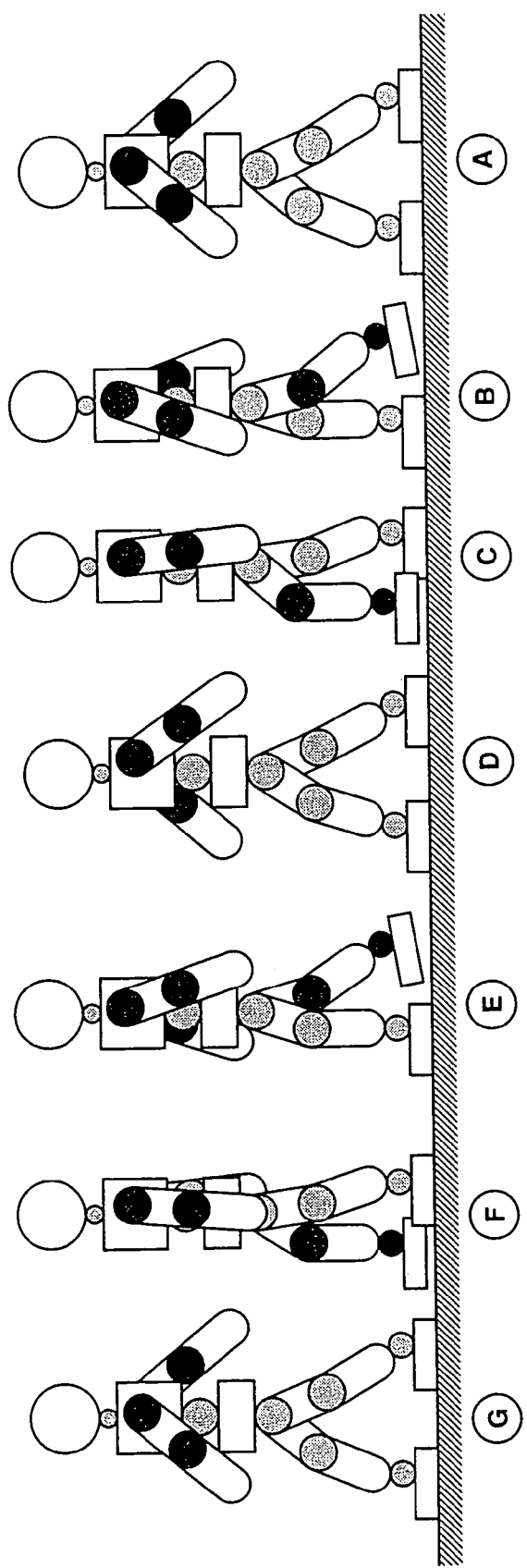
FIG. 18 shows how the legged mobile robot walks, step-by-step.

FIG. 18 shows the manner of the legged mobile robot 100 performing the walking motion. In the example shown in this figure, the walking motion is divided in seven stages of from A to G. When the walking motion is continued, the walking style is repeatedly carried out in this sequence.

(1) Shoulders to Arms

In the robot's walking motion, shown in A to G, the motion of swinging the arm is carried out for compensating the rotational moment about the yaw axis as the reference coordinate of the robot. This arm swinging motion is a periodic pendulum motion about the shoulder pitch axis.

In this case, the arm is swung up by the torque applied in an initial period of the motion, and hence the potential energy is developed. When the arm is swung down, the potential energy becomes the kinetic energy under the law of energy preservation. That is, energy transformation is repeated, in which the potential energy generated in the initial period of the motion is transformed into the kinetic energy under the principle of the descending motion of the pendulum.

If these properties are positively exploited, the mechanical energy may be added to the torque generated for the robot to follow-up with the position control (that is, the energy consumption), so that the energy consumption of the robot in its entirety may be saved.

Specifically, when the kinetic energy of the arm portion is largest, the major portion of the arm, such as the shoulder pitch axis, elbow pitch axis and so forth instantaneously generates the torque. If the viscous resistance of the joint is large at this time point, the loss during the motion is undesirably increased. On the other hand, the loss during the motion is not zero even if the viscous resistance is small. Thus, in order to stop up the loss, the torque needs to be generated instantaneously, For realizing these in one servo control, such a system is proper which is of the open loop characteristics and in which the gain for the low frequency range is low, whilst the quantity of phase compensation for the high frequency range is large to elevate the gain. Additionally, the viscous coefficient of the motor is set to the smallest value possible, by controlling the viscous resistance, in order to reduce the energy loss during the motions.

The frequency response of the actuator shown in FIG. 13 realizes this servo control and the control of the viscous resistance of the motor. Thus, the actuator of the joint site relevant to the arm motion during the walking may be set to the characteristics shown in FIG. 13.

(2) Leg Portion

During the robot's walking motion, shown in A to G, the walking style of the legs is generated in accordance with the orientation control referenced to ZMP. The leg motions are repetition of the time period when both legs are in the stance position and that when the sole leg is in the stance position and the remaining leg is in the flight position.

Since the roll axis direction follows up with the ZMP trajectory, independent of whether the leg is in the stance or flight position, the positioning accuracy of the servo control system is required to be high. That is, a high gain is required of the open loop characteristics for the entire frequency range.

Since the pitch axis of each joint of the leg in the stance position follows up with the ZMP trajectory, the positioning accuracy of the servo control system is required to be high. Simultaneously, robustness against disturbances, such as oscillations, is required. Thus, in order to meet these two requirements, the characteristics of the pitch axis of each joint of the leg in the stance position are desirably those in which the proportional gain of the servo controller is selected to be large to increase the gain of the overall system such that the gain as far as the low frequency range may be achieved, as shown in FIG. 12. The viscous resistance of the motor is also desirably set to a large value.

As with the arm units, the knee pitch axis and the ankle pitch axis of the leg in the flight position perform swing-up and swing-down motions alternately. Thus, the viscous resistance of the joints is desirably small. Likewise, the open-loop characteristics are desirably those shown in FIG. 13, in which the gain is constant for the low frequency range and the quantity of phase compensation for the high frequency range is large, with the gain being high.

In addition, the joint of the ankle pitch axis is subjected, at an instant of contact, to impact disturbances of a high frequency. At this time, the responsiveness in the high frequency range is desirably already procured. The gain in the low frequency range and the viscous resistance of the joint is desirably small. Thus, the joint of the ankle pitch axis at an instant of contact is desirably of characteristics shown in FIG. 13.

D. Stable Position Control of the Legged Mobile Robot

The sequence of operations for stabilizing the orientation during the operations on legs of the legged mobile robot 100 of the present embodiment, that is, during the concerted whole-body motions composed of the motions of the foot units, waist, body trunk and the lower limbs thereof, is now explained.

For stable orientation control, the ZMP is used. In the present embodiment, the site on the robot body with the maximum weight mass to act upon, for example, the waist or the basic operating unit, is set as a control target point on the robot body, as being the point of origin of the local coordinate. At this control target point, measurement means, such as acceleration sensor, is arranged, and the orientation or the acceleration at this position is directly measured in order to perform stable orientation control, based on the ZMP. An acceleration sensor is arranged on the foot unit, as a site of contact with the floor surface, in order to measure the local coordinate used for control and the coordinate directly, and in order to set up a ZMP equation directly at the foot unit closest to the ZMP position.

D-1. Introduction of the ZMP Equation

The legged mobile robot 100 of the present embodiment is an assemblage of an infinite number of mass points, that is a continuum of mass points. However, the robot is here replaced by an approximate model composed of a finite number of discrete mass points to diminish the volume of calculations for stabilization processing. More specifically, the legged mobile robot 100 physically having a multiple joint freedom degrees shown in FIG. 3 is replaced by multiple mass point approximation model shown in FIG. 19. The approximation model shown is a linear non-interfering multi-mass-point approximation model.

Figure 19:
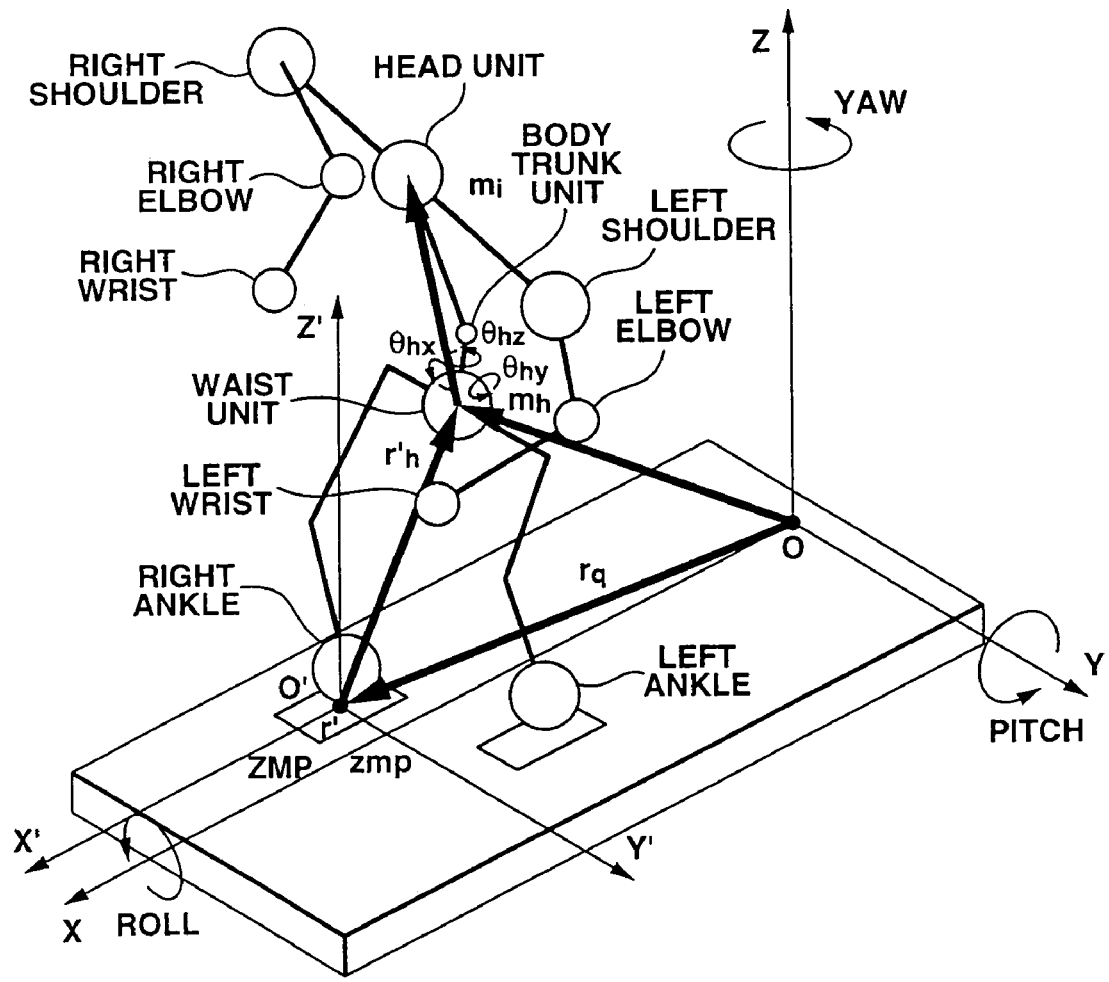
FIG. 19 shows a multi-mass-point approximating model of the legged mobile robot 100 having the multi-joint degree of freedom structure shown in FIG. 3.

In FIG. 19, the O-XYZ coordinate system stands for the roll, pitch and yaw axes in the absolute coordinate system, whilst the O'-X'Y'Z' stands for the roll, pitch and yaw axes in the kinematic coordinate system moving with the robot 100. The parameters used in the figure follow. The dashed symbols (') stand for the kinematic coordinate system.

$m_h$: the weight mass of the mass points of the waist unit $\vec{r}'_h$ ($r'_{hx}, r'_{hy}, r'_{hz}$): the potential vector of the mass points of the waist unit $m_i$: the weight mass of the i'th mass point $\vec{r}_i$: the potential vector of the i'th mass point $\vec{r}'_{zmp}$: the potential vector of the ZMP (3)

$\vec{g}$ ($g_x, g_y, g_z$): the vector of the gravitational acceleration

O'-X'Y'Z': the kinematic coordinate system, moving with the robot

O-XYZ: the absolute coordinate system

In the multiple mass point model, shown in FIG. 19, i denotes a suffix which stands for an i'th mass point, and mi stands for the mass of the i'th mass point and $r_i'$ stands for the position vector of the i'th mass point (of the kinematic coordinate system). The center of gravity of the robot body of the legged mobile robot 100 of the present embodiment is in the vicinity of the waist unit. That is, the waist unit represents a mass point of the maximum weight mass to act upon. In FIG. 19, the weight mass is $m_h$, with its position vector (of the kinematic coordinate system) being $r'_h$ ($r'_{hx}, r'_{hy}, r'_{hz}$). The position vector (of the kinematic coordinate system) of ZMP of the robot body is $r'_{zmpx}, r'_{zmpy}, r'_{zmpz}$. Meanwhile, each rotational angle ($\theta_{hx}, \theta_{hy}, \theta_{hz}$) in the waist unit information prescribes the orientation of the waist unit, that is, the rotation of the roll, pitch and yaw axes in the legged mobile robot 100.

The world coordinate system O-XYZ is the absolute coordinate system and is invariable. In the legged mobile robot 100, acceleration sensors 93, 94 and 96 are arranged in the waist unit and in the foot units of the legs. Based on the outputs of these sensors, the vector of the relative position of the world coordinate system rq with respect to the waist unit and the upstanding legs may be detected directly. On the other hand, the kinematic coordinate system, that is, the local coordinate system, of the robot body, is moved with the robot.

The ZMP equation of the robot body states the relationship of equilibrium of the respective moments, as applied to the control target point. If the robot body is represented by numerous mass points mi, as control target points, as shown in FIG. 19, the sum of the moments applied to all of the control target points mi is found by the ZMP equation.

The ZMP equation of the robot body, described by the world coordinate system (O-XYZ), and the local coordinate system (O'-X'Y'Z') of the robot body may be represented by the following equations, $$\sum_{j}^{all-particles} m_i(r_i - r_{zmp}) \times \ddot{r}_i + T - \sum_{j} M_j - \sum_{k}(s_k - r_{zmp}) \times F_k = 0 \quad (4)$$

$$r = r' + r_q$$

-continued $$\sum_{j}^{all-particles} m_i(r'_i - r'_{zmp}) \times (\ddot{r}'_i + r_q) + T - \sum_{j} M_j - \sum_{k} (s'_k - r'_{zmp}) \times F_k = 0$$

$$\ddot{r} = \ddot{r}' + \ddot{r}_q$$

which equation states that the sum of the moments about the ZMP (radius $r_i - r_{zmp}$) generated by acceleration components applied to the respective mass points $m_i$, the sum of the moments $M_i$ of external forces applied to the respective mass points mi and the sum of the moments about ZMP generated by the external forces $F_k$, with a point of action of the k'th force $F_k$ being $s_k$, counterbalance one another.

This ZMP equilibrium equation contains a total moment compensation quantity, that is, a moment error component T. The orientation stability of the robot body may be maintained by setting the moment error to zero or suppressing the moment error to within a preset tolerable range. Stated differently, correcting the motions of the robot body (the foot unit motion or the trajectory of respective sites of the upper body portion) so that the moment error will be zero or less than the allowable value, represents the essence of stable orientation control which relies upon ZMP as reference for verifying the degree of stability.

In the present embodiment, in which the acceleration sensors are provided to the waist unit and to the left and right foot units, the ZMP equilibrium equation may be derived directly and precisely using the measured results of the acceleration at these control target points. The result is that more rigorous stable orientation stability may be realized at a higher speed.

In the present embodiment, in which the acceleration sensors 96, 93 and 94 are provided at the foot soles of the foot units as the points of contact with the floor surface, it is possible to set the local coordinate system with respect to the world coordinate system to find the foot soles of the foot units as the points of origin to directly derive the ZMP equilibrium equation. Moreover, by mounting the acceleration sensors in the control target points with a large weight mass to act upon, including the waist unit first of all, the moment about the ZMP may be directly derived, using an acceleration sensor output value, from one control target point to another.

Since the real robot as a subject of control is a mobile device, it is difficult to find the position vector on the world coordinate at each control target point. As an alternative method, the position vector on the target control point on the local coordinate can be found by a relatively easy calculating method, such as inverse kinematic calculations. It is therefore sufficient to perform actual orientation stabilizing processing using the latter ZMP equilibrium equation stated by the local coordinate system (O-X'Y'Z') of the robot body. Since it is difficult to make accurate measurement of the ZMP trajectory on the world coordinate system with a status sensor loaded on the robot, an external measurement unit, fixed to the world coordinate system, is needed, so that the action of the robot by itself, such as walking, ceases to be possible. The ZMP trajectory can be accurately and directly measured by the local coordinate by providing a weight sensor at the floor contact point to measure the ZMP trajectory. In addition, the information which becomes dominant in the high speed motion can be directly measured by providing the acceleration sensor in the vicinity of the point of origin of the local coordinate system. For this reason, the ZMP equilibrium equation in the local coordinate system is used in the present embodiment.

D-2. Stable Orientation Control of Full-Body Concerted Type

Figure 20:
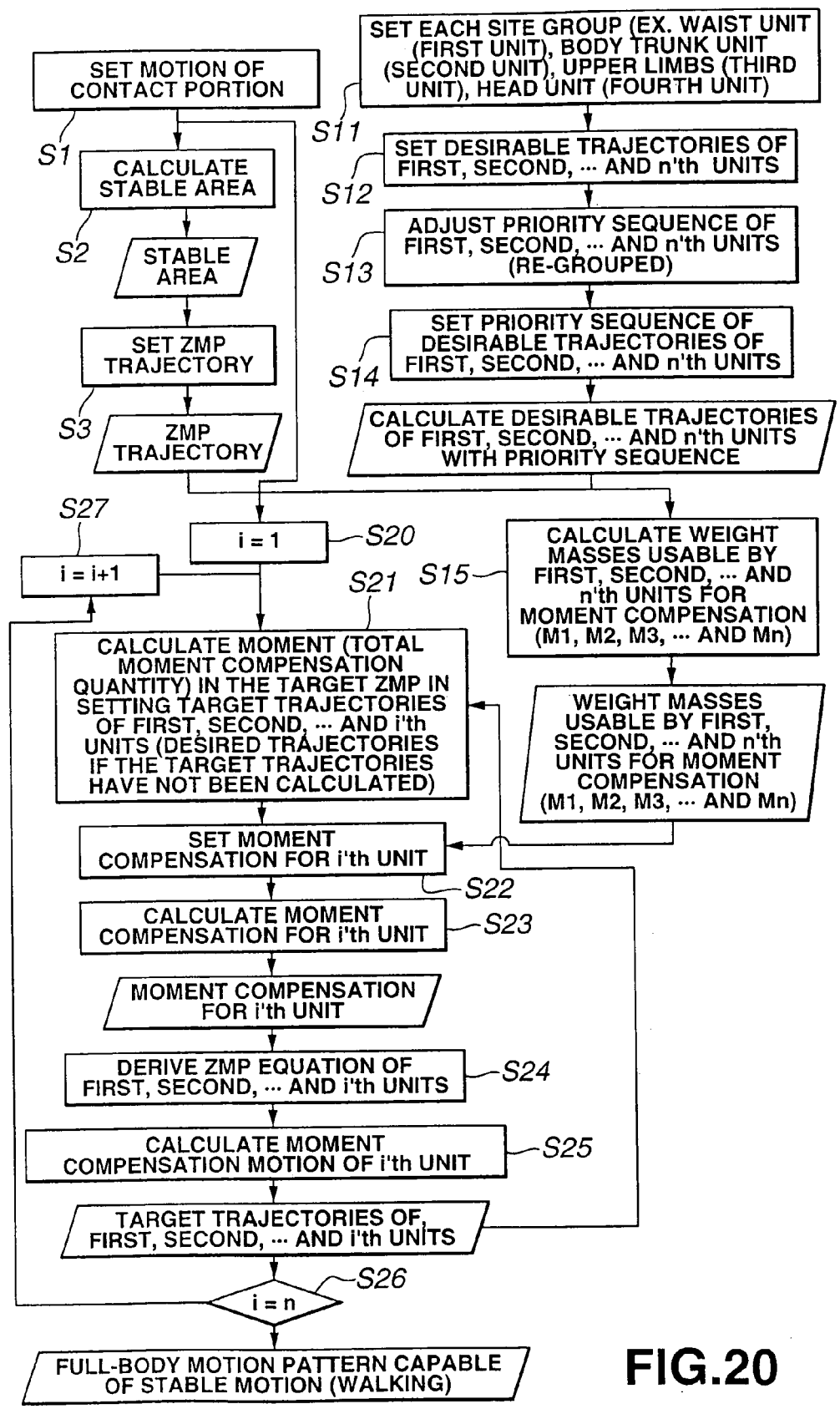
FIG. 20 is a flowchart showing the processing sequence for generating a robot body motion of the legged mobile robot 100 capable of performing stable walking using the ZMP as the standard for discriminating the degree of stability.

FIG. 20 shows, in the form of a flowchart, the processing sequence for generating the robot body capable of performing stable walking using ZMP as the reference for checking the degree of stability. However, in the following explanation, the respective joint positions and motions of the legged mobile robot 100 are stated using a linear non-interference multi-mass-point approximation model shown in FIG. 19.

First, the motion setting is made at the floor contact point of e.g. the foot unit (step S1). The motion of the foot unit is motion data in which two or more postures of the robot body are interconnected chronologically. The motion data are data previously prepared and edited using e.g. a motion editing device, and is made up by the spatial joint information representing the displacement of the joint angles of the foot units and the Cartesian spatial information representing the joint positions.

The ZMP stable area is then calculated, based on the motion at the contact site, such as at the foot unit (step S2). Or, the ZMP stable area is calculated, based on the desired trajectory with the ranking for preference as set from one site group to another (step S14 as later explained). If the contact point of the robot on the floor surface is not the foot sole, as in the case of the floor exercise or handstand exercise, the ZMP stable area is calculated based on a support polygon formed by the contact points other than the foot sole points and the floor surface.

The ZMP is a point where the moment applied to the robot body becomes zero, as described above, and is basically situated within a support polygon defined by the foot sole contact point and the floor surface. The ZMP stable area is an area provided further inwardly of the support polygon. By the ZMP lying in this area, the robot body may be maintained in a highly stabilized state.

The ZMP trajectory for the motion of the foot units is set, based on the motions of the foot units and the ZMP stable area (step S3). If the contact point of the robot on the floor surface is not the foot sole, as in the case of the floor exercise motion or handstand exercise motion, the ZMP trajectory is set based on a support polygon formed by the contact points other than the foot sole points and the floor surface.

The respective sites of the robot body are set in different groups, such as a waist unit, a body trunk unit, upper limbs and a head unit (step S11).

Figure 21:
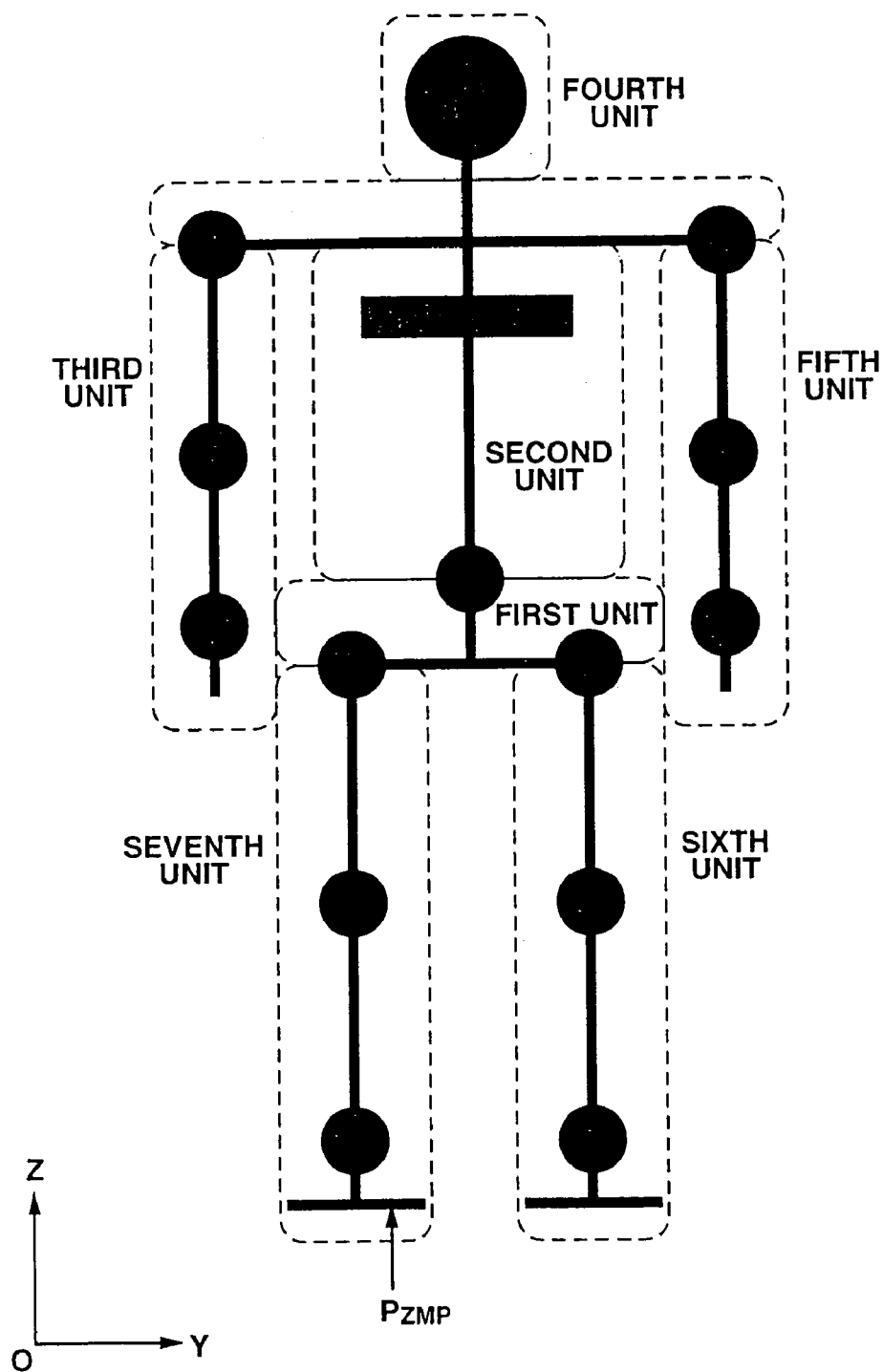
FIG. 21 schematically shows an example of setting a site group of the robot body.

FIG. 21 shows an example of setting of the site groups of the robot body. In the example, shown in FIG. 21, seven site groups, namely the first to seventh sites of the waist part, body trunk unit, right arm unit, head unit, left arm unit, left leg unit and the right leg unit, are set in this order. Each site group is made up by plural mass points. The mass points may be set manually by a designer or automatically in accordance with a predetermined rule. For example, the sites with a large weight mass to act upon, such as a joint actuator, is set as a mass point. If the number of the points of the i'th site is $n_i$, the total weight mass $m_i$ of the i'th site group (unit i) is as represented by the following equation (5):

$$m_i = \sum_{i}^{n_i} m_i \qquad (5)$$

The desirable trajectory is set from one site group to another (step S12). The setting of the desirable trajectory for each site group of the robot body is carried out off-line using e.g. a motion editing device.

The group setting for each site is then adjusted (re-grouped) in a step S13 and an order for preference then is accorded to each of these groups in a step S14. The order for preference means the order for processing steps for calculations used for stable orientation control of the robot body, and is set depending on the amount of the weight mass to act on or the amount of the moment for operation. As a consequence, a set of desirable trajectories with preferential sequence for the respective sites of the robot body is prepared. The connection conditions for the respective sites (connection to the local coordinate, position-fixed connection of a specified site to the world coordinate or orientation connection of a specified site to the world coordinate) are set. The sequence of preference may be changed with time t.

The preferential sequence for the respective sites is then determined by referring to the pre-scheduled action plan in addition to referring to the amount of the weight mass to act on or the amount of the moment for operation. During the time of the motions on legs, including the walking, first of all, the trajectory of the foot unit contacting the floor cannot be corrected. Thus, the foot unit contacting the floor is given a lower preferential sequence. The trajectory of the hand which grabs an object cannot be corrected, and hence is accorded a lower preferential sequence. When the robot is walking on a narrow alley in a transverse direction, correction of the trajectory of the waist unit is likely to produce collision on the wall surface. Thus, a lower preferential sequence is given to this site.

The weight mass that can be used for moment compensation is calculated from one site group to another (step S15). In the example shown in FIG. 21, the ZMP position $P_{ZMP}$ is on the right foot unit, with the right leg being then in the stance position, and hence the weight mass $M_i$ that can be used for moment compensation for each site group is given by the following equations (6):

$$M_1 = \sum_{m=1}^{5} m_m \qquad (6)$$

$$M_2 = \sum_{m=2}^{5} m_m$$

$$M_3 = m_3$$

$$M_4 = m_4$$

$$M_5 = m_5$$

$$M_6 = m_6$$

$$M_7 = \sum_{m=1}^{7} m_m$$

Figure 22:
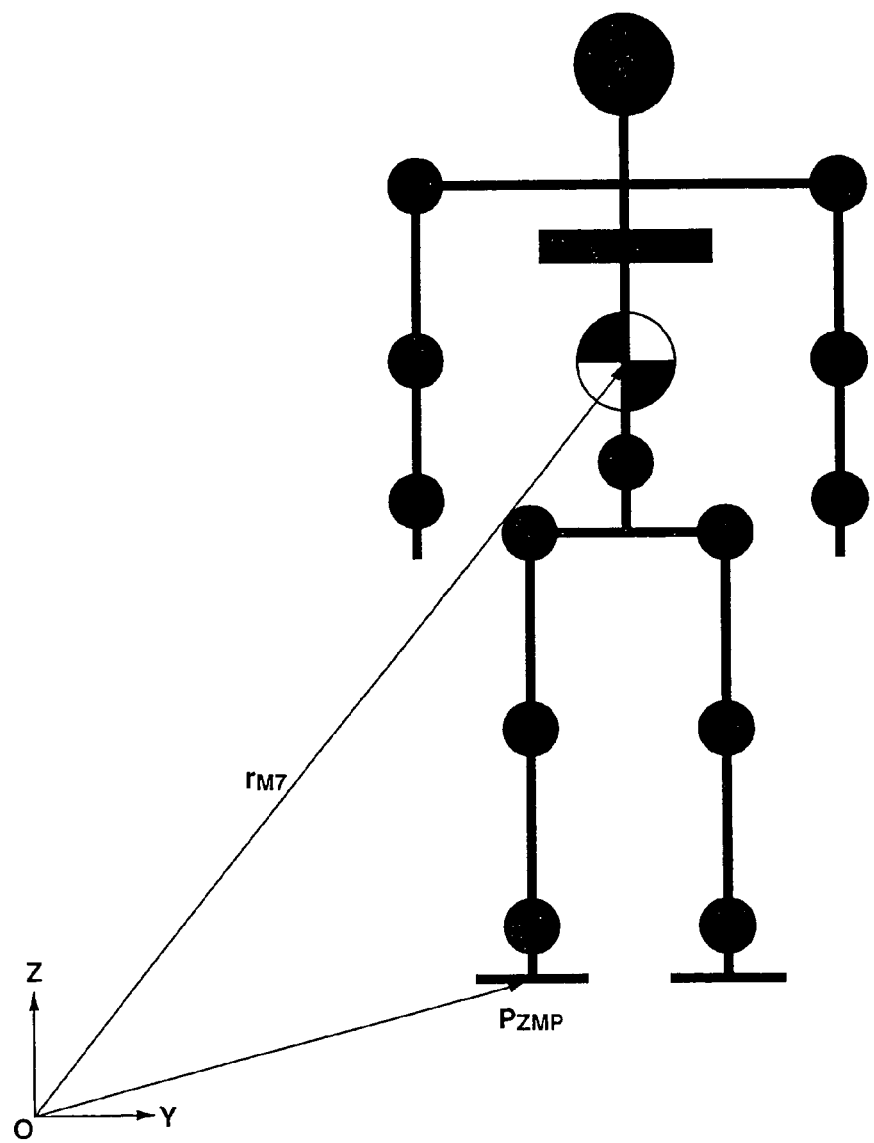
FIG. 22 shows the position of the center of gravity of a weight mass M7.

The first unit, that is the waist unit, is able to use not only the waist unit itself but also the body trunk unit, right arm unit, head unit and the left arm unit that it supports for moment compensation. The second unit, that is, the body trunk unit, is able to use not only the body trunk unit itself but also the right arm unit, head unit and the left arm unit it supports for moment compensation. The third to sixth units, namely the right arm unit, head unit, left arm unit and the left leg unit, as the leg in the flight state, support no site units, and hence the own sites represent the weight masses usable for moment compensation. The seventh unit, as the upstanding leg, that is, the right leg unit, supports the totality of the site groups, and hence is able to use the sum of weight masses M7 of all sites of the robot body for moment compensation. The center of gravity position of the weight mass M7 in this case is not at the foot unit but is equivalent to the center of gravity position of the robot body (see FIG. 22).

Based on the motion of the contact site of e.g. the foot unit, ZMP trajectory and a set of desirable trajectories of the respective site groups of the robot body, the motion patterns of the respective site groups are injected into the orientation stabilizing processing, in accordance with the preferential order as set in the step S14.

In this orientation stabilizing processing, an initial value 1 is substituted into a process variable i (step S20). The quantity of the moment on the target ZMP when target trajectories are set for all site groups, that is, the quantity of the total moment compensation $\Omega$, is calculated (step S21). The quantity of the total moment compensation $\Omega$ is the sum of the moments of the site groups on the target ZMP plus the unknown external force moment and the unknown external force, identified by the above equation, as known terms.

$$\Omega = \sum_{i}^{all\_particles} m_i(r_i - P_{zmp}) \times \ddot{r}_i - \sum_{j} M_j - \sum_{k}(S_k - P_{zmp}) \times F_k \qquad (7)$$

For a site for which the target trajectory has not been calculated, a desired trajectory is used.

Then, using the weight mass $M_i$, usable for moment compensation for the site i calculated in the step S15, a coefficient $\alpha_i$ for the quantity of compensation of the absolute moment is set (step S22) and the quantity of the moment compensation $\Omega_i$ is calculated for the site group i (step S23).

$$\Omega_i = \frac{\alpha_i}{\sum_{i}^{n} \alpha_i} \Omega \qquad (8)$$

$$\alpha_i = \beta_i \times \frac{M_i}{\sum_{i=1}^{n} M_i}, \text{ where } \sum_{i=1}^{n} \alpha_i = 1.0$$

$\beta_i$: the quantity of compensation of the relative moment

Using quantity of the moment compensation $\Omega_i$ of the i'th site, as calculated, a ZMP equation (E1) concerning the i'th unit is derived (step S24).

(E1) \qquad (9)

-continued total mass points usable for moment compensation of $i'$th site
$$\sum_i m_i$$
$$(\Delta r_i - P_{zmp}) \times \Delta \ddot{r}_i + \Omega_i = 0$$

The ZMP equation has many unknown variables and hence it is difficult to find a solution not only analytically but also in the perspective of numerical calculations. Thus, the following approximate ZMP equation (E2) has been derived, in which a desirable center of gravity trajectory $r_{Mi}$ of the mass usable for moment compensation of the i'th site is a known variable and in which a correction amount $\Delta r_{Mi}$ for the desirable center of gravity trajectory of the mass usable for moment compensation of the i'th site is an unknown variable, where $r_{Mi}$ is the position vector of the center of gravity of the weight mass $M_i$ usable for moment compensation in the i'th site group.

$$M_i(\Delta r_{M_i} - P_{zmp}) \times \Delta \ddot{r}_{M_i} + \Omega_i = \ldots \text{(E2)} \quad (10)$$

By solving the approximate ZMP equation, the correction amount $\Delta r_{Mi}$ with respect to the desirable center of gravity trajectory of the weight mass usable for moment compensation of the i'th site is calculated, and the target center of gravity trajectory of the weight mass usable for moment compensation of the i'th site is calculated in accordance with the following equation (11):

$$r_{iM_i} = \Delta r_{M_i} + r_{M_i} \quad (11)$$

Meanwhile, in the case of the legged mobile robot in which the respective links are interconnected by rotary joints the above equation (E2) generally owns the motion in the Z-direction in common, so that the equation is linear non-interference degree-two differential equation, such that it is difficult to find a solution by analytical means. Thus, the motion in the Z-direction is not to be co-owned and the linear non-interferencing of the equation (E2) is carried out, as now indicated.

$$\Delta r_{M_{iz}} = \text{constant}, \Delta \ddot{r}_{M_{iz}} = 0 \quad (12)$$

An approximate solution of the target center-of-gravity trajectory of the weight mass usable for moment compensation of the i'th site is then calculated, the correction amount $\Delta r_i$ of each mass point $r_i$ of the i'th site, calculated from this approximate solution, is substituted into the equation (E1), as the rigorous ZMP equation, to find an error of the moment. The moment error is then inverted in sign and stored in the right side of the linear non-interference equation (E2) to find the approximate solution again. This sequence of operations is repeated until the error is less than the preset allowable value to calculate the moment compensation motion of the site in question (step S25). In this manner, the target trajectory may be found as to the sites with the preferential order of from the leading end up to number i.

For calculating the trajectory of each mass point of the i'th site from the approximate solution of the target center-of-gravity trajectory of the mass usable for moment compensation of the i'th site, an operating point is set in an optional i'th site, and a center-of-gravity vector $C(X, Y, Z, \theta_x, \theta_y, \theta_z)$, having the translational positions (X, Y, Z) or the rotational angles ($\theta_x, \theta_y, \theta_z$) as unknown variables, is derived. An equation $C(X, Y, Z, \theta_x, \theta_y, \theta_z) = r_{iMi}$ wherein the center-of-gravity vector $C(X, Y, Z, \theta_x, \theta_y, \theta_z)$ is introduced in the left side as an unknown variable and the position vector $r_{Mi}$ of the center of gravity of the mass $M_i$ is introduced as a known variable in the right side is derived. The solution of this equation is found by a numerical search method or by analytic means to determine the trajectory of each mass point of the i'th site.

By carrying out the above processing on all of the site groups, a whole-body motion pattern capable of stable motion, such as walking, may be generated.

Since the acceleration sensors 96, 93 and 94 are provided at the waist unit and on the left and right foot units, the aforementioned ZMP equilibrium equation may be derived directly to high precision, using the measured results of the acceleration sensors in these control target points, as described above. The result is that the stable orientation control derived from the ZMP stability decision reference may be executed speedily and more rigorously in accordance with the processing sequence shown in FIG. 20.

E. Falldown Operation of the Legged Mobile Robot

Basically, the legged mobile robot 100 of the present embodiment executes the stable orientation control during walking and other operations, with the robot in the erected state, based on the ZMP stability decision reference, to suppress the occurrence of events such as falldown of the robot body to a minimum. However, if the falldown becomes unavoidable, a sequence of the falldown operations composed of a motion pattern which will prevent damage to the robot body is to be executed. For example, if, in the aforementioned ZMP equilibrium equation, an excess external force F or an excess external force moment M is applied to the robot body, the moment error component T cannot be canceled if only the motion of the robot body is resorted to, such that the orientation stability cannot be maintained.

Figure 23:
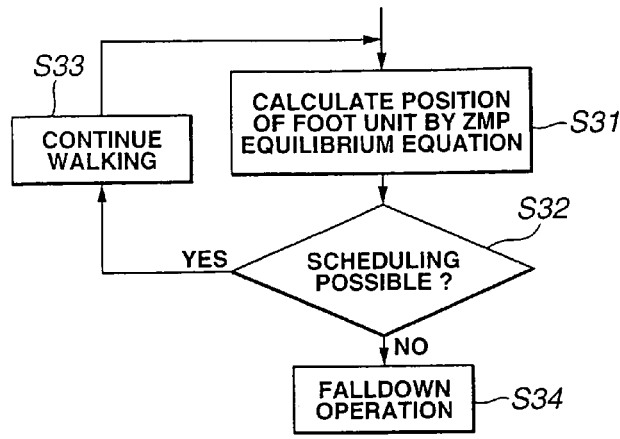
FIG. 23 is a flowchart illustrating the schematic processing sequence of motion control of the robot body of the legged mobile robot 100 during the operations on legs.

FIG. 23 shows, in the form of a flowchart, the schematic processing sequence for motion control of the robot body during the operation on legs of the legged mobile robot 100 of the present embodiment.

In the course of the motion of the robot body, the ZMP equilibrium equation is set, using sensor outputs of the floor contact (floor reaction force) check sensors 91, 92 and the acceleration sensors 93, 94, provided to the left and right foot units, and the acceleration sensor 96, provided to the waist unit, to calculate the contact positions of the foot unit at all times (step S31).

For example, if an external force is applied to the robot body, it is checked whether or not it is possible to schedule the next contact position of the foot units, that is, whether or not the moment error by the external force can be resolved by the action plan of the foot units (step S32). Whether or not the foot unit setting position can be scheduled is verified in consideration of the movable angle of the respective joints of the leg units or the torque, joint force, angular velocity or angular acceleration of the respective actuators. Of course, when the external force is applied, the moment error may be resolved by the motion on legs of not only the next step but also several steps.

If the scheduling of the foot units is possible, the walking or the other motions on legs is continued (step S33).

If, due to an excess external force or an excess external moment is applied to the robot body, the scheduling of the foot unit is impossible, the legged mobile robot 100 commences the falldown motion (step S34).

In the case of the erect walking type legged robot, shown in FIGS. 1 and 2, in which the center of gravity position is high, inadvertent falldown on the floor surface tends to damage the robot itself or the object on which the robot collides on falldown. Thus, in the present embodiment, the trajectory of the robot body, scheduled before falldown, is changed to such a posture in which the ZMP support polygon will be of a minimum size, in order to carry out the preset falldown operation. Basically, the falldown motion is searched on the basis of the following two guidelines.

(1) the variation per unit time t of an area S of a support polygon of the robot body, or $\Delta S/\Delta t$, is of a minimum size; and (2) the support polygon on falldown on the floor surface is of the maximum size.

By adopting this type of the falldown method, the impact applied from the floor surface on descent is distributed to the entire body to reduce the damage to a minimum.

Figure 24:
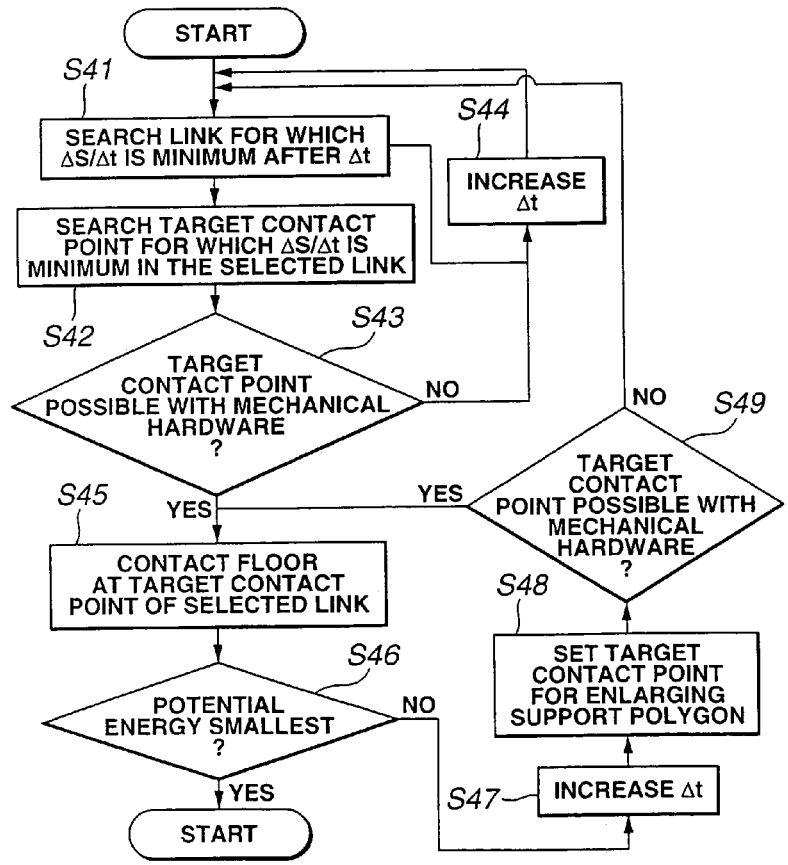
FIG. 24 is a flowchart illustrating the processing sequence for the legged mobile robot 100 to perform a falldown motion due to insufficient scheduling of the foot units.

FIG. 24 shows, as a flowchart, the processing sequence for the legged mobile robot 100 of the present embodiment to perform the falldown motion due to impossibility of scheduling of the foot units. The falldown motion is realized by the shoulder joint pitch axis 4, body trunk pitch axis 9, hip joint pitch axis 12 and the knee joint pitch axis 14, interconnected in the height-wise direction, in the synchronously concerted fashion in accordance with the above-described guidelines. In actuality, the processing sequence is realized by the main controller 81 carrying out the preset robot body control program to effect driving control of the respective parts.

First, the link which minimizes the variation per unit time t of an area S of a support polygon of the robot body, or $\Delta S/\Delta t$, is searched (step S41).

The target contact point of the link, selected in the step S41, and which will minimize the variation $\Delta S/\Delta t$, is searched (step S42).

It is then checked whether or not setting the link selected in the previous step on the target floor contact point is possible under the constraint of the hardware of the robot body (including the movable angle of the respective joints of the leg units or the torque, joint force, angular velocity or angular acceleration of the respective actuators) (step S43).

If it is found that the setting of the link selected in the previous step on the target floor contact point is not possible, the time variation $\Delta t$ is incremented a preset amount (step S44), after which processing reverts to the step S41 to re-select the link and re-set the target floor contact point of the link.

On the other hand, if it is found that the setting of the link selected in the previous step on the target floor contact point is possible, the selected link is set on the target floor contact point (step S45).

It is then checked whether or not the potential energy of the robot body is minimum, that is, whether or not the falldown motion has been finished (step S46).

If the potential energy of the robot body is not minimum, that is, in case the potential energy of the robot body is not as yet minimum, the time variation $\Delta t$ is further incremented a preset amount (step S47), to set the next target floor contact point such as to increase the area of the support polygon (step S48).

It is then checked whether or not setting the selected link on the target floor contact point is possible under the constraint of the hardware of the robot body (including the movable angle of the respective joints of the leg units or the torque, joint force, angular velocity or angular acceleration of the respective actuators) (step S49).

If it is found that the setting of the link selected in the previous step on the target floor contact point is not possible, processing reverts to the step S41 to re-select the link and to re-set the link on the target floor contact point.

On the other hand, if it is found that the setting of the link selected in the previous step on the target floor contact point is possible, processing transfers to the step S45 to set the selected link on the target floor contact point.

When the potential energy of the robot body is minimum (step S46), the contact of the robot body on the floor surface comes to a close, so that the present processing routine in its entirety comes to a close.

E-1. Falldown Motion to the Supine Posture

Figure 25:
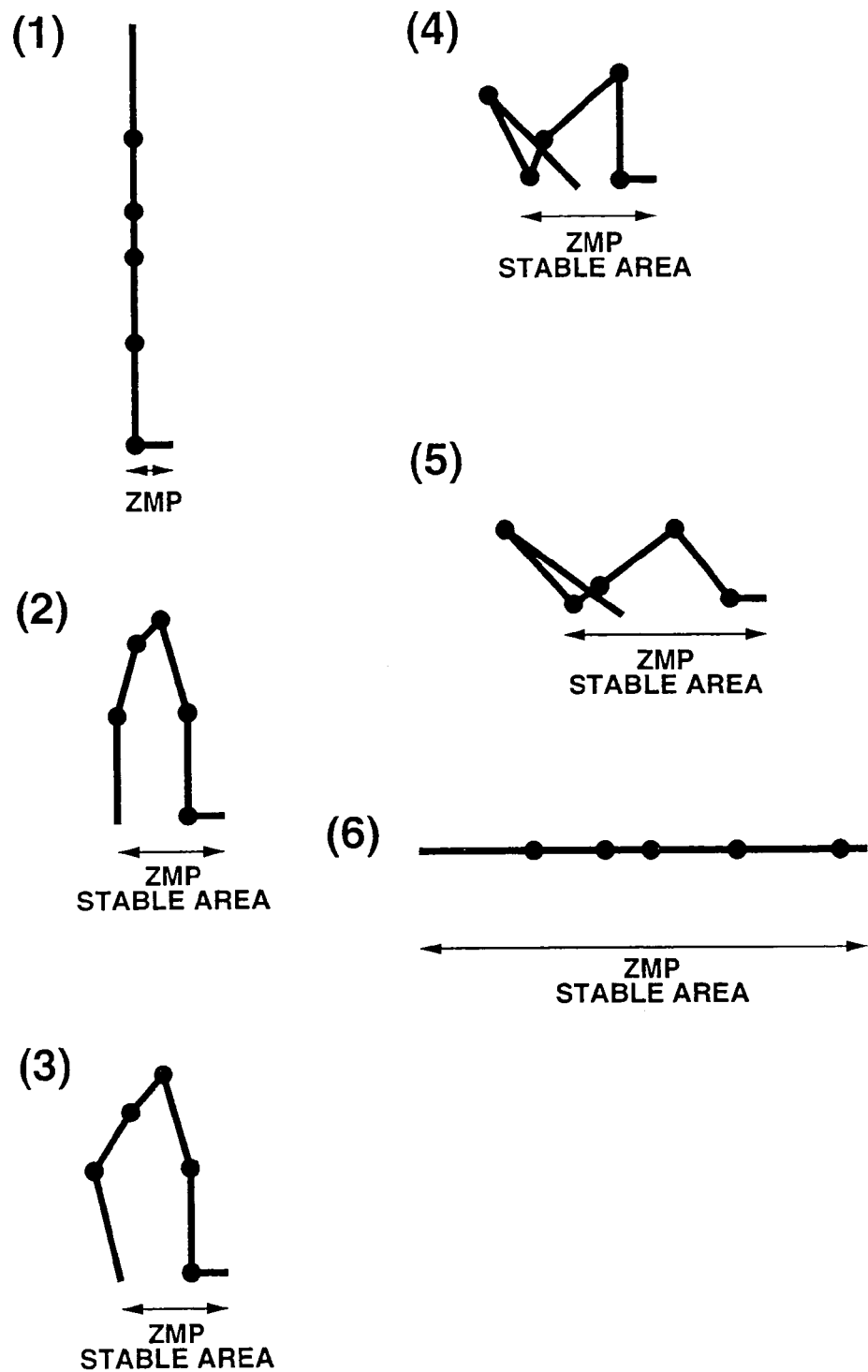
FIG. 25 shows how the legged mobile robot 100 is modeled as a link structure made up by a shoulder joint pitch axis 4, a body trunk pitch axis 9, a hip joint pitch axis 12 and a knee joint pitch axis 14 interconnected in the height-wise direction and also shows how the respective joint pitch axes are driven in synchronously concerted fashion to cause the robot to fall down to a supine position.

FIG. 25 shows how the legged mobile robot 100 is modeled as a link structure made up by a shoulder joint pitch axis 4, a body trunk pitch axis 9, a hip joint pitch axis 12 and a knee joint pitch axis 14 interconnected in the height-wise direction and also shows how the respective joint pitch axes are driven in synchronously concerted fashion to cause the robot to fall down to a supine position.

It is assumed that the robot is standing on only the foot soles as the link ends of the link structure (FIG. 25(1)).

When the external force or the external force moment is applied at this time, the moment error term T of the ZMP equilibrium equation cannot be canceled. The robot commences the falldown operation, in response to the ZMP departing from the ZMP stable area formed by only the foot soles, as the ZMP is kept to the supporting polygon.

In the falldown motion, such a link is searched which minimizes the variation $\Delta S/\Delta t$ per time t of an area S of the support polygon, formed by the contact sites of the robot body, at the same time as the target contact point of the hand end included in the link which minimizes the variation $\Delta S/\Delta t$. It is then verified whether or not setting the link selected in the previous step on the target floor contact point is possible under the constraint of the hardware of the robot body (including the movable angle of the respective joints of the leg units or the torque, joint force, angular velocity or angular acceleration of the respective actuators).

If the setting of the link is possible under the constraint of the hardware of the robot body, another link contacts the floor, in addition to the foot sole link already contacting the floor. The ZMP is moved to a space within the support polygon formed by these links contacting the floor (FIG. 25(2)).

As long as the hardware of the robot body permits, the floor contact point is moved to enlarge the support polygon (FIG. 25(3)).

If the floor contact point is no longer movable, under the constraint of the hardware of the robot body (including the movable angle of the respective joints of the leg units or the torque, joint force, angular velocity or angular acceleration of the respective actuators), it is verified whether or not the floor clear link, sandwiched between the links contacting the floor, is able to contact the floor.

If, under the constraint of the hardware of the robot body, the floor clear link between the floor contacting links is able to contact the floor, these are allowed to contact the floor to increase the number of the links contacting the floor (FIG. 25(4)).

The floor contact points are moved, as long as the hardware of the robot body permits, to enlarge the support polygon (FIG. 25(5)).

Finally, one or more links from one end of the link structure, composed of substantially parallel plural joint axes along the height-wise direction and two or more links from the opposite side thereof, are caused to clear the floor, one or more links lying in-between are caused to contact the floor, and further the foot units are caused to contact the floor. In this state, as the ZMP is kept within the support polygon, such a posture which will maximize the size of the support polygon is formed. If, in this orientation, the potential energy of the robot body is smallest, the falldown motion comes to a close.

FIGS. 26 to 31 show how the actual robot falls down from the standing posture to the supine posture. Although the examples shown in the respective drawings show how the external force is applied from the front side of the robot body to cause the robot body to fall down in a supine posture, the motion states can be comprehended in six stages of A to F.

Figure 32:
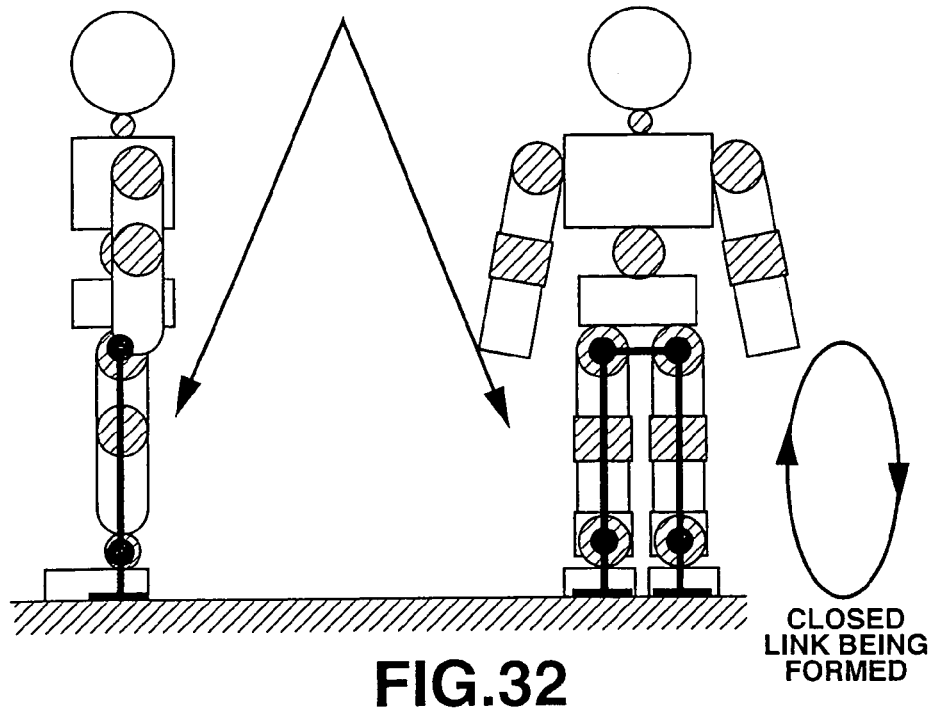
FIG. 32 shows how both legs and the floor surface form a closed link system, in the upstanding posture of the robot, with both legs in the stance position.
Figure 33:
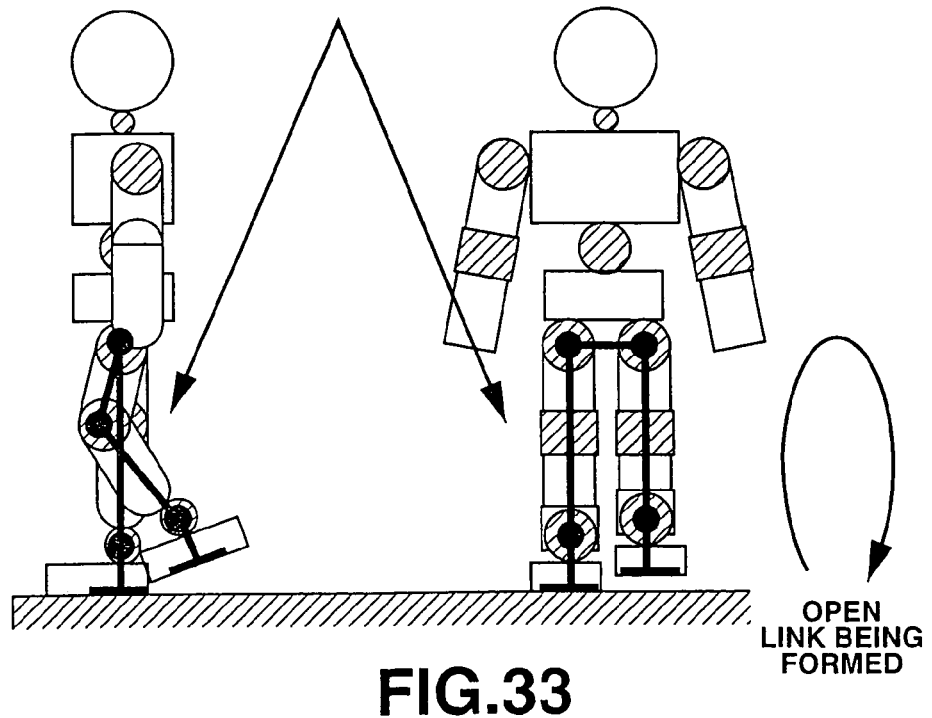
FIG. 33 shows how both legs and the floor surface form an open link system, in the upstanding posture of the robot, with one of the legs in the stance position.

The robot body of the legged mobile robot is made up by a multi-link structure comprised of an interconnection of plural joint axes having substantially parallel plural degrees of joint freedom along the lengthwise direction. In the course of the falldown motion to the supine posture, the link state defined by the floor contact points of the multi-link structure and the floor surface is switched between the open link state and the closed link state. FIG. 32 shows that, in the upstanding posture, both legs in the stance state and the floor surface form a closed link system. FIG. 33 also shows that the open link is formed by both legs, one of which is in the stance position, and the floor surface.

In the present embodiment, the actuators for driving the respective joints are switched between stiff joint characteristics, soft joint characteristics and intermediate joint characteristics, responsive to the switching of the link states, in each stage of the falldown, in order to realize adaptive falldown motions. The stiff joint characteristics are defined as setting servo characteristics of the actuator motors so that the gain is high for the entire frequency range and the quantity of the phase lead in the high frequency range is small, as shown in FIG. 12, and so that the motor viscosity is set to the maximum value of motor characteristics shown in FIG. 17A. The intermediate joint characteristics are defined as setting servo characteristics of the actuator motors so that the gain is low for the low frequency range and the quantity of the phase lead in the high frequency range is large, as shown in FIG. 13, and so that the motor viscosity is set to the maximum value of motor characteristics shown in FIG. 17A. The soft characteristics are defined as setting servo characteristics of the actuator motors so that the gain is low for the low frequency range and the quantity of the phase lead in the high frequency range is large, as shown in FIG. 13, and so that the motor viscosity is set to one-third of the maximum value of motor characteristics shown in FIG. 17B.

(A) State of Both Legs Being in the Stance Position Prior to Falldown

The state of both legs being in the stance state is the orientation controlled state in which the lower limbs and the floor surface form a closed link system (see FIG. 26).

At this time, the actuators of all of the joint sites of the left and right legs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. The result is that the legs in the stance state are capable of high speed response, while compliance is achieved, and the motor viscosity is increased.

The neck roll, pitch and yaw axes are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to the positioning accuracy and robustness against oscillatory disturbances is achieved. In addition, the positioning accuracy of the joint, as a main component for controlling the quantity of ΔS/Δt, as a reference in controlling the falldown motion, may be procured, so that the motion stability is increased.

(B) Start of Falldown Motion (Closed Link State)

The start of falldown of the robot body can be detected based on the output of the orientation sensor. In the initial stage of the falldown, the lower limbs and the floor surface define a closed link system (see FIG. 27). Responsive to the external force and the impact, reaching the falldown, the falldown motion which will minimize the impact is commenced.

At this time, the actuators of the joint sites taking part in the stable area control, such as the left and right thigh roll and pitch axes are maintained in the intermediate joint characteristics in which the servo characteristics of the actuator motors are set so that the gain is low in the low frequency range and the quantity of the phase lead in the high frequency range is large, as shown in FIG. 13, and so that the motor viscosity is set to the maximum value of motor characteristics shown in FIG. 17A. The result is that the thigh unit is capable of high speed response, whilst compliance is achieved and the motor viscosity is increased.

On the other hand, as for the joint sites taking part in potential energy control, such as left and right ankle roll and pitch axes or the knee pitch axis, high speed response and compliance are crucial. Thus, the actuators of these joint sites are set to soft characteristics defined as setting servo characteristics of the actuator motors so that the gain is low for the low frequency range and the quantity of the phase lead in the high frequency range is large, as shown in FIG. 13, and so that the motor viscosity is set to one-third of the maximum value of motor characteristics shown in FIG. 17B.

The neck roll, pitch and yaw axes and other joint sites are set to stiff joint characteristics, that is, the servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to the positioning accuracy and robustness against oscillatory disturbances may be achieved. The positioning accuracy of the joint, as a main component for controlling the quantity of ΔS/Δt, as a reference in controlling the falldown motion, may be procured, thus increasing the motion stability.

(C) Progress of Falldown Motion (Open Link State)

When the falldown motion progresses, the legs in the stance position clear the floor, so that the entire robot body now forms an open link (see FIG. 28). For example, it can be detected from an output of the force sensor (or a contact sensor) provided on the foot sole that the foot sole is floated and the open link state is set.

Since all of the joint sites of the left and right legs take part in controlling the potential energy, fast response and compliance are crucial. Thus, the actuators of all of the joint sites of the legs are set to soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B.

On the other hand, the neck roll, neck pitch, neck yaw or other joint sites are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to the positioning accuracy to maintain robustness against disturbances, such as oscillations, and hence the positioning accuracy of the joints as a main component for controlling the quantity of $\Delta S/\Delta t$, usable as reference in controlling the falldown motion, is assured to increase the operational stability.

(D) Instant of Contact

As a result of the falldown, the robot body contacts the floor so that the robot body in its entirety forms a closed link system (see FIG. 29). For example, the impact of the contact can be detected using the output of the orientation sensor or the acceleration sensor. At this time, the motion for minimizing the impact and the external force applied from the floor surface is commenced.

In this case, all of the joint sites of the left and right legs take part in controlling the potential energy, so that compliance is crucial. Thus, the actuators of all of the joint sites of the legs are set to soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B. Since the system is now soft, it becomes possible to buffer the shock applied to the entire robot body.

The joint sites of the neck roll, neck pitch and the neck yaw are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. As a result, priority is attached to the positioning accuracy, while robustness against oscillatory disturbances may be assured. The motion of causing the head unit to be floated from the floor surface at the instant of contact may be generated to protect the head unit carrying crucial component parts, such as controllers, against damages otherwise caused by impact against the floor surface.

The other joint sites are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B. Since this yields a soft system, it is possible to buffer the impact caused to the entire robot body.

(E) Contact of the Entire Robot Body

When the contact motion of the robot body progresses, the robot body in its entirety contacts the floor to form a closed link system (see FIG. 30). The oscillations due to impact coming to a close may be detected using e.g. an orientation sensor.

Since the joint sites of the left and right legs take part in controlling the potential energy, compliance is crucial. Thus, the actuators of all of the joint sites of the legs are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B. Since this yields a soft system, it is possible to buffer the shock otherwise applied to the entire robot body.

The joint sites of the neck roll, neck pitch and the neck yaw are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. As a result, priority is attached to the positioning accuracy, while robustness against oscillatory disturbances may be assured.

(F) Normal Posture After Falldown

The state of both legs being in the stance position is the orientation-controlled state in which the entire robot body forms a closed link system (see FIG. 31). This normal state can be confirmed by the orientation sensor by checking that the oscillations caused by the impact have come to a close, a preset time, such as one second, has elapsed and no impact is then applied.

At this time, the actuators of all of the joint sites of the left and right legs are changed over from the soft joint characteristics to intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. As a result, the joint motors of the left and right legs are improved in viscosity and are able to make fast response. In addition, compliance is realized so that the robot is ready for the rise-up motion from the falldown.

The neck roll, neck pitch, neck yaw and other joint sites are set to stiff characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to the positioning accuracy, while robustness against oscillatory disturbances may be realized.

E-2. Falldown Motion to Prostrate Posture

Figure 34:
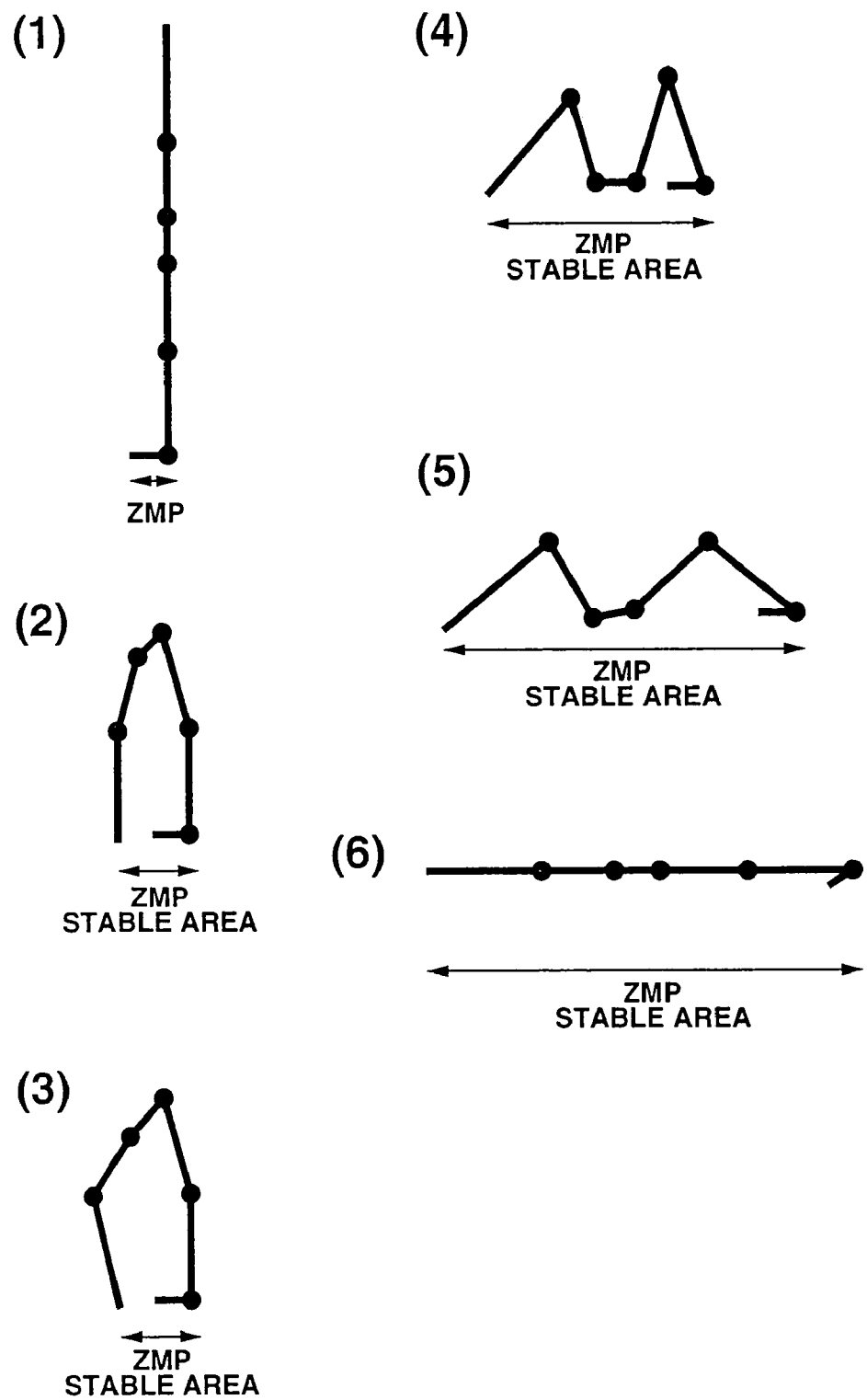
FIG. 34 shows how the legged mobile robot 100 is modeled as a link structure made up by a shoulder joint pitch axis 4, a body trunk pitch axis 9, a hip joint pitch axis 12 and a knee joint pitch axis 14, interconnected in the height-wise direction, and also shows how the respective joint pitch axes are driven in a synchronously concerted fashion to cause the robot to fall down to a prostrate position.

FIG. 34 shows how the legged mobile robot 100 is modeled as a link structure made up by a shoulder joint pitch axis 4, a body trunk pitch axis 9, a hip joint pitch axis 12 and a knee joint pitch axis 14, interconnected in the height-wise direction and also shows how the respective joint pitch axes are driven in synchronously concerted fashion to cause the robot to fall down to a prostrate position.

It is assumed that the robot is standing on only the foot soles as the link ends of the link structure (FIG. 34(1)).

When the external force or the external force moment is applied at this time, the moment error term T of the ZMP equilibrium equation cannot be canceled. The robot commences the falldown operation, in response to the ZMP departing from the ZMP stable area formed by only the foot soles, as the ZMP is kept to the supporting polygon.

In the falldown motion, such a link is searched which minimizes the variation $\Delta S/\Delta t$ per time t of an area S of the support polygon formed by the contact sites of the robot body, at the same time as the target contact point of the hand end, included in the link, which minimizes the variation $\Delta S/\Delta t$. It is then verified whether or not setting the link selected in the previous step on the target floor contact point is possible under the constraint of the hardware of the robot body (including the movable angle of the respective joints of the leg units or the torque, joint force, angular velocity or angular acceleration of the respective actuators).

If the setting of the link is possible under the constraint of the hardware of the robot body, another link contacts the floor, in addition to the foot sole link already contacting the floor. The ZMP is moved to a space within the support polygon formed by these links contacting the floor (FIG. 34(2)).

As long as the hardware of the robot body permits, the floor contact point is moved to enlarge the support polygon (FIG. 34(3)).

If the floor contact point is no longer movable, under the constraint of the hardware of the robot body, including the movable angle of the respective joints of the leg units or the torque, joint force, angular velocity or angular acceleration of the respective actuators, it is verified whether or not the floor clear link, sandwiched between the links contacting the floor, is able to contact the floor.

If, under the constraint of the hardware of the robot body, the floor clear link between the floor contacting links is able to contact the floor, these are allowed to contact the floor to increase the number of the links contacting the floor (FIG. 34(4)).

The floor contact points are moved, as long as the hardware of the robot body permits, to enlarge the support polygon (FIG. 34(5)).

Finally, one or more links from one end of the link structure, composed of substantially parallel plural joint axes along the height-wise direction and two or more links from the opposite side thereof, are caused to clear the floor, one or more links lying in-between are caused to contact the floor, and further the foot units are caused to contact the floor. In this state, as the ZMP is kept within the support polygon, such a posture which will maximize the size of the support polygon is formed. If, in this orientation, the potential energy of the robot body is smallest, the falldown motion comes to a close.

FIGS. 35 to 39 show how the actual robot falls down from the standing posture to the prostrate posture. Although the examples shown in the respective drawings show how the robot body, to which the external force is applied from the front side thereof, falls down in the prostrate posture, the motion states can be comprehended in four stages of A to D.

The robot body of the legged mobile robot is made up by a multi-link structure comprised of an interconnection of plural joint axes having substantially parallel plural degrees of joint freedom along the lengthwise direction. In the course of the falldown motion, the link state defined by the floor contact points of the multi-link structure and the floor surface is switched between the open link state and the closed link state. In each stage of the falldown, the actuators for driving the respective joints are switched between the stiff joint characteristics, soft joint characteristics and the intermediate joint characteristics responsive to the switching of the link states, to realize the adaptive falldown motions.

(A) State of Both Legs Being in the Stance Position Prior to Falldown

The state of both legs being in the stance state is the orientation-controlled state, in which the lower limbs and the floor surface define a closed link system (see FIG. 35).

At this time, the actuators of all of the joint sites of the left and right legs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. As a result, the legs in the stance position are capable of performing fast response, whilst compliance is achieved and the motor viscosity is increased.

The neck roll, neck pitch, neck yaw, left elbow pitch, right elbow pitch and other joint sites are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. As a result, priority is attached to the positioning accuracy, whilst robustness against oscillatory disturbances is also achieved. In addition, the positioning accuracy of the joint, as a main component for controlling the quantity of $\Delta S/\Delta t$, as a reference in controlling the falldown motion, may be procured to increase the motion stability.

(B) Start of Falldown Motion (Closed Link State)

The start of falldown of the robot body can be detected based on the output of the orientation sensor. In the initial stage of the falldown, the lower limbs and the floor surface define a closed link system (see FIG. 36). Responsive to the external force and the impact, which may lead to falldown, the falldown motion which will minimize the impact is commenced.

At this time, the actuators of the joint sites taking part in the stable area control, such as the left and right thigh roll and pitch axes, are maintained in the intermediate joint characteristics, in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. The result is that the thigh unit is capable of high speed response, whilst compliance is achieved and the motor viscosity is increased.

On the other hand, as for the joint sites taking part in potential energy control, such as left and right ankle roll and pitch axes or the knee pitch axis, high speed response and compliance are crucial. Thus, the actuators of these joint sites are set to soft characteristics in which servo characteristics of the actuator motors are set so that the gain is low for the low frequency range and the quantity of the phase lead in the high frequency range is large, as shown in FIG. 13, and so that the motor viscosity is set to one-third of the maximum value of motor characteristics shown in FIG. 17B.

Additionally, for allowing the left and right arms to contact the floor to buffer the impact applied to the robot body, the joint site actuators of the left elbow pitch and the right elbow pitch are set to soft joint characteristics, in order for the robot body to ready itself for absorbing the impact on descent on the floor.

The actuators of the joint sites of the neck roll, neck pitch and the neck yaw are set to the stiff joint characteristics, in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to positioning accuracy and robustness against oscillatory disturbances may be achieved. In addition, the positioning accuracy of the joint, as a main component for controlling the quantity of ΔS/Δt, as a reference in controlling the falldown motion, may be procured to increase the motion stability.

The other joint sites are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. The result is that the joint sites are capable of high speed response and compliance may be achieved, while motor viscosity may be increased.

(C) Progress of Falldown Motion (Open Link State)

When the falldown motion progresses, the legs in the stance position clear the floor, such that the entire robot body forms an open link (see FIG. 37). For example, it can be detected from an output of the force sensor (or a contact sensor) provided on the foot sole that the foot sole is floated and the open link state is set.

Since all of the joint sites of the left and right legs take part in controlling the potential energy, fast response and compliance are crucial. Thus, the actuators of all of the joint sites of the legs are set to soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B.

Additionally, for allowing the left and right arms to contact the floor to buffer the impact applied to the robot body, the joint site actuators of the left elbow pitch and the right elbow pitch are set to soft joint characteristics, in order for the robot body to ready itself for absorbing the impact on descent on the floor.

The actuators of the joint sites of the neck roll, neck pitch and the neck yaw are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to the positioning accuracy and robustness against oscillatory disturbances may be achieved. In addition, the positioning accuracy of the joint, as a main component for controlling the quantity of ΔS/Δt, as a reference in controlling the falldown motion, may be procured, so that the motion stability is increased.

The other joint sites are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. The result is that the joint sites are capable of high speed response and compliance may be achieved, while motor viscosity may be increased.

(D) Instant of Contact

Figure 38:
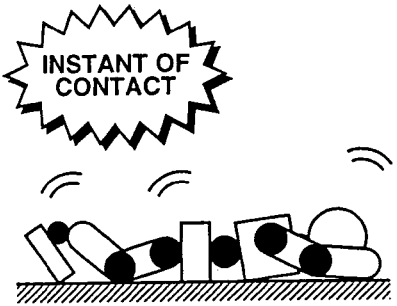

As a result of falldown, the robot body contacts the floor, and a closed link system is defined by the entire robot body (see FIG. 38). For example, outputs of the orientation sensor and the acceleration sensor are used to detect the impact on contact. At this time, the motions for minimizing the external force and the impact applied from the floor surface are commenced.

Since all of the joint sites of the left and right legs take part in controlling the potential energy, fast response and compliance are crucial. Thus, the actuators of all of the joint sites of the legs are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B. Since this yields a soft system, the impact applied to the entire robot body can be buffered.

Additionally, for allowing the left and right arms to contact the floor to buffer the impact applied to the robot body, the joint site actuators of the left elbow pitch and the right elbow pitch are set to the soft joint characteristics, in order for the robot body to ready itself for absorbing the impact on descent on the floor.

The actuators of the joint sites of the neck roll, neck pitch and the neck yaw are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to the positioning accuracy and robustness against oscillatory disturbances may be achieved. At the instant of contact, there is generated a motion of causing the head unit to be floated from the floor surface, in order to protect the head unit, loaded with crucial components, such as a controller, from a damage otherwise caused on impact against the floor surface.

The other joint sites are set to soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B. Since this yields a soft system, it is possible to buffer the shock otherwise applied to the robot body.

(E) Normal Posture After Falldown

The state of both legs being in the stance position is the orientation-controlled state in which the entire robot body forms a closed link system (see FIG. 39). This normal state can be confirmed by the orientation sensor by checking that the oscillations caused by the impact has come to a close, a preset time, such as one second, has elapsed and no impact is then applied.

At this time, the actuators of all of the joint sites of the left and right legs are changed over from the soft joint characteristics to intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. As a result, the left and right legs are capable of performing fast response, while compliance is realized and motor viscosity is improved.

The left elbow pitch, right elbow pitch, neck roll, neck pitch, neck yaw and other joint sites are set to stiff joint characteristics in which the servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. As a result, priority is attached to the positioning accuracy, while robustness against oscillatory disturbances may be achieved.

F. Rise-Up Operation from Lying-Down Posture

For startup from the lying-down state, such as from the supine posture or from the prostrate posture, or for autonomous rise-up on falldown to re-initiate the motion, by way of achieving self-completeness of the operation, the legged mobile robot 100 has to realize the rise-up operation.

If it is attempted to rise up via an unscheduled trajectory, the excess external force moment is applied, such that a high output torque of the joint actuator is required. The result is that the motor has to be increased in size, which increases the power consumption correspondingly. Moreover, the robot body is increased in weight and production cost. As the robot body is increased in weight, it becomes more difficult for the robot to perform the rise-up motion. Or, the robot cannot rise up because the stability in the orientation cannot be maintained due to the external force moment produced in the course of the rise-up motion.

Thus, in the present embodiment, the legged mobile robot 100 is designed to perform a rise-up motion comprised of a motion pattern which will minimize the external force moment. This may be realized by chronologically combining plural postures which will reduce the size of the ZMP support polygon to a minimum.

On the other hand, the legged mobile robot 100 is a link structure made up by an interconnection of plural pitch axes, such as the shoulder joint pitch axis 4, body trunk pitch axis 9, hip joint pitch axis 12 and the knee joint pitch axis 14 interconnected in the height-wise direction (see FIG. 3). This interconnection is serial when the link structure is viewed from the transverse direction. Thus, these plural joint pitch axes 4 to 14 are driven in a synchronously concerted fashion in a preset sequence to realize the rise-up motion by a motion pattern which will minimize the size of the support polygon.

F-1. Rise-Up Operation from a Basic Supine Posture

Figure 40:
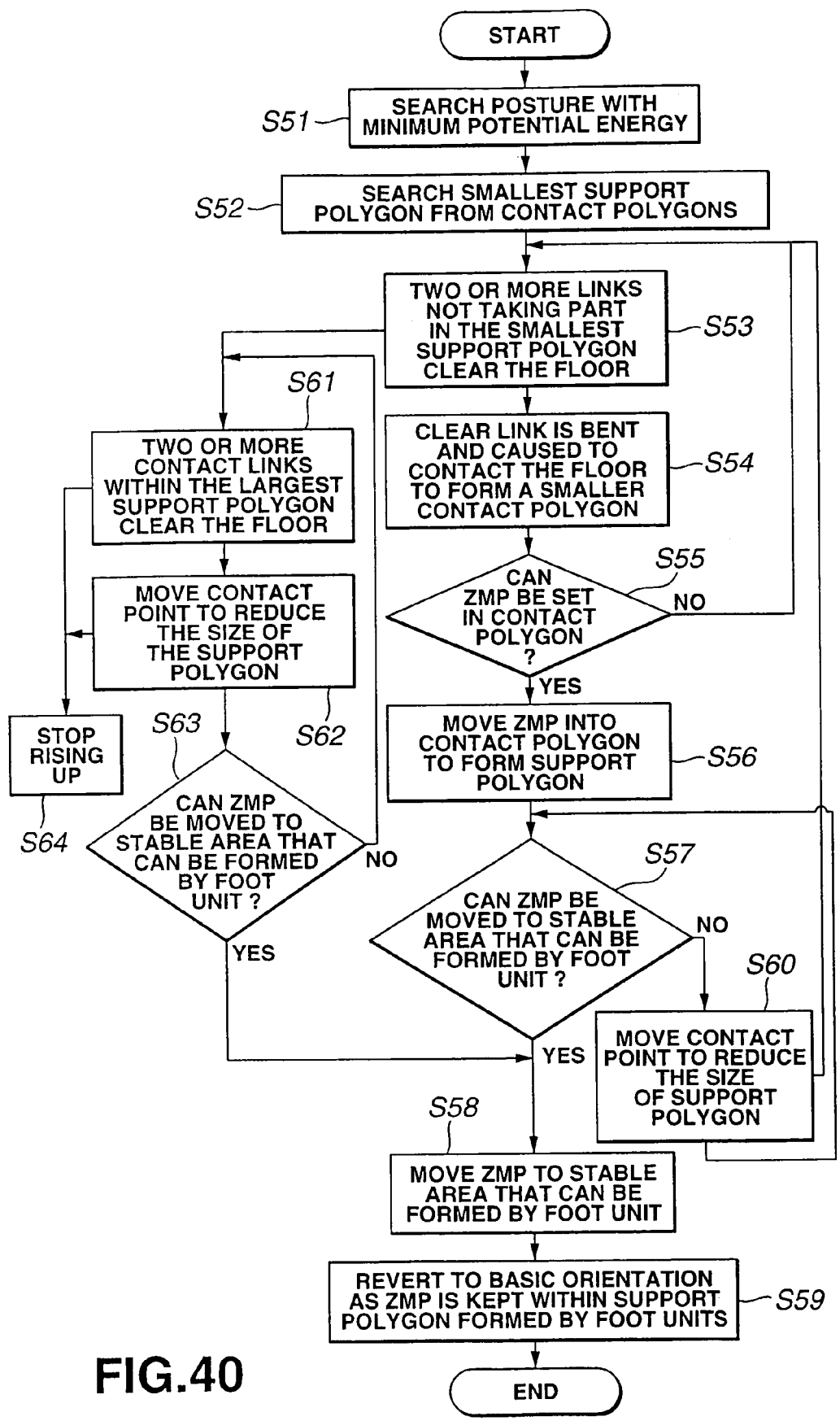
FIG. 40 is a flowchart showing the processing sequence of the legged mobile robot 100 actuating the shoulder joint pitch axis 4, body trunk pitch axis 9, hip joint pitch axis 12 and the knee joint pitch axis 14 in a synchronously concerted fashion to cause the robot to perform a rise up motion.

FIG. 40 shows, in a flowchart, the processing sequence for the legged mobile robot 100 of the present embodiment to actuate the shoulder joint pitch axis 4, body trunk pitch axis 9, hip joint pitch axis 12 and the knee joint pitch axis 14 in a synchronously concerted fashion to carry out the rise-up operation. In actuality, this processing sequence is realized by the main controller 81 executing the preset robot body motion control program to actuate the respective components in a controlled fashion.

Figure 41:
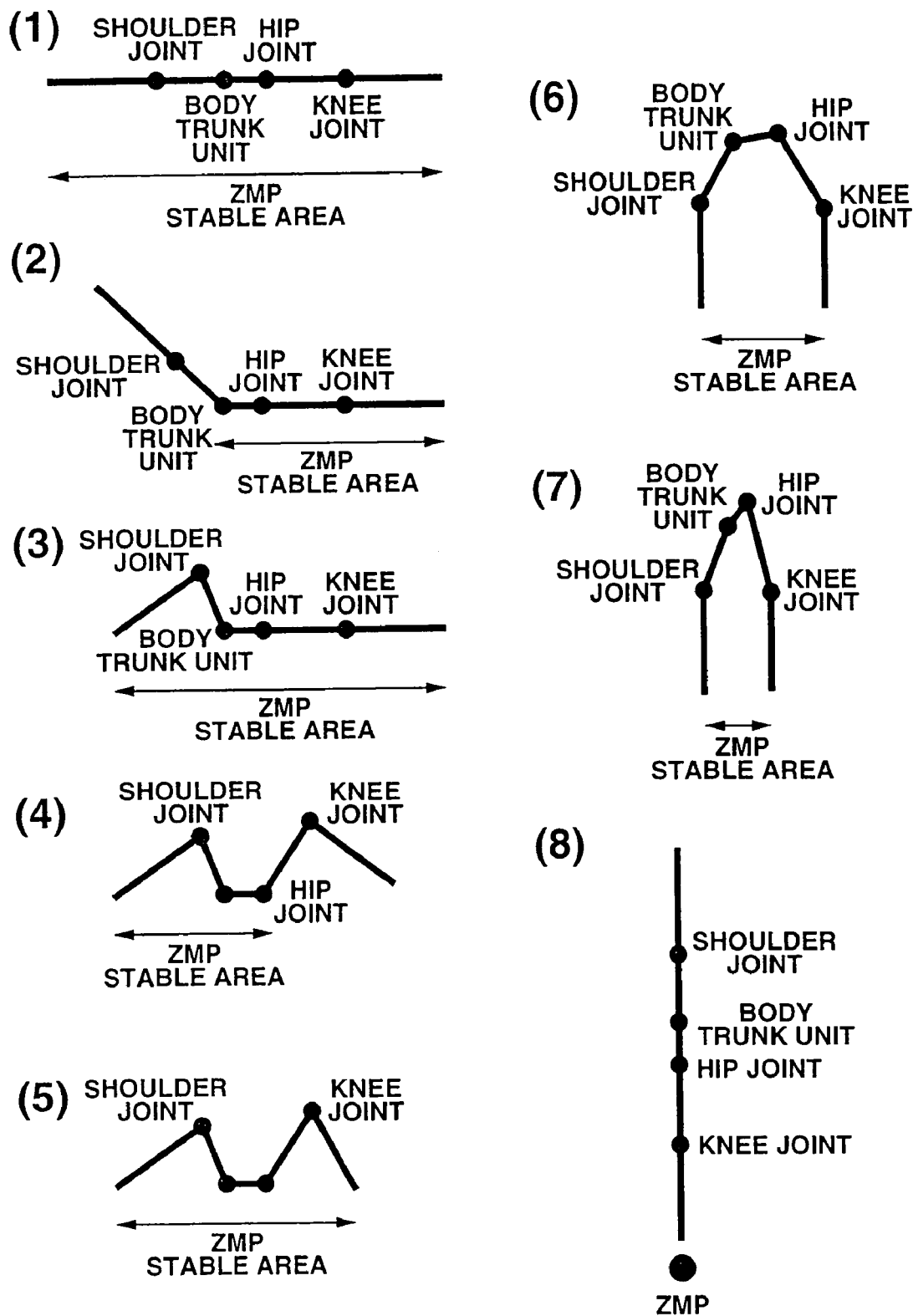
FIG. 41 shows a sequence of motions of the legged mobile robot 100 actuating the shoulder joint pitch axis 4, body trunk pitch axis 9, hip joint pitch axis 12 and the knee joint pitch axis 14 in a synchronously concerted fashion to cause the robot to perform a rise up motion from the supine posture.
Figure 42:
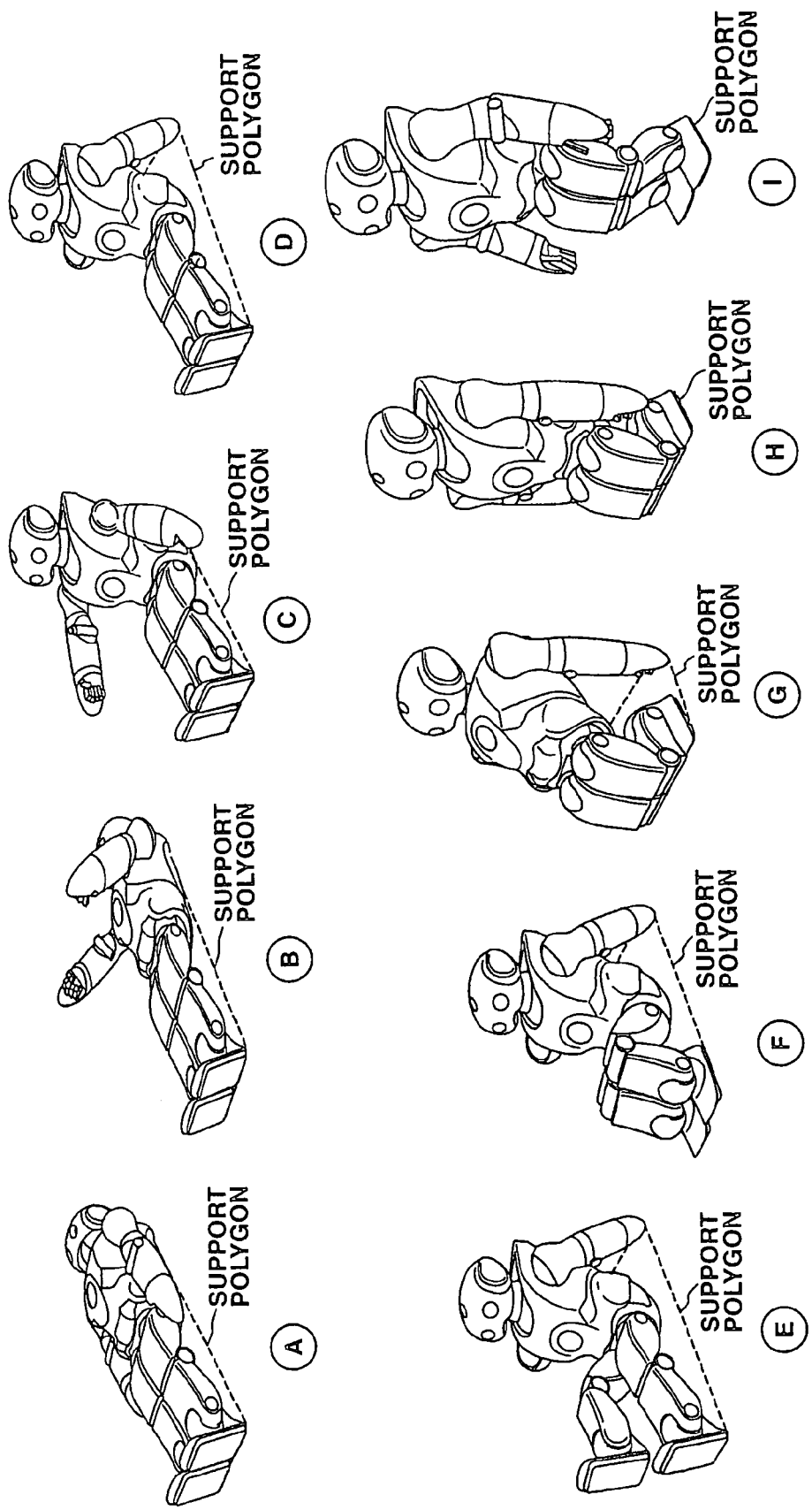
FIG. 42 shows a sequence of operations of the process of the actual robot body rising up from the supine posture.
Figure 45:
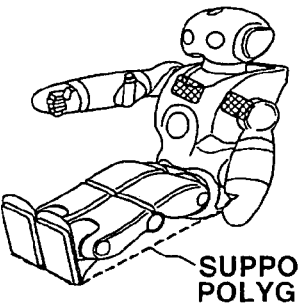

FIG. 41 shows, in a joint link model, the manner in which the legged mobile robot 100 of the present embodiment actuates the shoulder joint pitch axis 4, body trunk pitch axis 9, hip joint pitch axis 12 and the knee joint pitch axis 14 in a synchronously concerted fashion to carry out the operation of rising up from the supine posture. It is noted that, in the link structure, as shown, the center of gravity of the entire robot body is set on a link interconnecting the body trunk joint and the hip joint. This link is referred to below as a 'center of gravity link'. Although the 'center of gravity link' is used by this definition in the narrow sense of the term, the 'center of gravity link' may, in the broad sense of the term, denote a link where there exists the center-of-gravity position of the entire robot body. For example, in the robot body not having the body trunk axis, the 'center of gravity link' is the link comprising the foremost end of the body trunk unit where there exists the center of gravity of the entire robot body. FIG. 42 shows how an actual robot rises up from the supine position.

Referring to the flowchart shown in FIG. 40, the rise-up operation of the robot body from the basic supine posture is explained.

First, in the lying-down posture, the posture which will minimize the potential energy is searched (step S51). This corresponds to the basic supine posture in which links interconnecting the shoulder joint pitch axis 4, body trunk pitch axis 9, hip joint pitch axis 12 and the knee joint pitch axis 14, used for the rise-up motion, all contact the floor, as shown in FIGS. 41(1) and 42(A). By assuming the posture with the smallest potential energy, it is possible to measure the inclination or the shape of the floor surface to verify whether or not the rise-up motion is possible.

In this basic supine posture, the narrowest support polygon is searched from among the contact polygons formed by the floor-contacting links (step S52). At this time, it is checked whether or not, in case at least two links are caused to clear the floor from one end of the robot body, the ZMP trajectory can be scheduled. Whether or not the ZMP trajectory can be scheduled can be determined in consideration of the movable angle of the link structure, or the torque, joint force, angular velocity or angular acceleration of the respective joint actuators interconnecting the links.

Then, two or more links, not taking part in the narrowest support polygon, among the contact polygons, are caused to clear the floor (step S53).

This step S53 corresponds to FIG. 41(2). On the actual robot, the lower half body portion, including the center-of-gravity link interconnecting the body trunk joint and the hip joint, is extracted as a support polygon and two or more other links from the shoulder joint to the body trunk joint are caused to clear the floor as links not taking part in the support polygon. First, left and right arm units are lifted, as shown in FIG. 42(B), and the body trunk pitch axis actuator $A_9$ is driven to raise the body as shown in FIG. 42(C). By lifting the arm units first, the moment may be reduced to decrease the necessary maximum torque.

One or more floor-clear links are bent from one end and the link ends are caused to contact the floor to form a narrower support polygon (step S54).

The step S54 corresponds to FIG. 41(3) and FIG. 42(D). On the actual robot, the shoulder joint pitch axis is bent, as two or more links, including the shoulder joint, clear the floor, and the hand end, as the link end, is caused to contact the floor. The hand end is approached gradually towards the body trunk pitch axis, as the center of gravity of the robot body, to form a contact polygon narrower than that in the original lying-down posture.

On this robot body, the left and right arms are opened apart transversely, by the driving of the left and right shoulder joint roll axis actuators $A_5$, and the arm units are turned 180 degrees by driving the upper arm yaw axes actuators $A_6$. The arm units are gradually caused to descend by the driving of the shoulder joint pitch axis actuators $A_4$, and a narrower contact polygon is formed by causing the hand end to contact the floor.

When the new contact polygon has been formed in this manner, it is checked whether or not the ZMP can be set in the contact polygon (step S55). This check may be made in consideration of the movable angle of the respective joints of the leg units or the torque, joint force, angular velocity or angular acceleration of the link structure. The ZMP is moved to the contact polygon to form a new support polygon (step S56).

It is now checked whether or not the support polygon has become sufficiently narrow (step S57). In this check, it is verified whether or not the center of gravity link interconnecting the body trunk pitch axis and the hip joint pitch axis can clear the floor, and whether or not, as shown in FIG. 42(E), the ZMP can be moved to within the ZMP stable area that can be formed solely by the foot units, in consideration of the movable angle of the link structure, or the torque, joint force, angular velocity or angular acceleration of the joint actuators interconnecting the links.

In case the support polygon cannot be said to be sufficiently narrow, the floor contact point is moved to reduce the size of the support polygon (step S60). Then, processing reverts to the step S52 to re-try to form a narrower support polygon. In the contact polygons, defined by the contact links, the narrowest support polygon is searched (step S52). It is then checked whether or not the ZMP is schedulable in case at least two links are caused to clear the floor from the opposite end of the robot body. The ZMP schedulability can be verified in consideration of the movable angle of the link structure or the torque, joint force, angular velocity or angular acceleration of the joint actuators interconnecting the links.

Then, in the contact polygon, two or more links not taking part in the narrowest support polygon are caused to clear the floor (step S53). This step S53 corresponds to FIGS. 41(4) and (5). On the actual robot, two or more links continuing from the opposite side including the knee joint pitch axis are caused to clear the floor as links not taking part in the support polygon. One or more links, detached from the floor, are bent from one end and the link ends are caused to contact the floor to form a narrower contact polygon (step S54). At this time, the right leg is uplifted by the driving of the hip joint pitch axis actuator $A_{12}$ of the right leg, and the right leg is bent by the driving of the knee joint pitch axis actuator $A_{14}$, to cause the foot sole to contact the floor. The right leg is uplifted by the driving of the hip joint pitch axis actuator $A_{12}$ of the right leg, and the left leg is bent by the driving of the knee joint pitch axis actuator $A_{14}$, to cause the foot sole to contact the floor. In this manner, the foot sole is caused to approach gradually to the hip joint pitch axis 12, as the center of gravity position of the robot body, to form a contact polygon narrower than that of the original lying-down posture.

When the new contact polygon has been formed, it is checked whether or not the ZMP can be set in the contact polygon (step S55). This is verified in consideration of the movable angle of the link structure or the torque, joint force, angular velocity or angular acceleration of the respective joint actuators interconnecting the links. The ZMP is moved to the contact polygon to form a new support polygon (step S56).

It is now checked whether or not the support polygon has become sufficiently narrow (step S57). For this check, it is verified whether or not the center of gravity link interconnecting the body trunk pitch axis and the hip joint pitch axis can clear the floor, and whether or not the ZMP can be moved to within the ZMP stable area that can be formed solely by the foot units, in consideration of the movable angle of the link structure, or the torque, joint force, angular velocity or angular acceleration of the joint actuators interconnecting the links. In the posture of the actual robot, shown in FIG. 42(F), it may be verified that a sufficiently narrow support polygon has been formed. As for the angle of the arm when the support polygon is reduced in size, the angle between a plumb line drawn from the shoulder axis towards the floor surface and the center axis of the arm is within the preset angle derived from the torque quantity.

Responsive to the support polygon of the robot body becoming sufficiently narrow, the center of gravity link is caused to clear the floor, with both link ends of the support polygon contacting the floor. As the ZMP is kept in the support polygon defined by the contact links of both link ends, the spacing between the ends of both links defining the support polygon is decreased to shift the ZMP towards the opposite end of the link structure (step S58). This corresponds to FIGS. 41(6) and (7). On the actual robot, the center of gravity link, interconnecting the body trunk pitch axis and the hip joint pitch axis, is caused to clear the center of gravity link, as the hand end and the foot sole as ends of both links of the contact polygon are caused to contact the floor, as shown in FIGS. 42(G) and (H). Moreover, the spacing between the hand end and the foot sole is gradually narrowed to shift the ZMP towards the foot sole.

Responsive to intrusion of the ZMP into the inside of the contact polygon formed solely by not larger than a second preset number of the contact links, from the opposite side of the link structure, a number of links not less than a first preset number of links are caused to clear the floor, from the one end of the link structure, as the ZMP is held within the contact polygon. The contact links are then extended in the lengthwise direction to complete the rise-up motion (step S59). This corresponds to FIG. 41(8).

On the actual robot, the links from the shoulder pitch axis 4 to the knee pitch axis 14 are caused to clear the floor, as the ZMP is contained in the support polygon, responsive to the intrusion of the ZMP into the contact polygon formed by the foot soles, as shown in FIGS. 42(H) and (I). The links thus separated from the floor are extended in the lengthwise direction to complete the rise-up motion.

When the links thus separated from the floor are extended in the lengthwise direction, by way of performing the final stage of the rise-up motion, the knee joint pitch axis, having a large weight mass to act upon, is positively used for motions for improving the efficiency of the robot body motion.

If two or more links not taking part in the smallest support polygon cannot clear the floor, it is tried to cause two or more contact links, lying inwardly of the maximum support polygon, to clear the floor (step S61).

If the step S61 cannot be executed, the rise-up operation is discontinued. If the step S61 can be executed successfully, the contact point is further moved to further reduce the size of the support polygon (step S62).

If the step S62 cannot be executed, the rise-up operation is discontinued. If the step S62 can be executed successfully, it is checked whether or not the ZMP can be moved into the stable area that can be formed by the foot units (step S63). If the ZMP cannot be moved into the stable area, processing reverts to the step S61 to repeat the similar operations for reducing the size of the support polygon. If the ZMP has been moved successfully into the stable area, processing transfers to the step S58 to perform the motion of restoration to the basic posture.

Referring to FIGS. 43 to 52, the motion of rising up from the supine lying-down posture is now explained in ten stages of from A to J.

The robot body of the legged mobile robot is made up by a multi-link structure comprised of an interconnection of plural joint axes having substantially parallel plural degrees of joint freedom along the lengthwise direction. In the course of the rise-up motion from the supine posture, the link state which the contact site of this multi-link structure forms with the floor surface is switched between the open link state and the closed link state. In each stage of the rise-up motion from the supine posture, the actuators for driving the joints are switched, responsive to the switching of the link states, between stiff joint characteristics, soft joint characteristics and intermediate joint characteristics to realize adaptive rise-up motions.

(A) Basic Supine Posture

This is the orientation-controlled state in which the lower limbs, waist and the body trunk unit form a closed link system relative to the floor surface (see FIG. 43).

The legged mobile robot, performing the rise-up motion from the supine posture, in accordance with the motion pattern which will minimize the ZMP support polygon, searches the ZMP support polygon, as the left and right arms contact the floor, as explained with reference to FIG. 42. Thus, in readiness for the rise-up motion, the actuators of the joint sites, relevant to the driving of the arm units, such as the left and right shoulder pitch, shoulder roll or the elbow pitch, are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

The actuators of the joint sites of the left and right lower limbs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. As a result, in the respective joints of the left and right legs, motor viscosity is increased and fast response becomes possible, while compliance is realized in readiness for rise-up motions from the lying-down posture.

The actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

(B) Raising Both Arms Upwards

The lower half body side, including the center-of-gravity link, interconnecting the body trunk joint and the hip joint, is extracted as a support polygon, while two or more other links from the shoulder joint to the body trunk joint are caused to clear the floor as being the links not taking part in the support polygon. In this case, the lower limbs, waist and the body trunk unit form a closed link system with respect to the floor surface (see FIG. 44).

In the joint sites taking part in the floor clear motion, such as shoulder yaw axis or the elbow pitch axis, the positioning accuracy becomes crucial during the time period until floor contact, in order to form a narrower support polygon. Thus, the actuators of these joint sites are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A.

On the other hand, the actuators of the left and right lower limbs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A.

The actuators of the other joint sites are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

(C) Raising the Body Trunk as the Relative Angle Between Both Arms and the Body Trunk is Maintained The left and right arm units are uplifted and then the upper body part is raised. In this case, the lower limbs form a closed link system relative to the floor surface (see FIG. 45). The own posture is detected, using the orientation sensor and the own information on the joint angles. By raising the arm units first, it is possible to reduce the moment and the necessary maximum torque.

As from this time, the left and right arms proceed to contact, and hence the actuators of these joint sites are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B, whereby compliance may readily be achieved.

The actuators of the joint sites of the left and right lower limbs are set to intermediate joint characteristics in which the servo characteristics of the actuator motors are set so that the gain is low for the low frequency range and the quantity of the phase lead in the high frequency range is large, as shown in FIG. 13, and so that the motor viscosity is maintained to be as that shown in FIG. 17A.

The actuators of the other joint sites are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

(D) Shifting Both Arms Backwards

As the two or more links, including the shoulder joint, clear the floor, the shoulder joint pitch axes are subjected to bending such that the hand ends as the ends of the links are caused to contact the floor. The hand ends are gradually approached to the body trunk pitch axis as the center of gravity position of the robot body to form a contact polygon narrower than that in the original lying-down posture. As a result, the arms, body trunk, waist and the lower limbs form a closed link system with respect to the floor surface (see FIG. 46). The contact state of the arm's ends may be confirmed, using the orientation sensor and the own information on the joint angles.

In the joint sites taking part in the rise-up motions, such as left and right shoulder pitch, shoulder yaw or elbow pitch, fast response characteristics and compliance become crucial during the period until a narrower contact polygon is formed. To this end, the actuators of these joint sites are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. As a result, the left and right arm units are capable of fast response, whilst compliance is achieved and motor viscosity is increased.

The actuators of the joint sites of the left and right lower limbs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. As a result, the left and right lower limbs are capable of fast response, whilst compliance may be achieved. The motor viscosity is increased in readiness for the bending of the next stage.

The actuators of the other joint sites are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A.

(E) The Knee of the Right Leg is Bent to Approach the Foot End to the Body Trunk For sufficiently narrowing the support polygon, the ZMP is shifted into a ZMP stable area which can be formed solely by the leg units. The arm units, body trunk, waist and the left lower limb unit define a closed link system with the floor surface (see FIG. 47). The right leg being a leg in flight can be confirmed using the orientation sensor and the own joint angle information.

At this time, the right leg becomes the leg in flight. In the joint sites taking part in the floor clear motions, such as right thigh roll or right thigh pitch, fast response characteristics and compliance are crucial until contact when a narrower contact polygon is formed. Thus, the actuators of these joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

On the other hand, the right ankle roll and the right ankle pitch proceed to contact, and hence the actuators of these joint sites are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B, so that compliance may more readily be achieved.

The actuator for the left leg not in operation at this time and the actuators of the joint sites other than those described above are set to the intermediate joint characteristics in which the servo characteristics of the actuator motors are set so that the gain is low for the low frequency range and the quantity of the phase lead in the high frequency range is large, as shown in FIG. 13, and so that the motor viscosity is maintained at the maximum value of motor characteristics shown in FIG. 17A.

(F) The Knee of the Right Leg is Bent to Approach the Foot Sole Thereof to the Body Trunk For sufficiently narrowing the support polygon, the ZMP is moved to a ZMP stable area that can be formed solely by the leg units. The arm units; body trunk, waist and the left lower limb unit define a closed link system with the floor surface (see FIG. 48). The left leg being a leg in flight can be confirmed using the orientation sensor and the own joint angle information.

At this time, the right leg becomes the leg in the stance position and the left leg becomes the leg in flight. In the joint sites taking part in the floor clear motions, such as left thigh roll or left thigh pitch, fast response characteristics and compliance are crucial in order to form a narrower contact polygon. Thus, the actuators of these joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

On the other hand, the left ankle roll and the left ankle pitch proceed to contact, and hence the actuators of these joint sites are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B, so that compliance may more readily be achieved.

The actuators of the joint sites other than those described above are set to the intermediate joint characteristics in which the servo characteristics of the actuator motors are set so that the gain is low for the low frequency range and the quantity of the phase lead in the high frequency range is large, as shown in FIG. 13, and so that the motor viscosity is maintained at the maximum value of motor characteristics shown in FIG. 17A.

(G) Setting Up the Five-Point Support in which the Foot Soles of Both Legs Approach to the Body Trunk This is a posture in which a sufficiently narrow support polygon is formed. The arms, body trunk, waist and the lower limb units define a closed link system relative to the floor surface (see FIG. 49). This state can be confirmed from the own orientation (contact state) using the orientation sensor, own joint angle information and the force sensor of the foot sole (or contact sensor).

At this time, the actuators of the joint sites, performing the motions of searching for the narrowest support polygon, such as those for the ankle roll axis or the ankle pitch axis, are re-set from the soft joint characteristics to the intermediate joint characteristics, whereby compliance may be realized as fast response characteristics are realized, while motor viscosity is improved.

The actuators of the other joint sites are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A.

(H) Rise-Up in Four-Point Support with Arms and Legs Using the Legs, Body Trunk Unit and the Shoulder As the hand ends and the foot soles, as the two link ends of the contact polygon, contact the floor, the center-ofgravity link, interconnecting the body trunk pitch axis and the hip joint pitch axis, is caused to clear the floor. Moreover, as the separation between the hand ends and the foot soles is diminished gradually, the ZMP is moved towards the foot soles. The arms, body trunk, waist and the lower limb units form a closed link system with respect to the floor surface (see FIG. 50). This state can be confirmed from the own orientation (contact state), using the using the orientation sensor, own joint angle information and the force sensor of the foot soles (or the contact sensor).

In the contact joint sites, such as the ankle roll or the ankle pitch, fast response characteristics and the compliance are needed for forming a narrower contact polygon. Thus, the actuators of these joint sites are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B

On the other hand, the actuators of the joint sites relevant to the motions of narrowing the support polygon, such as shoulder pitch, shoulder roll or the knee joint, are set to the intermediate joint characteristics in which the servo characteristics of the actuator motors are set so that the gain is low for the low frequency range and the quantity of the phase lead in the high frequency range is large, as shown in FIG. 13, and so that the motor viscosity is kept at the maximum value of motor characteristics shown in FIG. 17A, in order to realize fast response characteristics and compliance.

The actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority may be placed on the positioning accuracy and robustness against oscillatory disturbances may be realized.

(I) The Arms Clear the Floor to Set Up a State of Two-Point Support with Legs

The links from the shoulder pitch axis 4 to the knee pitch axis 14 are caused to clear the floor, as the ZMP is contained in the support polygon, responsive to the intrusion of the ZMP into the contact polygon formed by the foot soles. The links thus separated from the floor are extended in the lengthwise direction. In this case, the waist and the lower limb units form a closed link system relative to the floor surface (see FIG. 51). This state can be confirmed from the own orientation (contact state) using the orientation sensor, own joint angle information and the force sensor of the foot sole (or contact sensor).

At this time, the actuators of the joint sites of the ankle roll and the ankle pitch are set, for intensifying the expanding motion and the stable orientation control in the two-point support state, to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A, whereby fast response characteristics becomes possible and compliance may be achieved, whilst motor viscosity may be raised.

The actuators of the joint sites of the left and right arm units, such as shoulder pitch, shoulder roll or the elbow pitch, are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby the priority may be attached to the positioning accuracy and robustness against oscillatory disturbances may be achieved.

The actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A.

(J) Transition to Basic Posture

The basic posture is such a state controlled as to orientation in the basic upstanding posture. The waist and the lower limbs form a closed link system relative to the floor surface (see FIG. 52).

The actuators of the ankle roll and the ankle pitch are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A, in order to provide fast response characteristics and compliance.

The actuators of the joint sites of the left and right arms, such as the shoulder pitch, shoulder roll and the elbow pitch, are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby the priority is attached to the positioning accuracy and robustness against oscillatory disturbances may be realized.

The actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A.

As described above, when the robot body performs a rise-up motion from the supine state, the actuator characteristics are set so that the low range gain is of a large value, the quantity of phase lead is of a small value and the motor viscosity is of a large value, as shown in FIG. 12, whereby high accuracy positioning becomes possible. Consequently, the motion control may be improved in accuracy for (A) to (J), thus assuring the precision in the size of the support polygon.

Moreover, the actuator characteristics are set so that the low range gain is of a small value, the quantity of the phase lead is of a large value and the viscous resistance of the joints is of a small value, as shown in FIG. 13, whereby the mechanical passiveness (compliance) may be imparted to the relevant joint sites. Thus, in status transition of (B) to (D), (E) to (G) and (H) to (I), the motions of the arms and the legs or the contact motions become smoother, while energy consumption may be diminished.

F-2. Rise-Up Operations form the Basic Prostrate Posture

Figure 53:
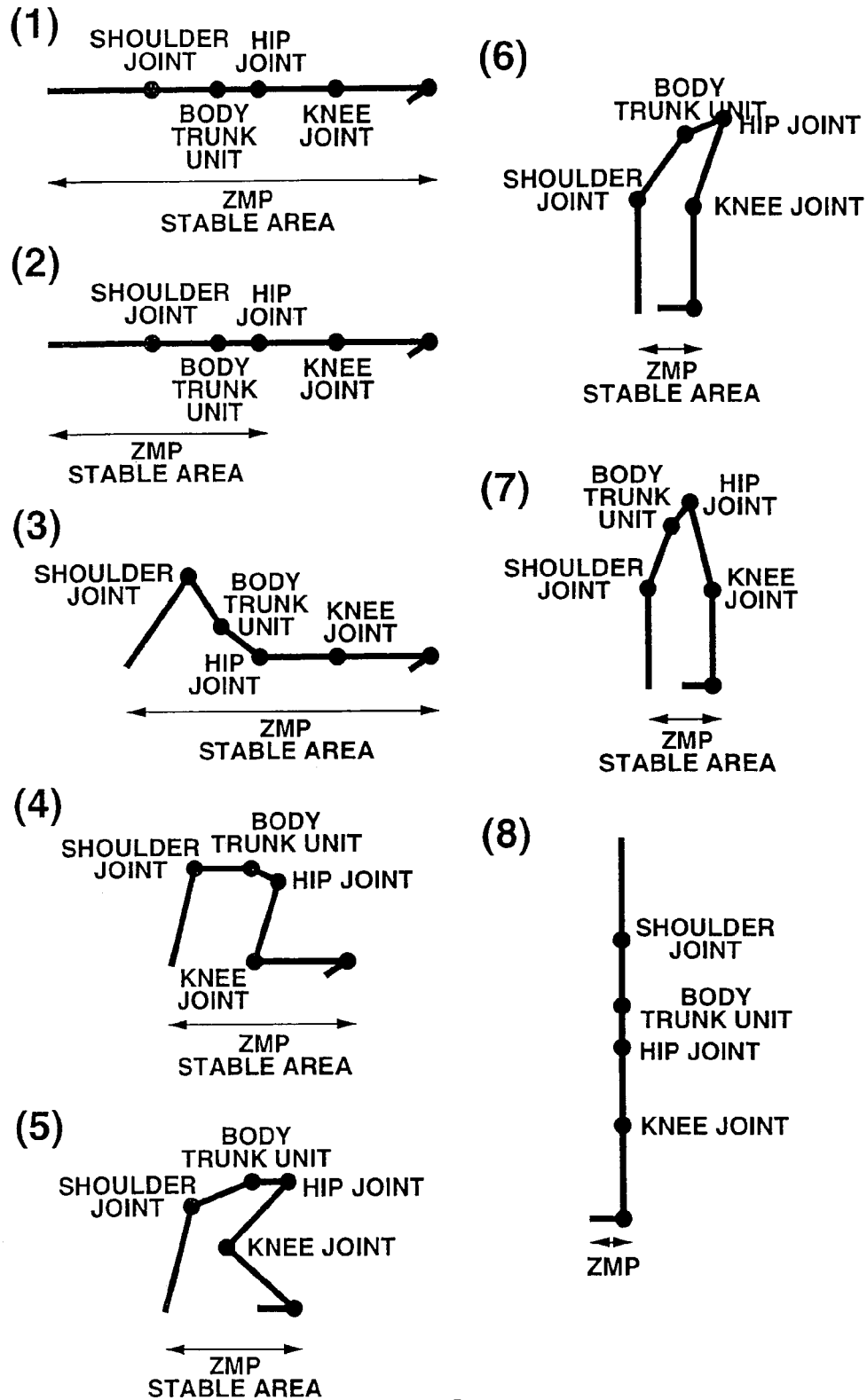
FIG. 53 shows how the legged mobile robot 100 actuates the shoulder joint pitch axis 4, body trunk pitch axis 9, hip joint pitch axis 12 and the knee joint pitch axis 14 in a synchronously concerted fashion to cause the robot to perform a rise up motion.

FIG. 53 shows, in a joint link model, the manner in which the legged mobile robot 100 of the present embodiment actuates the shoulder joint pitch axis 4, body trunk pitch axis 9, hip joint pitch axis 12 and the knee joint pitch axis 14 in a synchronously concerted fashion to carry out the rise-up operation.

Basically, the legged mobile robot 100 is able to rise up from the prostrate posture, in accordance with the processing sequence shown in the flowchart of FIG. 40, as in the case of rise-up from the supine posture. Referring to the flowchart of FIG. 40, the rise-up operation of the robot body from the basic prostrate posture is now explained.

First, in the lying-down posture, the posture with the smallest potential energy is assumed (step S51). This corresponds to the basic prostrate posture in which, as shown in FIGS. 53(1) and 54(A), the links interconnecting the shoulder joint pitch axis 4, body trunk pitch axis 9, hip joint pitch axis 12 and the knee joint pitch axis 14, used for the rise-up operations, all contact the floor.

In this basic prostrate posture, the narrowest support polygon in the contact polygon formed by the contact links is searched (step S52). It is then checked whether or not the ZMP is schedulable in case at least two links are caused to clear the floor from the opposite end of the robot body. The ZMP schedulability can be verified in consideration of the movable angle of the link structure or the torque, joint force, angular velocity or angular acceleration of the joint actuators interconnecting the links.

Figure 54:
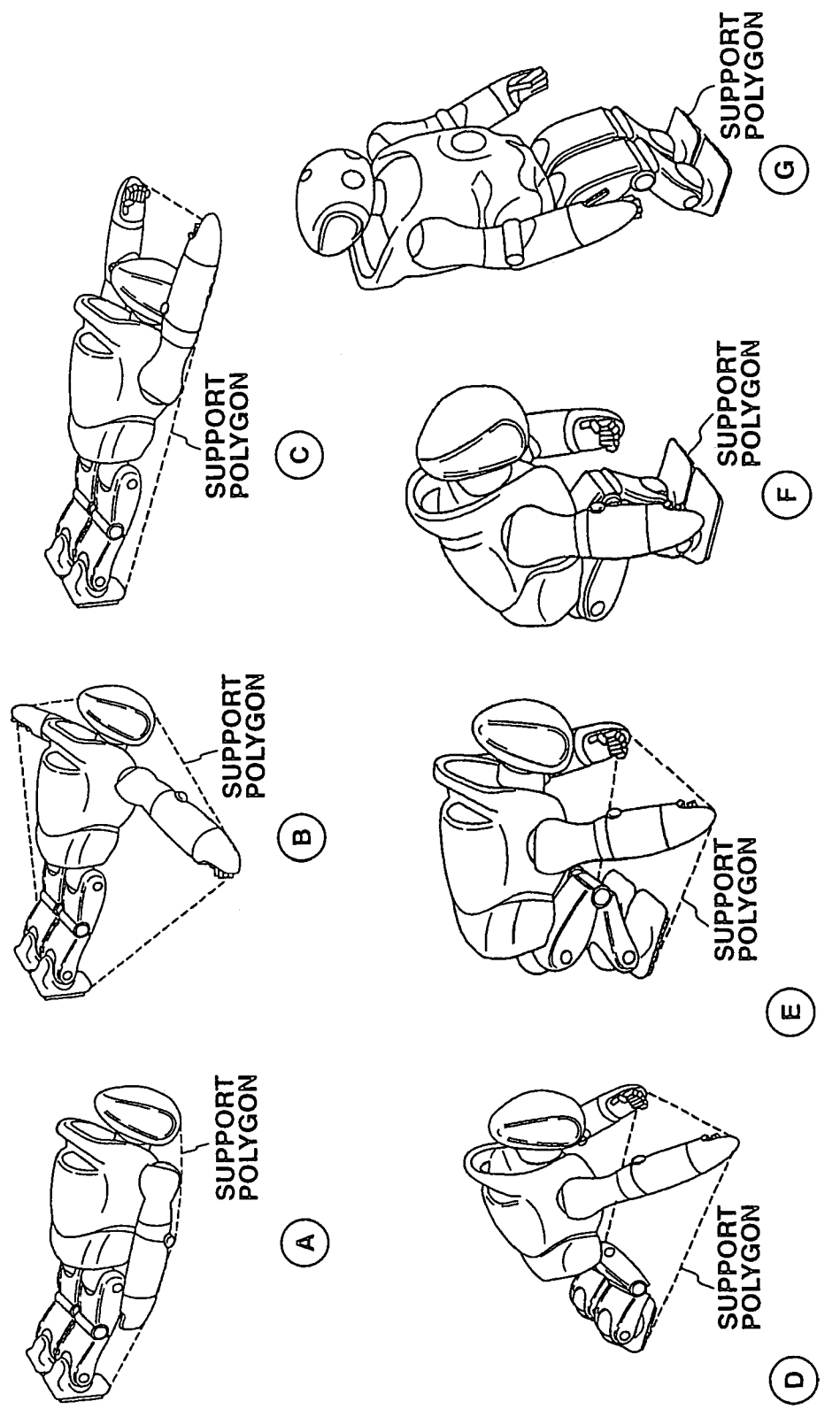

Then, in the contact polygon, two or more links not taking part in the narrowest support polygon are caused to clear the floor (step S53). This step S53 corresponds to FIG. 53(2). On the actual robot, the lower half body side, including the center-of-gravity link, interconnecting the body trunk joint and the hip joint, is extracted as a support polygon, while two or more links from the shoulder to the body trunk joint are caused to clear the floor as being the links not taking part in the support polygon. First, the shoulder joint roll axis actuators $A_5$ of the left and right arm units are actuated, rubbed against the floor surface and turned approximately 90° about the shoulder roll axis. The upper arm yaw axes actuators $A_6$ are then actuated to rotate the arm units approximately 180° about the upper arm yaw axis. The shoulder joint roll axis actuators $A_5$ are further actuated, as shown in FIG. 54(B), by rubbing against the floor, and rotated approximately 90° about the shoulder roll axis, whereby the left and right arm units are moved to lateral sides of the head unit, as shown in FIG. 54(C).

Then, one or more floor-clear links are bent from one side to cause the ends of the links to contact the floor to form a narrower contact polygon (step S54). This step S54 corresponds to FIGS. 53(3) and 54(D).

When the new contact polygon is formed, it is checked whether or not the ZMP can be set in the contact polygon (step S55). This is verified in consideration of the movable angle of the link structure, or the torque, joint force, angular velocity or angular acceleration of the joint actuators interconnecting the links. The ZMP is moved to a contact polygon to form a new support polygon (step S56). On the actual robot, the shoulder joint pitch axis actuators $A_4$, body trunk pitch axis actuator $A_9$, hip joint pitch axis actuator $A_{12}$ and the knee joint pitch axis actuator $A_{14}$ are actuated, with the elbow pitch axis 7 fixed and with the left and right arm units extended in an in-line position, to form a narrow contact polygon of a closed link posture in which the hand ends and the left and right knees contact the floor.

In case the support polygon cannot be said to be sufficiently narrow, the floor contact points are moved to reduce the size of the support polygon (step S60). On the actual robot, the hand ends are caused to approach gradually to the foot sole sides, as the other floor contact point, as the left and right arm units are maintained in the in-line positions, to form a narrower support triangle, as shown in FIG. 54(E).

It is then checked whether or not the support polygon has become sufficiently narrow (step S57). To this end, it is checked whether or not the center-of-gravity link, interconnecting the body trunk pitch axis and the hip joint axis, is able to clear the floor, or whether or not the ZMP can be moved into the ZMP stable area formed solely by the foot unit, in consideration of the movable angle of the link structure or the torque, joint force, angular velocity or angular acceleration of the joint actuators interconnecting the links.

Responsive to the support polygon of the robot body becoming sufficiently small, the distance between the ends of both links forming the support polygon is narrowed, as the ZMP is maintained in the support polygon formed by the contact links of both link ends, in order to move the ZMP towards the opposite side end of the link structure (step S58). This corresponds to FIGS. 53(6) and (7). On the actual robot, as the distance between the hand ends and the foot soles as the ends of the links of the contact polygon is gradually reduced, with the hand ends and the foot soles in the contact state, in order to move the ZMP towards the foot sole, as shown in FIGS. 54(G) and (H).

Responsive to intrusion of the ZMP into the inside of the contact polygon formed solely by not larger than a second preset number of the contact links, from the opposite side of the link structure, a number of links not less than a first preset number of links are caused to clear the floor, from the one end of the link structure, as the ZMP is held within the contact polygon. The contact links are then extended in the lengthwise direction to complete the rise-up operation (step S59). This corresponds to FIG. 53(8).

On the actual robot, the links from the shoulder pitch axis 4 to the knee pitch axis 14 are caused to clear the floor, as the ZMP is contained in the support polygon, responsive to the intrusion of the ZMP into the contact polygon formed by the foot soles, as shown in FIGS. 54(H) and (I). The links thus separated from the floor are extended in the lengthwise direction to complete the rise-up motion.

When the links thus separated from the floor are extended in the lengthwise direction, by way of performing the final stage of the rise-up motion, the knee joint pitch axis, having a large weight mass to act upon, is positively used for motions for improving the efficiency of the robot body motion.

Referring to FIGS. 55 to 61, the rise-up motion from the supine lying-down state is explained in seven stages of from (A) to (G).

The robot body of the legged mobile robot is made up by a multi-link structure comprised of an interconnection of plural joint axes having substantially parallel plural degrees of joint freedom along the lengthwise direction. In the course of the rise-up motion from the prostrate posture, the link state which the contact site of this multi-link structure forms with the floor surface is switched between the open link state and the closed link state. In each stage of the rise-up motion from the prostrate posture, the actuators for driving the joints are switched, responsive to the switching of the link states, between stiff joint characteristics, soft joint characteristics and intermediate joint characteristics, responsive to the switching of the link states, to realize adaptive rise-up motions.

(A) Basic Prostrate Posture

Figure 55:
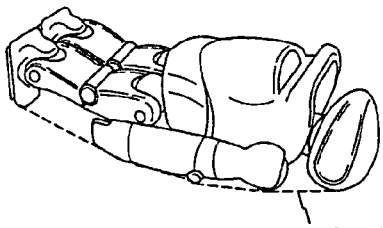
Figure 58:
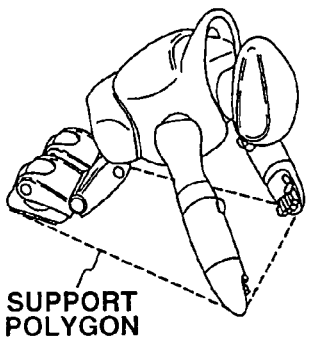

This is the orientation-controlled state in which the lower limbs, waist and the body trunk unit form a closed link system relative to the floor surface (see FIG. 55).

The legged mobile robot, performing the rise-up motion from the supine posture, in accordance with a motion pattern which will minimize the ZMP support polygon, searches a ZMP support polygon of the smallest size, as the left and right arms contact the floor, as explained with reference to FIG. 53. Thus, in readiness for the rise-up motion, the actuators of the joint sites, relevant to the driving of the arm units, such as the left and right shoulder pitch, shoulder roll or the elbow pitch axes, are set to stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

The actuators of the joint sites of the left and right lower limbs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A. As a result, in the respective joints of the left and right legs, fast response becomes possible, while compliance is realized and motor viscosity is increased.

The actuators of the body trunk roll and the body trunk pitch and the actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A, whereby priority is attached to the positioning accuracy and robustness against oscillatory disturbances may be achieved.

(B) Both Arms are Directed to an Overhead Position and Moved from Lateral Sides

The lower half body side, inclusive of the center-of-gravity link, interconnecting the body trunk joint and the hip joint, is extracted as a support polygon, and two or more other links, from the shoulder joint to the body trunk unit, are caused to clear the floor as links not taking part in the support polygon. The shoulder joint roll axis actuators $A_5$ are actuated, rubbed against the floor and turned approximately 90° about the shoulder roll axis to shift the arm units to lateral sides of the head unit. In this case, the lower limbs, waist and the body trunk unit form a closed link system with respect to the floor surface (see FIG. 56). However, the arms are not contacting the floor.

At this time, the joint sites taking part in the floor clear and turning motions, such as the shoulder yaw axis or the shoulder pitch axis, are in need of the positioning accuracy during the time period until contact to form a narrower polygon. Thus, the actuators of these joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A.

The actuators of the joint sites of the left and right lower limbs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is kept at the maximum value of motor characteristics shown in FIG. 17A.

The actuators of the body trunk roll and the body trunk pitch and the actuators for the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. As a result, priority is attached to the positioning accuracy and robustness against oscillatory disturbances may be realized.

(C) Both Arms are Raised in the Overhead Direction

The left and right arm units are moved to lateral sides of the head unit. The thighs, waist, body trunk and the upper limb units form a closed link system against the floor surface (see FIG. 57). This state can be confirmed using the orientation sensor and the own joint angle information.

At this time, the left and right legs become the leg in flight. In the joint sites of e.g. the ankle roll or the ankle pitch, fast response characteristics and the compliance are crucial for forming a narrower contact polygon. Thus, the actuators of these joint sites are set to the soft joint characteristics in which the gain is low for the low range and the quantity of phase lead in the high frequency range is high, as shown in FIG. 13, and in which the motor viscosity is set to one-third of the maximum value of the motor characteristics shown in FIG. 17B.

The actuators of joint sites, taking part in the motion of narrowing the support polygon, such as left and right shoulder pitch, shoulder roll, shoulder yaw, thigh roll, thigh pitch or the knee pitch, are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A, in order to acquire fast response characteristics and compliance.

The actuators of the body trunk roll or pitch and the actuators of the joint sites other than those described above are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. As a result, the priority is attached to the positioning accuracy and robustness against oscillatory disturbances may be achieved.

(D) Setting Up Four-Point Support Using Both Arms to Approach the ZMP to the Contact Surface of Feet The shoulder joint pitch axis actuators $A_4$, body trunk pitch axis actuator $A_9$, hip joint pitch axis actuator $A_{12}$ and the knee joint pitch axis actuator $A_{14}$ are actuated, with the elbow pitch axis 7 fixed and with the left and right arm units extended in an in-line position, to form a narrow contact polygon of a closed link posture in which the hand ends and the left and right knees contact the floor. The lower limbs, waist, body trunk and the upper thigh units form a closed link system against the floor surface (see FIG. 58). This state can be confirmed from the own posture (contact state), using the posture sensor, own joint angle information and the force sensor (or contact sensor) on the foot sole.

At this time, the actuators of the joint sites, performing the motions of searching the narrowest support polygon, such as the body trunk roll, body trunk pitch, left and right shoulder pitch, shoulder roll, shoulder yaw, thigh roll, thigh pitch or the knee pitch are set to the intermediate joint characteristics in which the servo characteristics of the actuator motors are set so that the gain is low for the low frequency range and the quantity of the phase lead in the high frequency range is large, as shown in FIG. 13, and so that the motor viscosity is maintained at the maximum value of motor characteristics shown in FIG. 17A, in order to achieve fast response characteristics and compliance.

The actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is maintained at the maximum value of motor characteristics shown in FIG. 17A. The result is that the priority is attached to the positioning accuracy and robustness against oscillatory disturbances may be realized.

(E) Orientation Control which Causes the ZMP to be Intruded into the Support Polygon Defined by the Foot Contact Surfaces The hand ends are gradually approached towards the foot sole side as the other contact point, as the right arm unit is maintained in an in-line position, in order to form a narrower support polygon to cause the ZMP to be moved into the ZMP stable area formed solely by the foot unit. The lower limbs, waist, body trunk and the upper limb units form a closed link system against the floor surface.

At this time, the actuators of the joint sites, performing the motions of searching the narrowest support polygon, such as the body trunk roll or pitch, left and right shoulder pitch, roll or yaw, thigh roll or pitch or the knee pitch, are set to the intermediate joint characteristics in which the servo characteristics of the actuator motors are set so that the gain is low for the low frequency range and the quantity of the phase lead in the high frequency range is large, as shown in FIG. 13, and so that the motor viscosity is maintained at the maximum value of motor characteristics shown in FIG. 17A, in order to achieve fast response characteristics and compliance.

The actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is maintained at the maximum value of motor characteristics shown in FIG. 17A. The result is that the priority is attached to the positioning accuracy and robustness against oscillatory disturbances may be achieved.

(F) Both Arms Clear the Surface to Set Up a Two-Point Support State

The distance between the hand ends and the foot soles is gradually narrowed, as the hand ends and the foot soles, as the ends of both links of the contact polygon, contact the floor, so that the ZMP is caused to approach to the foot sole. Responsive to the intrusion of the ZMP into the contact polygon, formed by the foot soles, the links from the shoulder pitch axis 4 as far as the knee pitch axis 14 are caused to clear the floor, and the floor clear link is extended in the lengthwise direction to complete the rise-up motion. The left and right lower limbs form a closed link system against the floor surface (see FIG. 60). This state can be confirmed from the own posture (contact state) using the orientation sensor, own joint angle information and the force sensor (contact state) of the foot sole.

In the left and right ankle roll and pitch, fast response characteristics and compliance are crucial for profiling the motion of raising the basic operating unit. Thus, the actuators of the joint sites are set to the intermediate joint characteristics, that is, the servo characteristics of the actuator motor are such that the gain is low for the low frequency range and the quantity of the phase lead in the high frequency range is large, as shown in FIG. 13, and such that the motor viscosity is kept at the maximum value of motor characteristics shown in FIG. 17A. The result is that the left and right ankles are capable of fast response and compliance may be realized, while motor viscosity is increased.

The actuators of the joint sites relevant to the driving of the arm units, such as the left and right shoulder pitch or the elbow pitch are set to the stiff actuator characteristics, that is, the servo characteristics of the actuator motor are such that the gain is high for the entire frequency range and the quantity of the phase lead in the high frequency range is small, as shown in FIG. 12, and so that the motor viscosity is set to the maximum value of motor characteristics shown in FIG. 17A. The result is that the priority is set on the positioning accuracy and robustness against oscillatory disturbances may be realized.

The actuators of the joint sites of the left and right lower limbs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is maintained at the maximum value of motor characteristics shown in FIG. 17A.

The actuators of the joint sites for the body trunk roll or the body trunk pitch and the actuators of the other joint sites are set to the stiff joint characteristics in which servo characteristics of the actuator motors are set so that the gain is high for the entire frequency range and the quantity of the phase lead in the high frequency range is small, as shown in FIG. 12, and so that the motor viscosity is set to the maximum value of motor characteristics shown in FIG. 17A. The result is that priority is attached to the positioning accuracy and robustness against oscillatory disturbances may be realized.

(G) Transfer to the Basic Posture

This posture is the state orientation-controlled to a basic upstanding posture. The left and right lower limbs form a closed link system against the floor surface (see FIG. 61). This state can be confirmed from the own posture (contact state) using the orientation sensor, own joint angle information and the force sensor at the foot soles (or a contact sensor).

At this time, the positioning accuracy is crucial in the joint sites of e.g. the shoulder yaw axis or the shoulder pitch axis. Thus, the actuators of these joint sites are set to the stiff actuator characteristics, that is, servo characteristics of the actuator motors are such that the gain is high for the entire frequency range and the quantity of the phase lead in the high frequency range is small, as shown in FIG. 12, and so that the motor viscosity is set to the maximum value of motor characteristics shown in FIG. 17A.

On the other hand, the actuators of the left and right lower limbs are set to the intermediate joint characteristics in which the servo characteristics of the actuator motors are set so that the gain is low for the low frequency range and the quantity of the phase lead in the high frequency range is large, as shown in FIG. 13, and so that the motor viscosity is set to the maximum value of motor characteristics shown in FIG. 17A.

The actuators of the other joint sites, that is the body trunk roll or pitch, are set to the stiff joint characteristics in which servo characteristics of the actuator motors are set so that the gain is high for the entire frequency range and the quantity of the phase lead in the high frequency range is small, as shown in FIG. 12, and so that the motor viscosity is maintained at the maximum value of motor characteristics shown in FIG. 17A. The result is that priority is attached to the positioning accuracy and robustness against oscillatory disturbances may be achieved.

As described in the foregoing, in the case that the robot body carries out a rise-up operation from the prostrate posture, the actuator characteristics are set so that the gain for low frequency is large, the quantity of the phase lead is small and the viscous resistance of the joint is of a large value, as shown in FIG. 12, whereby the positioning accuracy is achieved. Consequently, the motion control may be improved in accuracy for (A) to (G), thus assuring the precision in the size of the support polygon.

Moreover, the actuator characteristics are set so that the gain for the low frequency is small and the quantity of the phase lead is large, while the viscous resistance of the joint is of a small value, whereby the mechanical passiveness (compliance) and fast response characteristics may be imparted to the relevant joint sites. Thus, in status transition of (A) to (B), (C) to (E) and (F) to (G), the contact motion of the arms or the legs is smoother, while the energy consumption may be reduced.

The present invention has so far been explained by referring to specified embodiments. However, the present invention is not limited to the specified embodiments, which may be modified or subjected to substitution by those skilled in the art without departing from the purport of the invention.

The purport of the present invention is not limited to a product termed a "robot". That is, the present invention may similarly be applied to products belonging to the other industrial fields, such as toys, provided that such product is a mechanical device performing motions simulating the motions of the human being using electrical or magnetic operations.

The description of the present specification has been centered about a motor actuator as an actuator for driving the joints of a robot. The purport of the present invention is, however, not limited thereto. The effect of the invention may be realized in similar manner for an actuator other than a motor actuator having a rotary shaft directly actuating the angle of the joint, e.g. for an actuator of the type driving the joint by expansion and contraction of the distance between the links interconnecting the joints, such as muscle, by controlling the servo gain and the viscosity. The latter joint-driving actuator may be enumerated by e.g. a shape memory alloy actuator, a fluid actuator or a high molecular actuator.

In the present specification, description has been made of a circuit, composed of a switching device, comprised of a bipolar transistor, for switching control of the coil current to a coil of the motor actuator. However, as may be obvious to those skilled in the art, this sort of the control circuit can be implemented using a MOS-FET or similar semiconductor devices.

In sum, the present invention has been elucidated by way of illustration such that the contents of description of the present specification should not be construed in a limiting fashion. For judging the purport of the invention, reference should be made to the appended claims.

What is claimed is:

1. A legged articulated mobile robot comprising:
a plurality of movable parts which are connected to the robot;
a plurality of joints which connect the movable parts respectively;
a plurality of mobile legs having a plurality of joints;
controlling means for controlling characteristics of an actuator driving each joint, said controlling means controlling, in combination, the gain and the phase compensation of a servo controller of the actuator driving each joint and the viscous resistance of an actuator motor; and
falldown motion controlling means for controlling the motion of a body of the robot while the robot falls down;
said controlling means for controlling the actuator characteristics switching, in each stage of the falldown motions, the actuator for driving each joint between first actuator characteristics in which the low range gain is of a large value, the quantity of phase lead is small and the viscous resistance of the joint is large and second actuator characteristics in which the low range gain is of a small value, the quantity of phase lead is large and the viscous resistance of the joint is of a small value.

2. The legged mobile robot according to claim 1 wherein said falldown motion controlling means includes
contact site search means for searching changes per time $\Delta t$ of an area S of a support polygon formed by a contact point of the robot body and the floor surface;
target contact point setting means for setting a target contact point on which the site selected by said target contact point search means is to be set, so that a variation $\Delta S/\Delta t$ per time $\Delta t$ of an area S of a support polygon formed by a contact point of the robot body and the floor surface; and
site contact means for causing the site selected by said contact site search means to be placed on the target contact point as set by said target contact point setting means.

3. The legged mobile robot according to claim 2 further comprising
support polygon enlarging means for causing motion of the contact site for further enlarging the support polygon newly formed by causing the selected site to be placed on the floor by said site contact means.

4. The legged mobile robot according to claim 2 wherein the floor contact motion of the site by said contact site search means and the target contact point setting means and/or the motion of enlarging the support polygon by said support polygon enlarging means are repeatedly carried out until the potential energy of a robot body of the robot becomes minimum and the falldown motion is terminated.

5. The legged mobile robot according to claim 1 wherein said controlling means for controlling the actuator characteristics in each stage of the falldown motion sets the actuators for driving the respective joints, taking part in controlling the stable area, to first actuator characteristics in which the low range gain is large, the quantity of the phase lead is small and the viscous resistance of the joint is large.

6. The legged mobile robot according to claim 1 wherein said controlling means for controlling the actuator characteristics in each stage of the falldown motion switches the actuators for driving the respective joints, taking part in controlling the potential energy, from the first actuator characteristics in which the low range gain is large, the quantity of the phase lead is small and the viscous resistance of the joint is large to second actuator characteristics in which the low range gain is small, the quantity of the phase lead is large and the viscous resistance of the joint is small.

7. The legged mobile robot according to claim 1 wherein said controlling means for controlling the actuator characteristics switches the actuators for driving the respective joints, taking part in driving the respective joints, taking part in buffering the impact on contact, to the second actuator characteristics in which the low range gain is small, the quantity of the phase lead is large and the viscous resistance of the joint is small.

8. The legged mobile robot according to claim 1 wherein said controlling means for controlling the actuator characteristics in each stage of the falldown motion sets the actuators for driving the respective joints, in which priority is attached to the positioning accuracy, to the first actuator characteristics in which the low range gain is large, the quantity of the phase lead is small and the viscous resistance of the joint is large.

9. The legged mobile robot according to claim 1 wherein said controlling means for controlling the actuator characteristics in each stage of the falldown motion sets the actuators for driving the respective joints, in which priority is attached to the mechanical passiveness or fast response characteristics, to the second actuator characteristics in which the low range gain is small, the quantity of the phase lead is large and the viscous resistance of the joint is small.

10. The legged mobile robot according to claim 1 wherein said controlling means for controlling the actuator characteristics switches the characteristics of the actuators, driving respective joints, between the first actuator characteristics and the second actuator characteristics, in each stage of switching during the falldown motion of the link state, defined by the contact sites of the robot body and the floor surface, between the open link state and the closed link state.

11. A legged articulated mobile robot comprising:
a plurality of movable parts which are connected to the robot;
a plurality of joints which connect the movable parts respectively;
a plurality of mobile legs having a plurality of joints;
controlling means for controlling characteristics of an actuator driving each joint, said controlling means controlling, in combination, the gain and the phase compensation of a servo controller of the actuator driving each joint and the viscous resistance of an actuator motor; and
rise-up motion controlling means for controlling the rise-up motion of a body of the robot from a lying-down posture of the robot;
said controlling means for controlling the actuator characteristics switching, in each stage of the rise-up motions, the actuator for driving each joint between first actuator characteristics in which the low range gain is of a large value, the quantity of phase lead is small and the viscous resistance of the joint is large and second actuator characteristics in which the low range gain is of a small value, the quantity of phase lead is large and the viscous resistance of the joint is of a small value.

12. The legged mobile robot according to claim 11 wherein the robot body is made up by a multi-link structure comprised of plural joint axes, having substantially parallel degrees of freedom of the joints, and which are interconnected in the lengthwise direction; wherein
said rise-up motion controlling means includes
means for searching, in a lying-down state in which two or more contact links, including a center-of-gravity link, operating as the center of gravity of the robot body, contact the floor, the narrowest contact polygon, as a support polygon, formed by the smallest number of the links, among plural contact polygons formed by the contact links;
means for causing a contact link(s) other than the searched support polygon to clear the floor;
means for bending two or more continuing floor-clearing links, and for causing the ends of the links to be placed on the floor to form a narrower contact polygon; and
means for causing one or more preset number of links to clear the floor from one end of said link structure, responsive to the support polygon becoming sufficiently narrow, to set the robot body upright.

13. The legged mobile robot according to claim 12 wherein said controlling means for controlling the actuator characteristics sets, in each stage of the rise-up motion of the robot body, the characteristics of the actuator driving the joints of the contact links taking part in the searching for the narrowest support polygon to first actuator characteristics in which the low range gain is large, the quantity of the phase lead is small and the viscous resistance of the joint is large.

14. The legged mobile robot according to claim 12 wherein said controlling means for controlling the actuator characteristics switches, in each stage of the rise-up motion of the robot body, the characteristics of the actuator driving the joints of the links which do not take part in the support polygon and clear the floor, from second actuator characteristics in which the low range gain is small, the quantity of the phase lead is large and the viscous resistance of the joint is small, during the time until the links are placed on the floor to form a narrower contact polygon, to first actuator characteristics in which the low range gain is large, the quantity of the phase lead is small and the viscous resistance of the joint is large after the links are placed on the floor.

15. The legged mobile robot according to claim 12 wherein said controlling means for controlling the actuator characteristics sets, responsive to the support polygon becoming sufficiently narrow, the characteristics of the actuator driving the joints of the links which take part in the motion for setting the robot body upright to first actuator characteristics in which the low range gain is large, the quantity of the phase lead is small and the viscous resistance of the joint is large.

16. The legged mobile robot according to claim 11 wherein said controlling means for controlling the actuator characteristics sets, in each stage of the rise-up motion of the robot body, the characteristics of the actuator driving the joints, where the priority is attached to the positioning accuracy, to first actuator characteristics in which the low range gain is large, the quantity of the phase lead is small and the viscous resistance of the joint is large.

17. The legged mobile robot according to claim 11 wherein said controlling means for controlling the actuator characteristics sets, in each stage of the rise-up motion of the robot body, the characteristics of the actuator driving the joints, where the priority is attached to the mechanical passiveness or to fast response characteristics, to second actuator characteristics in which the low range gain is small, the quantity of the phase lead is large and the viscous resistance of the joint is small.

18. The legged mobile robot according to claim 11 wherein said controlling means for controlling the actuator characteristics switches the characteristics of the actuators, driving respective joints, between the first actuator characteristics and the second actuator characteristics, in each stage of switching during the rise-up motion of the link state, defined by the contact sites of the robot body and the floor surface, between the open link state and the closed link state.

* * * * *